United States Patent [19]

Brown, Jr. et al.

[11] Patent Number: 5,544,036

[45] Date of Patent: Aug. 6, 1996

[54] ENERGY MANAGEMENT AND HOME AUTOMATION SYSTEM

[76] Inventors: Robert J. Brown, Jr., 6688 Serena La., Boca Raton, Fla. 33433; James D. Romanowiz, 2919 Banyan Rd., Boca Raton, Fla. 33432; Charles W. Staples, 270 NW. 36th St., Boca Raton, Fla. 33431

[21] Appl. No.: 857,312

[22] Filed: Mar. 25, 1992

[51] Int. Cl.$^6$ ............................. G05B 11/01; G05B 23/02
[52] U.S. Cl. ...................... 364/145; 364/492; 364/505; 379/102; 340/825.07; 340/311.1
[58] Field of Search ........................................ 379/102, 104, 379/105; 340/825.06, 825.07, 825.44, 825.47, 310 A, 310 R, 825.52, 825.53, 825.57, 825.62, 825.68, 825.69, 310.01, 310.02, 311.1; 364/131, 132, 138, 141–145, 492, 493, 505; 395/800

[56] References Cited

U.S. PATENT DOCUMENTS

| | | | |
|---|---|---|---|
| 4,213,182 | 7/1980 | Eichelberger et al. | 364/145 |
| 4,264,960 | 4/1981 | Gurr | 364/492 |
| 4,454,509 | 6/1984 | Buennagel et al. | 340/825.69 |
| 4,847,781 | 7/1989 | Brown, III et al. | 364/492 |
| 4,918,615 | 4/1990 | Suzuki et al. | 364/505 |
| 5,119,412 | 6/1992 | Attallah | 379/102 |
| 5,168,170 | 12/1992 | Hartig | 364/493 |

*Primary Examiner*—Roy N. Envall, Jr.
*Assistant Examiner*—Steven R. Garland
*Attorney, Agent, or Firm*—Richard C. Litman

[57] ABSTRACT

An energy management and home automation system includes one or more controllers in each facility being managed and one or more energy consuming devices attached to each controller. Each controller responds to digital paging signals from a central command center which establish a schedule of event effecting the operation of each device and the controller schedules each device to be operated pursuant to the programmed schedule. The user of the system, by appropriate communication with the command center, may cause a paging message to be provided at any time changing the pre-programmed schedule. The heating/cooling system is controlled by setpoint temperatures for each of a plurality of different modes of occupancy, whereby the most energy is consumed when the facility is occupied and lesser amounts of energy are consumed when the facility is empty. Intermediate amounts of energy are consumed when the facility is not fully operational because people are asleep or maintenance or cleaning is being done. Prior to a mode change which demands more energy, the controller calculates the time required to bring the facility to the setpoints for the new mode and operates the heating/cooling unit at the calculated time prior to the scheduled mode change. The calculation is based upon the time required for the heating/cooling being controlled to change the temperature in the facility being managed. The energy consumption of the facility may also be reduced by paging messages from the utility company as a part of an emergency load reduction program.

56 Claims, 11 Drawing Sheets

| | | SLEEP TIMES | | | | | | | |
|---|---|---|---|---|---|---|---|---|---|
| | | 10:00PM 5:00AM | 11:00PM 5:00AM | 10:00PM 6:00AM | 11:00PM 6:00AM | 10:00PM 7:00AM | 11:00PM 7:00AM | 12:00AM 7:00AM | 12:00AM 8:00AM |
| | ALWAYS HOME | 001 | 020 | 038 | 052 | 066 | 076 | 086 | 096 |
| U N O C C U P I E D | 6:00AM to 4:00PM | 003 | 022 | | | | | | |
| | 6:00AM to 5:00PM | 005 | 024 | | | | | | |
| | 7:00AM to 3:00PM | 007 | 026 | 040 | 054 | | | | |
| | 7:00AM to 5:00PM | 009 | 028 | 042 | 056 | | | | |
| | 8:00AM to 5:00PM | 011 | 030 | 044 | 058 | 068 | 078 | 088 | |
| | 8:00AM to 6:00PM | 013 | 032 | 046 | 060 | 070 | 080 | 090 | |
| | 9:00AM to 5:00PM | 016 | 034 | 048 | 062 | 072 | 082 | 092 | 098 |
| | 9:00AM to 6:00PM | 018 | 036 | 050 | 064 | 074 | 084 | 094 | 100 |

FIGURE 15A

| | | MORNINGS | | | | | | |
|---|---|---|---|---|---|---|---|---|
| | | ALWAYS ON | NONE | 4:00AM TO 8:00AM | 4:00AM TO 8:00AM / 11:00AM TO 1:00PM | 6:00AM TO 9:00AM | 6:00AM TO 9:00AM / 11:00AM TO 1:00PM | 7:00AM TO 10:00AM | 7:00AM TO 10:00AM / 12:00PM TO 2:00PM |
| E V E N I N G S | ALWAYS ON | 000 | | | | | | | |
| | NONE | | 128 | 129 | 130 | 131 | 132 | 133 | 134 |
| | 3:00PM TO 7:00PM | | 135 | 136 | 137 | 138 | 139 | 140 | 141 |
| | 4:00PM TO 9:00PM | | 142 | 143 | 144 | 145 | 146 | 147 | 148 |
| | 5:00PM TO 10:00PM | | 149 | 150 | 151 | 152 | 153 | 154 | 155 |
| | 6:00PM TO 11:00PM | | 156 | 157 | 158 | 159 | 160 | 161 | 162 |

FIGURE 15B 5,544,036

ENERGY MANAGEMENT AND HOME AUTOMATION SYSTEM

BACKGROUND OF THE INVENTION

1. Field Of The Invention

This invention relates to an energy management and facility automation system, and more particularly, to such a system having one or more controllers in each home for managing various devices in response to messages from a central controller, which may be programmed by each user to individually and uniquely control each device through a facility controller and which may be further programmed by a utility company to permit load reduction limited to selected devices for short periods of time.

2. Description of the Prior Art

In recent years, various attempts have been made to provide both energy management systems and home automation systems for controlling various appliances in the home. Such appliances include heating and air conditioning systems, water heaters, lights, various motors and the like. Similar attempts have been extended to commercial facilities, such as offices, stores, warehouses and factories. Generally, the prior art efforts have been local systems which are expensive on a per facility basis because of the high cost of the main controller. Further, such systems are limited in their applicability and operation, and cannot be readily changed by the user to take into account changing circumstances.

A common problem faced by the utility company is the necessity to reduce demand for electricity, during certain time periods, such as during extremely hot or cold weather, or when an equipment breakdown occurs. Traditionally, the manner by which the utility company has reduced consumption by cutting service to entire neighborhoods or sectors of a grid, thereby totally eliminating all utility loads. In the case of an electric utility company, reducing consumption, when excess demand occurs, can better be accomplished by eliminating or reducing the demand by selected high energy consuming appliances, such as heating and air conditioning units, or water heaters, while leaving the more necessary items, such as lights, and small appliances or equipment, in a home or business still operating. This type of an approach would greatly reduce the inconvenience to the homeowner and business owner, since life as usual could continue for short times without heat or air conditioning, or unlimited hot water.

SUMMARY OF THE INVENTION

In accordance with one aspect of the invention, there is provided a system for controlling the use of energy and operation of selected energy consuming devices within a plurality of different facilities within a defined wide area including a plurality of controllers. Each controller includes message receiving means and is located in conjunction with a facility. Further, each controller, in response to messages received, controls at least one device coupled thereto in a manner defined by the message. The system further includes means for providing messages over a communication link, with each message including a code manifesting whether that message is globally addressed to each of the controllers or whether the message is addressed to a specific controller. Finally, the system includes means for communicating with the providing means to cause a selected message addressed to a specific controller to be sent.

BRIEF DESCRIPTION OF THE DRAWINGS

One preferred embodiment of the subject invention is hereafter described with specific reference being made to the following Figures, in which:

FIGS. 15A and 15B are examples of types of published schedule used by a user of the invention for programming the HVAC unit or water heater units to be controlled.

DETAILED DESCRIPTION

Figure 1:
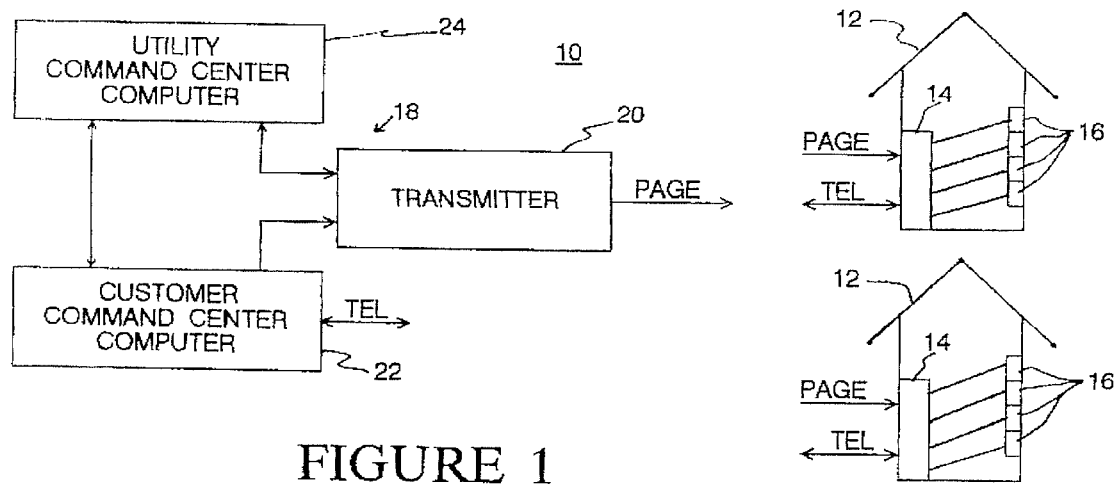
FIG. 1 shows a generalized block diagram of the energy management and home automation system of the subject invention.

Referring to FIG. 1, a block diagram of the energy management and automation system 10 of the subject invention is shown. System 10 is organized to control both the usage of energy and the convenience of using electrical energy consuming devices in a wide area of facilities 12, such as homes, commercial buildings, apartment units and the like. One or more controllers 14 in each facility 12 provides electrical control signals to various electrical consuming devices 16, such as heating and cooling units, water heaters, lights of various types, pumps, electrical appliances such as coffee makers or toasters, home entertainment devices, such as televisions, stereos, video recorders, and the like. The signals provided from controller 14 to devices 16 are of a type which may either turn the appliance on or off, or may set the devices 16 to an intermediate value, such as setting dimmable lights to a forty percent value.

Some devices, such as heating, ventilating, and air conditioning units (HVAC), water heaters, lights and the like, will require additional controls, such as thermostats or switches to control whether the appliance is to be turned on. Thus, in some instances, the "on" signals from controller 14 merely permits the appliance to turn on if other conditions are present. For example, the water heater control "on" signal permits more hot water to be generated, but the thermostat associated with the water heater must still indicate that hot water is needed. On the other hand, the "off" signal will generally disable the appliance from being on, regardless of the setting of other controls associated by the appliance.

The central, or common, portion 18 of system 10 includes a transmitter 20 which sends various signals to the controllers 14. These signals may address an individual controller 14, a group of controllers 14 or all of the controllers 14. While any communication link may be used from transmitter 20 to controllers 14, the preferred embodiment described herein utilizes the paging network services offered by various telephone companies and independent providers. Other communications links, such as, ISDN, television cable, FM radio, telephone lines, or direct communications may alternatively be used. The contents of the paging messages, indicated by the notation PAGE in FIG. 1, transmitted by transmitter 20 are determined by a customer command center computer 22 and a utility command center computer 24. It should be noted that there may be several utility command center computers 24 attached to transmitter 20 and computer 22, although only one is shown in FIG. 1. Computers 22 and 24 may be coupled to transmitter 20 by conventional telephone lines, which may be dedicated lines, or shared lines used in the public network, and provide appropriate signals to transmitter 20 to permit the subsequent transmission of paging message packets manifesting the appropriate information, as described hereafter with respect to FIGS. 5 through 14. In addition, computer 22 can communicate with the various controllers 14 over the public telephone network, as indicated by the line label TEL.

Generally, the particular manner by which the various devices 16 are to be controlled is determined by programmed command data stored in each of the controllers 14 in conjunction with a pre-existing program contained in each controller 14. The programmed data is normally generated by customer command center computer 22 and transmitted to controllers 14 as paging message signals by transmitter 20, although in some instances it may be locally generated by operation of, for example, certain key sequences on a thermostat. Many of the paging message signals sent to controllers 14 are determined by the manner in which a user programs computer 22, using a conventional DTMF tone or pulse dial telephone communicating with computer 22. Some paging message signals, however, are determined solely by the customer command center computer 22 itself and automatically sent to all control units 14. The various paging message signals and the manner in which the user programming occurs is hereafter described in more detail.

In certain instances, the energy management and automation functions programmed by the user may be overridden by the utility company when it is necessary to reduce the consumption in a particular area. In this situation, utility command center computer 24 provides signals to transmitter 20, which, in turn, provides appropriate paging messages to the various controllers 14. These messages may cause certain appliances, such as heating or cooling units or water heaters, to be turned off, for selected times, such as for fifteen minutes, or for alternate ten minute increments over a defined period. Alternatively, the paging messages generated as a result of actions by the utility command center computer 24 may only require the selective disabling of certain appliances, such as reducing the temperature at which a heating unit can turn on, or increasing the temperature at which a cooling can unit turn on. The utility company paging messages are only sent to those facilities who have agreed to participate in a reduction program, usually in exchange for a reduced cost for electric power, natural gas or other commodity supplied. Other utility companies, such as gas utilities or water utilities, may also participate in the utility commodity reduction ability afforded by system 10. Computer programs within controllers 14 recognize the utility company paging messages and prevent a user from overriding the commands to reduce energy consumption, using the keys 84 on thermostat 42 or overriding the powerline transceiver 54 controls, something which the user can otherwise do. However, upon request to the customer command center 24, a utility company can authorized energy consumption in an emergency situation, such as, a medical necessity.

Each message generated by transmitter 20 may be a typical paging message. For example, the paging message may be a numeric paging message consisting of twenty-three characters, each of which may be the numeric values "0"–"9", or the paging message may be an alpha/numeric paging message consisting of 80 characters, each of which may contain many more than the ten values available with the numeric paging message. In all of the paging messages, the first digit of the paging message defines the type of signal and the last digit is a checksum digit. The various types of signals generated by computers 22 and 24, and transmitted as paging messages by transmitter 20, may be generally classified as containing, Schedule Information, Time, Date and Daylight Information, Weather information, Initialization information, Utility Company Setup information, Utility Company Activation commands, User Override commands, and System Parameter commands. Generally, these paging messages are designed for transmittal as a twenty-three digit numeric paging message, with the first digit identifying the type of signal. However, if the first digit of a paging message is a "9" (or alternatively any number other than those between "0" and "8"), it may be used to identify another paging format, such as the 80 character alpha/numeric format. Each of these messages and the response by controllers 14 thereto will be discussed in more detail hereafter.

Figure 2:
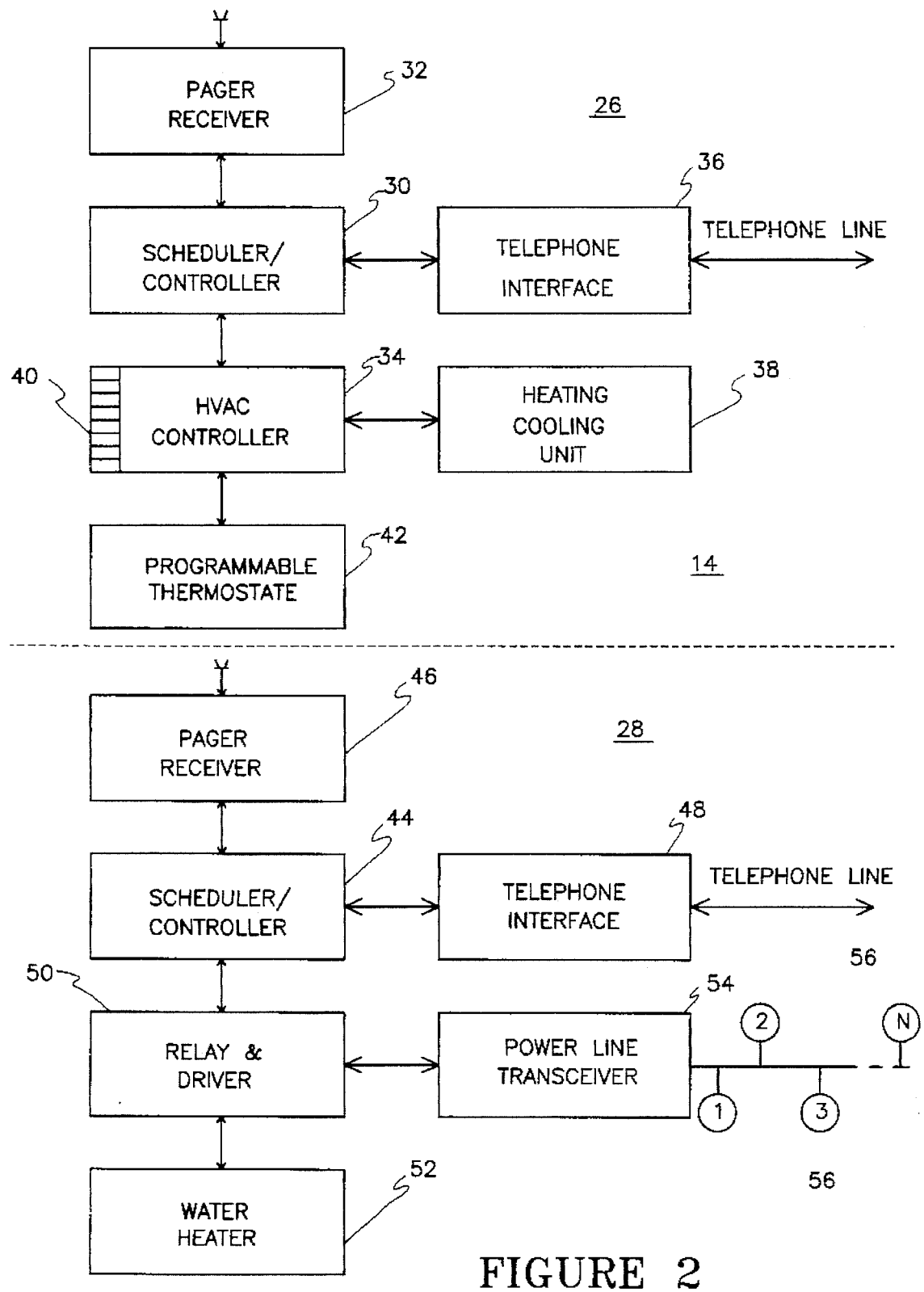
FIG. 2 shows a block diagram of the water heater and automation control unit and the HVAC control unit used in user facility portion of the system shown in FIG. 1.

Referring now to FIG. 2, a generalized block diagram of the controller unit 14 within a single facility 12 is shown. Controller 14 consists of one or more of two different types of control units, which are a HVAC (Heating, Ventilation and Air Conditioning) control unit 26 and a water heater and automation control unit 28. The HVAC control unit 26 is dedicated to controlling the heating and cooling of the home, whereas the water heater and automation control unit 28 controls the water heater and up to sixteen other appliances. It should be noted that within any given facility, one or more of either type of control unit 26 or 28 may be utilized, or alternatively, either unit 26 or 28 may be eliminated, if no desire exists for that particular unit. However, for most facilities, at least one of each type of control unit 26 and 28 will be used.

The primary portion of the HVAC control unit 26 is a scheduler/controller 30, which has a pager receiver 32, an HVAC controller 34 and a telephone interface (TI) 36 connected thereto. Pager receiver 32 may be any commercially available module capable of receiving and decoding the telephone company pager messages, such as the Model BPR2000 pager receiver, manufactured by Motorola, Inc. of Boynton Beach, Fla. Pager receiver 32 detects all pager message broadcast and respond to certain message signals by providing a series of signals to scheduler/controller 30 manifesting a sequence of the digits zero through nine. In conventional digital pager systems, used by individuals, the digits received by the pager receiver 32 are displayed on a conventional seven segment liquid crystal display. In control unit 26, the pager receiver 32 signals used to illuminate the seven segment display are intercepted and provided to scheduler/controller 30, where they are decoded to manifest the digits they represent. This permits the use of commercially available pager receiver modules for pager receiver 32.

Telephone interface 36 may similarly be any conventional DTMF receiver/transmitter circuit which detects, decodes and provides digital signals to controller 30 in response to conventional DTMF tone signals provided over the public access telephone network.

Figure 4:
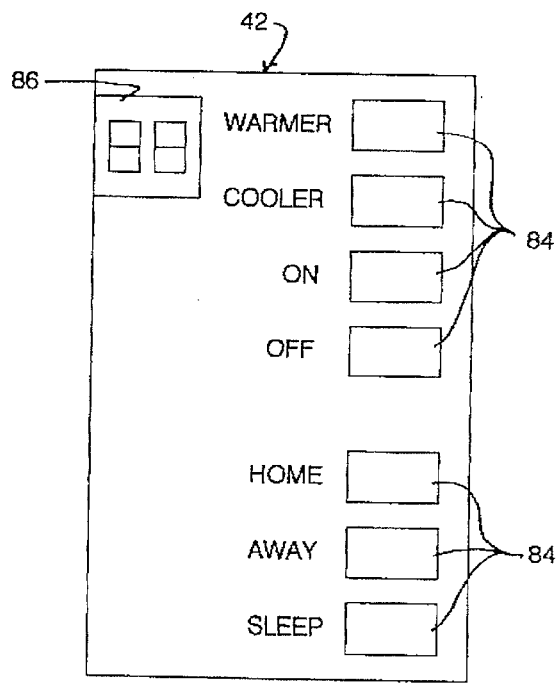
FIG. 4 shows the programmable thermostat used with the HVAC controller of the subject invention.

HVAC controller 34 may be a commercially available programmable HVAC electronic thermostat, such as the one manufactured by Alerton Technologies, Inc., of Seattle, Wash., under Model Number SA-TUX. While the hardware of HVAC controller 34 may be commercially available, the computer program, or firmware, of the commercial version requires modification to provide the information required by control unit 26, as will be more fully explained hereafter. Generally, HVAC controller 34 provides output voltages to control the fan and heating and cooling units of conventional heating and cooling units 38 found in most types of facilities 12. A series of switches 40 are set to indicate the particular type of heating/cooling unit 38 present in the facility 12. In addition, HVAC controller 34 is connected to a programmable thermostat 42, which may be controlled by the user to affect the operation of the heating/cooling unit 38. Thermostat 42, which is shown and described in more detail in FIG. 4, is simply a temperature detector, keyboard and display in a single package.

The water heater and automation control unit 28 is similar to the HVAC control unit 26. It also includes a scheduler/controller 44 which is connected to a pager receiver 46 and telephone interface 48. Pager receiver 46 is identical to pager receiver 32 and telephone interface 48 is identical to telephone interface 36, both described above. In addition, scheduler/controller 44 has a relay and driver circuit 50 coupled thereto, which switchably permits power to be applied to a conventional water heater 52, or other high amperage device, such as pumps of various types. Relay and driver circuit 50 may be simply a 35 amp switchable relay connected as a switch in series with the power lines connected to water heater 52. In addition, a transceiver 54 is connected to scheduler/controller 44 and may control up to N different appliances connected thereto.

One type of transceiver 54 which may be used is a standard power transceiver operating under the X-10 standard of providing rf signals over the electric lines existing throughout the facility 12. Such a device may control up to sixteen different energy consuming devices 56 connected thereto with commercially available interface devices. An example of transceiver 54 which may be used is a model TW523 manufactured and sold by X-10 USA of Northvale, N.J. Other types of connections, such as twisted pair, coaxial cable, fiber optics and so forth may also be utilized to interconnect scheduler/handler 44 with the various devices being controlled. Some of these connections may be bi-directional to permit communication of data back to scheduler/controller 44.

As noted above, telephone interfaces 36 and 48 permit communications between the command center computers 22 and 24 and each control unit 26 and 28 by using the public telephone network. To better use this telephone communication ability, an auto-dialing device may be included in each control unit 26 and 28. With this additional hardware, each control unit 26 and 28 may be directed to perform certain tasks and report the results to a designated telephone number. Where many units are to perform the same task and report the results, the paging signals may be used to address many units at one time and then each can call the designated number until a report is made. Of course, this may require many automatic re-dial attempts until all units successfully report. An example of such communication is that system 10 may be include various devices 56 arranged to read utility meters, such as water, electric or gas meters, and report the reading back to the particular utility company. The utility company may broadcast a broad based paging message requesting each control unit 26 or 28 in a designated area to read the meter and report the results to a designated utility company telephone number. Similarly, such action may be programmed to occur at specified times and dates by using the paging messages described herein. Alternatively, system 10 may be designed or programmed by appropriate paging messages to require each control unit 26 or 28 to report its status back to command center 22 or 24, either automatically, or on command.

Figure 3A:
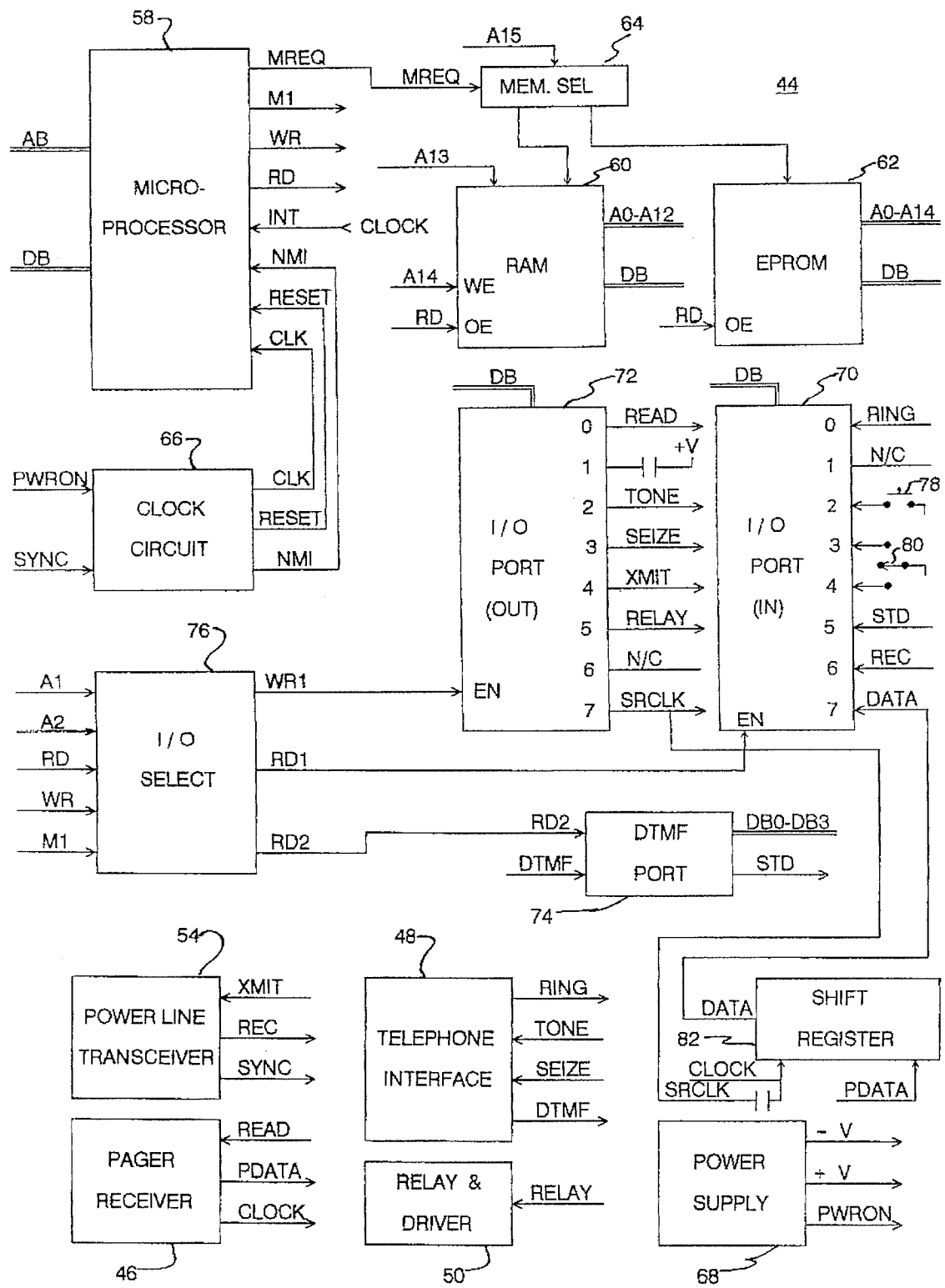
FIGS. 3A shows a more detailed block diagram of the scheduler/controllers of the water heater and automation control unit shown in FIG. 2.

Referring now to FIG. 3A, a block diagram of scheduler/controller 44 in water heater and automation controller unit 28 is shown. From a hardware view, scheduler/controller 44 is a microcomputer system, having, as its primary controller, a microprocessor 58, such as a commercially available Z-80 type microprocessor. Microprocessor 58 includes a sixteen bit address bus AB and an eight bit data bus DB, which are applied to various other modules in scheduler/controller 44, as hereafter explained. In addition, microprocessor 58 includes a plurality of various control signals for controlling the operation of various other modules. These control signals include the MREQ and M1 signals for controlling memory and I/O (input/output) access, the WR and RD signals for controlling the writing and reading of data to and from modules selected by the MREQ and M1 signals, the INT and NMI interrupt signals which interrupt the operation of microprocessor 58, the RESET signal which resets microprocessor 58 upon the application of power thereto, and the CLK signal which controls the frequency of operation of microprocessor 58. Each of these control signals are well known in the literature explaining the operation of a Z-80 microprocessor.

Conventional RAM memory 60 and EPROM memory 62 are coupled to bits 0–14 of address bus AB, to bits 0–7 of data bus DB and to the RD control signal from microprocessor 58. While not shown, RAM memory 60 may have a voltage backup system, such as a large capacitor or a battery, to prevent the loss of data in the event of a power failure. In addition, a memory select circuit 64 is provided to select one of RAM memory 60 or EPROM memory 62 in response to the MREQ signal and A15 address bus signal applied thereto. The selected one of RAM 60 or EPROM 62 then responds appropriately to the then occurring memory operation instruction from microprocessor 58. RAM 60 is addressed by the address lines A0–A12, and Address lines A13 and A14 are used as chip select and write enable signals. EPROM 62 is addressed by address lines A0–A14, and thus, may be a 32K byte memory.

Scheduler/controller 44 also has a clock circuit 66 which provides various signals to the CLK, RESET and NMI inputs of microprocessor 58. Clock circuit 66 includes a conventional crystal oscillator circuit, the output of which is provided as the CLK input to set the timing of microprocessor 58. The oscillator signal is also divided and synchronized with a SYNC signal from transceiver 54 to provide an interrupt signal at multiples of 8.33 milliseconds to the NMI input of microprocessor 58. In addition, the PWRON signal from the power supply 68 is provided as an indication that power has been applied and is synchronized with the oscillator signal to provide a signal to the RESET input to reset microprocessor 58. Power supply 68 also provides the +V and −V voltages used throughout the circuit of controller/scheduler 44.

In addition, scheduler/controller 44 has two I/O ports 70 and 72 and a DTMF port 74, each of which are enabled by an I/O select circuit 76. Select circuit 76 has the A1 and A2 address bus signals, the RD, WR and M1 signals applied thereto. The WR and M1 signals enable I/O select circuit 76 to decode the A1, A2 and RD signals applied thereto and provide one of the RD1, RD2 and WR1 signals, which respectively enable I/O port 70, DTMF port 74 and I/O port 72. Generally, each of the ports 70 and 72 are used to permit microprocessor 58 to communicate with the various other modules in water heater and automation unit 28, that is transceiver 54, pager receiver 46, telephone interface 48 and relay and driver 50. Transceiver 54 provides a Receive (REC) signal and a Synchronization (SYNC) signal to scheduler/controller 44 and receives a Transmit (XMIT) signal from scheduler/controller 44. The SYNC signal is a 120 hertz signal manifesting the zero cross point of the normal power line signal and the REC and XMIT signals are serial data and control signals exchanged between transceiver 54 and scheduler/controller 44. Pager receiver 46 similarly provides a CLOCK signal and a DATA signal and responds to a READ signal provided thereto. Telephone interface circuit 48 provides a RING signal and a DTMF signal and responds to a TONE signal and a SEIZE signal in a conventional manner. Finally, the relay and driver circuit 50 responds to a RELAY signal which causes the relay therein to be open or closed, depending upon the value of the RELAY signal.

I/O port 70 is used to receive incoming signals and is selected by the RD1 signal from I/O select circuit 76 and, when selected, receives the last data values applied at the eight input ports, labeled "0" through "7", thereof and provides it to data bus DB. The "0" input is connected to receive the RING signal from telephone interface 48 and the "1" input is not connected. The "2" input of I/O port 70 is connected to ground through a push button switch 78 and the "3" and "4" inputs to I/O port 70 are connected to two poles of a three pole switch 80 respectively. Three pole switch 80 has its switching arm coupled to ground and the third pole thereof is left unconnected. The owner or installer may use the two switches 78 and 80 to clear the RAM memory 60 prior to initialization.

The 5 input of I/O port 70 is connected to receive the STD data signal from DTMF port 74, which indicates that data is ready to be sent on lines 0–3 of the data bus containing data received by telephone interface 48. DTMF port 74 is enabled by the RD2 signal form I/O select 76, and when the RD2 signal is received thereby, DTMF port 74 actually provides the binary data it has detected and decoded from the DTMF tones applied thereto from telephone interface 48. DTMF port may be any commercially available module, such as the MT8870 available from Mitel, Inc.

The "6" input of I/O port 70 is connected to receive the REC signal from transceiver 54, and represents one bit of data provided from one of the units 56 attached to transceiver 54. This data is provided in conjunction with the SYNC signal from transceiver 54, which is applied to clock circuit 66 and causes an interrupt signal to be provided to the NMI interrupt of microprocessor 58. When this occurs, the REC data is read by the microprocessor 58 by enabling I/O port 70.

The "7" input of I/O port 70 is connected to receive the DATA signal from a shift register 82. Shift register 82 operates in conjunction with pager receiver 46 and receives the PDATA signal and the CLOCK signal from pager receiver 46. The CLOCK signal also is applied to the INT maskable interrupt input of microprocessor 58 to cause an interrupt thereof whenever pager receiver 46 receives and has processed data.

Where pager receiver 46 is a commercially available twenty-three character digital receiver, it typically includes a twelve digit, seven segment display. The twenty-three digits are displayed in two groups of eleven and twelve digits each, with the twelfth digit of the first panel being a special character in the shape of a small "c" to indicate that there is a continuation of the message. In other receiver systems, the first panel includes twelve digits, with the last digit blinking as an indication that there is a continuation of the message. In both systems, the remaining twelve or eleven characters are displayed in the second panel. Scheduler/controller 44 captures the signals provided to the display by pager receiver 46 and then decodes the seven segment encoding to determine the digit, which is then converted to a binary code and stored in RAM memory 60.

Pager receiver 46 operates by causing the message to be displayed by issuing a serial PDATA signal of ninety-two bits and a CLOCK signal each time a bit of the PDATA signal occurs. As noted above, the CLOCK signal is applied to the INT input of microprocessor 58. Upon receiving the first interrupt, the program associated with microprocessor 58 disables the INT input for a period of time sufficient for all of the bits in the PDATA signal from pager receiver 46 to be entered into shift register 82. During this time, each bit of the PDATA signal is entered into the lowest register of shift register 82 by each CLOCK signal, with the remaining bits being shifted one stage higher. For a Motorola Model BPR2000 pager receiver, the digital data is detected and applied as a ninety-two bit serial signals manifesting a twelve digit seven segment display. Within the ninety-two bits, four bits are for special control characters and four bits are not used, leaving eighty-four bits to manifest twelve seven segment digits. It is this serial signal within the pager receiver 46 that is intercepted and applied as the PDATA signal to shift register 82.

I/O port 72 is used to provide signals to the various other modules in scheduler/controller 44. I/O port 72 receives the data to provide from data bus DB and is selected by the WR1 signal from I/O select 76. I/O port has eight output ports, labeled 0–7. Port "0" provides the READ signal to pager receiver 46, causing it to provide the second message panel of eleven or twelve characters to shift register 82. The READ signal is the electronic equivalent of depressing the Read button on a conventional pager, thereby allowing display of another message, or the remainder of a message. Port "1" is coupled to a light emitting diode (LED) 84, which is used to signal the user or serviceman of various status conditions of controller/scheduler 44.

Ports "2" and "3" of I/O port 72 provide the TONE and SEIZE signals to telephone interface 48 as a part of processing telephone communication between controller/scheduler 44 and the customer command center 22. Similarly, port "4" provides the XMIT data to transceiver 54 to cause the execution of commands by the various appliances 56 connected to transceiver 54. For example, an XMIT signal may be a series of bits causing a coffee pot to turn on, or a light to turn off. Port "5" provides the RELAY signal to set or reset the relay driver 50, typically for controlling a water heater. Port "6" is not connected.

Port "7" of I/O port 72 is the SRCLK signal, which is connected to form a logical OR with the CLOCK signal at the clock input of shift register 82. As explained above, the CLOCK signal clocks the PDATA bits from pager receiver 46. Once the data manifesting the first panel of the message is completely provided to shift register 82, it is transferred as the DATA signal to microprocessor 58 and decoded into the various digits it represents. This transfer occurs by the provision of an appropriate number of SRCLK signals from I/O port 72 under the control of microprocessor 58. The number of SRCLK pulses will depend upon the number of stages in shift register 82, as it is first necessary to move the ninety-two bits originally stored in stages zero to ninety-one to the end stages of shift register 82 before commencing the actual transfer of data. After all ninety-two bits are transferred to microprocessor 58, the READ signal is issued from port 0 of I/O port 72 and the second panel of signals is stored in shift register 82 and transferred to microprocessor 58 as just explained.

Figure 3B:
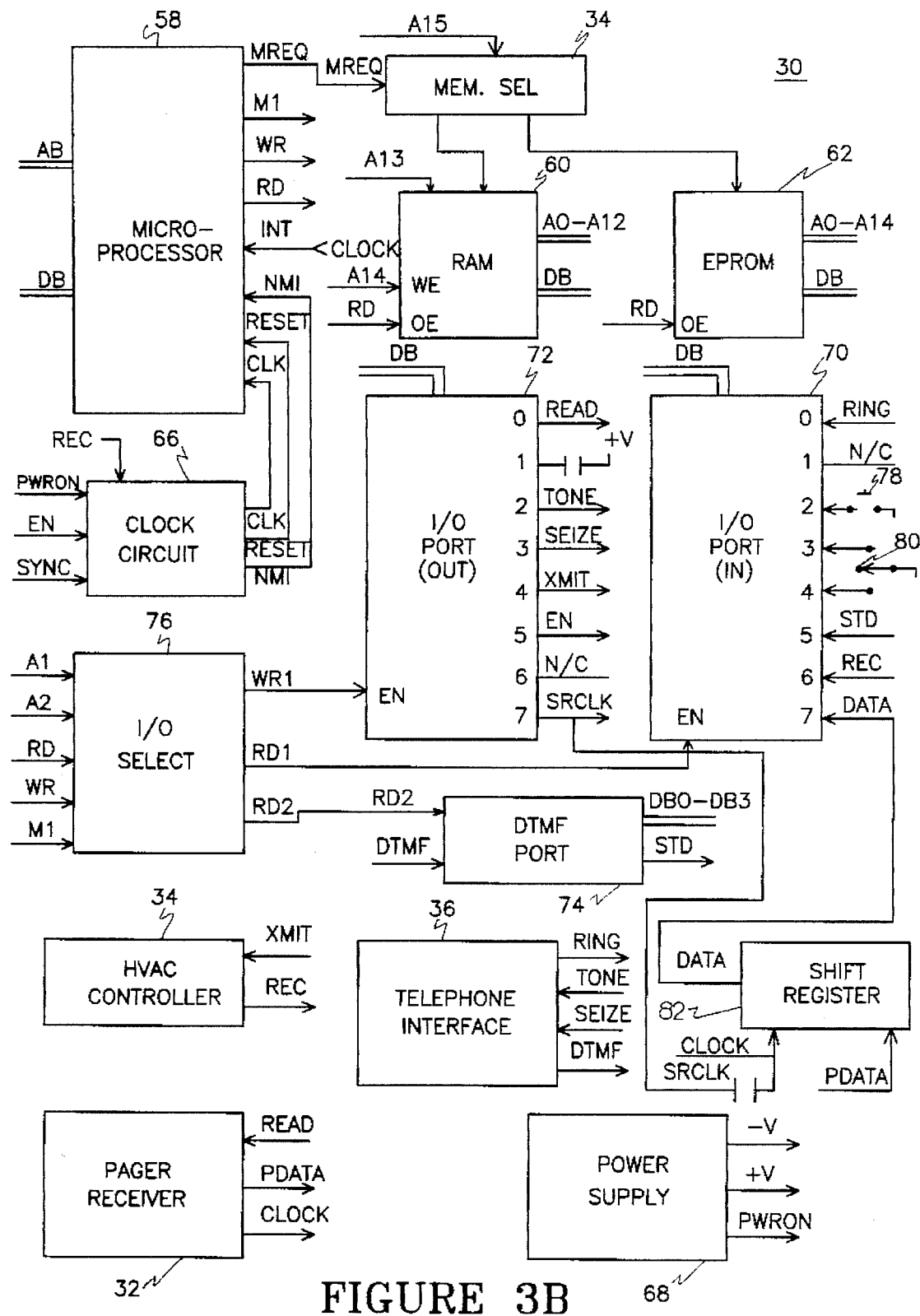
FIGS. 3B shows a more detailed block diagram of the scheduler/controllers of the HVAC control unit shown in FIG. 2.

Referring now to FIG. 3B, scheduler/controller 30 used with the HVAC control unit 34 is shown. Scheduler/controller 30 is essentially the same as scheduler/controller 44 shown in FIG. 3A and like number labels are used to represent like components. The differences between the two scheduler/controllers 30 and 44 is that scheduler/controller 30 controls the HVAC controller 34, which, in turn, controls the heating/cooling unit 38 and responds to information and commands from thermostat 42, instead of the transceiver 54 and relay and driver circuit 50 in scheduler/controller 30. HVAC controller 34 responds to data of the XMIT signal from port "4" of I/O port 72 and provides the REC signal to both port "6" of I/O controller 70. In addition, the REC signal from HVAC controller 34 is provided to clock circuit 66, along with an EN signal from port "5" of I/O port 72. The REC and EN signals are used to generate the non maskable interrupt, NMI, signal at a rate of 0.833 msec, which is at least ten times as fast as the NMI signal provided in FIG. 3A.

Referring now to FIG. 4, the programmable thermostat 42 used with the HVAC controller 34, is shown. Basically, thermostat 42 is a simple keyboard and display device with an internal temperature sensor. It is connected directly to HVAC controller 34 and is used to permit the user to set various parameters stored in memory associated with HVAC controller 34 for controlling the temperature and other operating conditions of the heating and cooling unit 38. As previously described, HVAC controller 34 includes its own microprocessor and a communication channel to permit microprocessor 58 in scheduler/controller 30 in FIG. 3B to read the user set parameters, as well as data internally generated by HVAC controller 34, and to provide various other commands and data values to HVAC controller 34.

Thermostat 42 has seven keys 84, respectively labeled WARMER, COLDER, ON, OFF, HOME, WAY AND SLEEP and a two digit display 86 which normally displays two numeric digits manifesting the sensed temperature. Display 86 is also capable of displaying letters of the alphabet to indicate the present mode of operation. For residences, the various user modes are HOME, AWAY, SLEEP, ON AND OFF, but for other facilities, such as commercial buildings, the modes are OCCUPIED, UNOCCUPIED, MAINTENANCE, ON and OFF. Thus, a commercial building thermostat similar to thermostat 42 would have the various keys labeled as WARMER, COOLER, ON, OFF, OCCUPIED, UNOCCUPIED and MAINTENANCE. In addition, there is also a SERVICE mode available for both residences and other facilities and is only to be used by the installer or repairman.

Thermostat 42 is electrically coupled to the HVAC controller 34, as seen in FIG. 2, and is one of the manners in which the heating, air conditioning and ventilation system of the facility can be controlled by the user. For a home, at any given time, the heating, ventilation and air conditioning management is set based upon whether the user is home, away or sleeping; hence, the HOME, AWAY AND SLEEP modes. The primary parameter of control are a series of setpoint temperatures, which are set by the user to determine operation during the various HOME, AWAY and SLEEP modes.

Generally, during the HOME mode, the home is maintained cooler if air conditioning is required and warmer if heating is required. During the AWAY mode, the home is maintained warmer if air conditioning is required and cooler if heating is required and during the SLEEP mode, the home is maintained at temperatures between the HOME and AWAY modes. During the ON mode, the HOME mode temperatures are used and, in effect, the ON mode merely overrides the AWAY or SLEEP modes to function as in the HOME mode. During the OFF mode, even lower heating and higher cooling setpoints than used in the AWAY mode may be utilized. For example, the OFF mode may be used during a vacation where an extended time away from the home is anticipated.

To program HVAC control unit 34, the various keys 84 on thermostat 42 are pressed. When the WARMER key 84 is pressed during normal operation, that is when display 86 is displaying the current temperature, display 86 displays the current mode (HO for HOME, SL for SLEEP and AY for AWAY). On the other hand, if display 86 is displaying a setpoint temperature (as a result of the user having previously pressed the HOME, AWAY or SLEEP keys 84, as discussed below), then pressing the WARMER key 84 increments the displayed setpoint temperature. Pressing the COOLER key 84 when the current temperature is displayed on display 86 has no effect. However, if a setpoint temperature is being displayed on display 86, then the setpoint temperature, as displayed, is decremented by pressing the COOLER key 84.

The ON and OFF keys 84 are used to override the previously set HOME, SLEEP and AWAY modes. This is done by controller timers contained in the software of scheduler/controller 34. Specifically, when ON key 84 is pressed, an ON timer is incremented in 0.1 hour increments (six minutes) up to a maximum of 9.9 hours. When the ON timer is set to 9.9, it does not decrement and thus is permanently set. During the time the ON timer is nonzero, the system is forced to the HOME mode, regardless of the times previously programmed for the various modes. When the OFF key 84 is pressed, the OFF timer is incremented in 0.1 hour increments to a maximum of 9.9. At a setting of 9.9 the OFF timer is not incremented, but when displaying any other value, it is decremented in real time back to zero. As long as the OFF timer is nonzero, the OFF setpoints are used in controlling the temperature by heating or cooling. A depression of either the ON or OFF keys 84, or any of the HOME, SLEEP or AWAY mode keys 84, when either of the ON or OFF timers have values remaining cancels the remaining ON or OFF time.

The ON and OFF keys 84 may also be used with the mode (HOME, SLEEP or AWAY) keys 84 to control the fan operation of the HVAC unit 38 when operating in that mode. Specifically, if a mode key 84 is pressed and the ON key 84 is pressed within two seconds thereafter, the fan is set to operate for that mode in a continuous manner and if the OFF key 84 is pressed within two seconds of pressing a mode key 84, the fan is set to operate in that mode in an intermittent manner, which is similar to the "automatic" setting of a conventional thermostat, that is, the fan only operates while or shortly after heating or cooling is occurring.

Each of the HOME, AWAY and SLEEP keys 84 are used to display the heating and cooling setpoints used in the various modes. As used herein, the setpoint is the temperature at which heating or cooling occurs. Thus, when the temperature in the facility falls to the heating setpoint, the heating unit is turned on and when the temperature in the facility rises to the cooling setpoint, the cooling unit is turned on. Generally, the first time one of HOME, AWAY and SLEEP keys 84 is pressed, the heating setpoint temperature is displayed for five seconds. If the same key 84 is pressed a second time while the heating setpoint temperature is being displayed, the cooling setpoint temperature is displayed for five seconds. Each displayed setpoint temperature may be increased or decreased using the WARMER or COOLER keys 84 during the five seconds the setpoint temperature being displayed, as described above.

If either of the HOME, AWAY or SLEEP keys 84 are held depressed for one half of a second, the time scheduler commands are overridden and that mode is entered. This new mode then remains until the scheduler senses the time for a programmed mode change. When in any of the HOME, AWAY or SLEEP modes, the fan may be set to operate either continuously, or intermittently with a thirty second overrun. It should be noted that the system is designed to prevent either heating or cooling unless the fan is on. In the HOME MODE, the building is heated to the home heating setpoint temperature and cooled to the home cooling setpoint temperature. The maximum home heating setpoint temperature the user is normally permitted to select is 80° F. and the minimum home cooling setpoint temperature the user can select is 70° F., although both of these home setpoint temperatures are adjustable in the SERVICE mode. The maximum heating and minimum cooling setpoint temperatures the user can select in the AWAY mode are 65° F. and 74° F. respectively, although these temperatures may be changed in the SERVICE MODE. The maximum heating and minimum cooling setpoints temperatures that the user can select in the SLEEP mode are 76° F. and 74° F. respectively, and again, these temperatures may be changed in the SERVICE mode.

In each of the HOME, SLEEP and AWAY modes, the heating and cooling setpoint temperatures cannot be set within two degrees of one another. If an attempt is made to adjust one of the setpoint temperatures to within two degrees of its opposite counterpart, the counterpart is automatically moved two degrees away.

The final mode is the SERVICE mode, which is normally only entered by a serviceman entering a prescribed sequence of key 84 depressions. For example, the sequence to enter the service mode may be COOLER, COOLER, HOME, ON and SLEEP, in that order. During the SERVICE mode, the system variables, such as the maximum or minimum setpoint temperatures in the various normal modes may be viewed, or, if desired, changed. Each of the various system parameters has a two letter code, which may displayed along with the setting, by pressing the HOME and AWAY keys 84. Once the value for a parameter is displayed, it then may be adjusted upward or downward by respectively pressing the WARMER or COOLER keys 84.

The various parameters and the initial setting for each parameter are given in table I below:

TABLE I

| Data Code | Parameter | Factory Setting | View Only | View & Change |
|---|---|---|---|---|
| dS | HVAC Code; DIP Switch Setting | AC-1C-1H | x | |
| OC | Off Mode Cooling Setpoint | 99 | | x |
| OH | Off Mode Heating Setpoint | 45 | | x |
| HH | Home Maximum Heating Setpoint | 80 | | x |
| HL | Home Minimum Cooling Setpoint | 70 | | x |
| AH | Away Maximum Heating Setpoint | 65 | | x |
| AL | Away Minimum Cooling Setpoint | 80 | | x |
| SH | Sleep Maximum Heating Setpoint | 76 | | x |
| SL | Sleep Minimum Cooling Setpoint | 74 | | x |
| bC | Button Counter in 0.1 seconds | .5 | | x |
| rC | Cooling Ramp Time in minutes | 10 | | x |
| rH | Heating Ramp Time in minutes | 10 | | x |
| Cr | Cooling Ramp Time in % | none | | x |
| CC | Cooling Control Signal in % | none | x | |
| Hr | Heating Ramp Time in % | none | | x |
| HC | Heating Control Signal in % | none | x | |
| FC | Metric/English Display | °F. | | x |
| Co | Condensate Alarm Response | C | | x |

The HVAC code refers to the manner in which switches 40 shown in FIG. 2, are set. The particular setting of the various switches 40, which are included in HVAC controller 34 to designate the type of HVAC unit being controlled. These switches are normally set during installation and need not be reset until the actual heating/cooling unit 38 is replaced or modified. Thus, no provision is provided to modify these switches in the SERVICE mode. Generally, switch number "7" is set to manifest the presence of either an air conditioning (AC) unit or a heat pump (HP) unit, switches "9" and "10" are set to designate the number of cooling stages in an air conditioning system or the number of compressors in a heat pump and switches "11" and "12" are set to designate the number of heating stages in an air conditioning system and the number of auxiliary heat strips.

The various setpoints can be adjusted, as explained above, by pressing the WARMER or COOLER keys 84 as the particular code and programmed temperature is displayed. The system is programmed so that the maximum setpoint temperature can never exceed 80° F. nor can the minimum setpoint temperatures be below 45° F. The button counter variable is the time, in 0.1 second increments, that the HOME, AWAY and SLEEP keys 84 must be held down in order to cause a switch to the selected mode. This time is initially set to 0.5 seconds, but may be varied by the user or the serviceman in the SERVICE mode.

The heating and cooling ramp time parameters are ramp cycle times in minutes and are used to control the heating and cooling cycles. Heating or cooling commands calling for heating or cooling functions may only be executed at the beginning of a ramp cycle, but the heating or cooling may be turned off at any time during a ramp cycle. The heating and cooling ramp percent parameters are determined as the current value, as a percent of the respective ramp times divided by the time between ramp signals. These values may be reset in the SERVICE mode using the WARMER and COOLER keys 84. The heating and cooling control signals which are internally generated in the HVAC controller using a modified proportional integral derivative algorithm and are used to drive the heating or cooling units.

The condensate alarm goes off when too much water is in the condensate pan and may be varied to either turn off cooling only (displays "C") or turn off the fan, heating and cooling units (displays "A").

Referring again to FIG. 3B, all of the data discussed above is maintained in a memory associated with the microprocessor in HVAC controller 34, along with other data used in the programmed operation of HVAC controller 34. For example, while all of the various setpoint temperatures are stored, a separate location is used to maintain the current mode setpoint temperatures. Further, other various memory locations are used to store operational flags, manifesting, for example, the operational status of certain elements of the heating/cooling unit 38, or whether the condensate alarm is on. Other locations of the memory contain the programmed instructions for causing various actions by the heating/cooling unit 38. For example, the heat may be turned on whenever the temperature measured by the temperature sensor in thermostat 42 indicates that the temperature in the facility is below the current mode heating setpoint.

While the various modes, particularly HOME, AWAY and SLEEP, discussed above, may be entered by the user operating thermostat 42, they are normally entered under the control of microprocessor 58. Within RAM 60, a schedule table is maintained which indicates the normal schedule of the user. The schedule is based upon eight different day entries, Sunday through Saturday and a Holiday. In addition, a counter is maintained in RAM 60 which is constantly updated in response to interrupts from Clock Circuit 66 to maintain the current time. Generally, the schedule table is maintained by time of day for each of the eight possible day entries and at the appropriate time, it sends appropriate messages using the REC and XMIT lines from and to I/O ports 70 and 72. For example, at the user programmed time for a change from the AWAY mode to the HOME mode, microprocessor 58 provides a signal causing a change in the schedule flags address of the memory in HVAC controller 34. Upon accepting the signal from microprocessor 58, the HVAC controller 34 provides an acknowledgment (ACK) signal to microprocessor 58, or if appropriate, a not acknowledged (NAK) signal. In response to the mode change signal, the program in HVAC controller 34 changes the currently active setpoint temperatures and the status flags.

The communications link between microprocessor 58 in scheduler/handler 30 and HVAC controller 34 uses a 1200 baud multidrop serial asynchronous communication protocol. Each command begins with an address character, followed by a stated number of additional characters and ending with a checksum character. Each character in the communication contains eleven bits, the first of which is a start bit and the second is a "1" if the character is an address character and a "0" if the character is a non-address character. The next eight bits of a character contain binary data and the eleventh bit is a stop bit. All commands are initiated by microprocessor 58 in scheduler/controller 30 and HVAC controller 34 merely responds to the command it receives. Microprocessor 58 sends two basic types of commands, Read and Write. HVAC controller 34 responds to a Read command by providing a variable length Response including the requested data and responds to a Write command by providing either an ACK (acknowledgment) or a NAK (not acknowledged).

The Read command contains eight characters, beginning, as follows:

1. an Address character,
2. a Length character containing the binary number "00000111", indicating six characters following the Address character,
3. a code character containing the binary code "10000100",
4. a character indicating the trunk to which HVAC controller 34 is connected, which is not used in the embodiment described herein and thus may contain any binary code,
5. a character indicating the address of HVAC controller 34, which is not used in the embodiment described herein and thus may contain any binary code,
6. a Start character, which may be a number between 0 and 255,
7. a character containing the number of bytes to be read, and
8. a Checksum character, which is the sum of all characters, except the address character, preceding the checksum character.

The HVAC controller 34 responds with a variable message containing the data requested, which takes the following form:

1. an Address character,
2. a Length character containing the binary number which indicates the number of characters following the Address character,
3. a code character containing the binary code "10000101",
4. a character indicating the trunk to which HVAC controller 34 is connected, which is not used in the embodiment described herein and thus may contain any binary code,
5. a character indicating the address of HVAC controller 34, which is not used in the embodiment described herein and thus may contain any binary code,
6. a Start character, which is the same as the Start character in the Read command'
7. Data character 1 . . .
8. Data character N, and
9. a Checksum character, which is the sum of all characters, except the address character, preceding the checksum character.

The Write command is of a variable length, and is organized as follows:
1. an Address character,
2. a Length character containing the binary number which indicates the number of characters following the Address character,
3. a code character containing the binary code "10000110",
4. a character indicating the trunk to which HVAC controller 34 is connected, which is not used in the embodiment described herein and thus may contain any binary code,
5. a character indicating the address of HVAC controller 34, which is not used in the embodiment described herein and thus may contain any binary code,
6. a Start character, which may be a number between 0 and 255,
7. a character containing the number of data bytes to be written,
8. Data character 1 . . .
9. Data character N, and
10. a Checksum character, which is the sum of all characters, except the address character, preceding the checksum character.

The ACK message is returned by HVAC controller 34 if it accepts the write command message, and takes the form:
1. an Address character,
2. a Length character containing the binary number "00000011", indicating three characters following the Address character,
3. a code character containing the binary code "00100000", and
4. a Checksum character, which is the sum of all characters, except the address character, preceding the checksum character.

The NAC message is returned by HVAC controller 34 if it has not accepted the write command message for some reason, usually because the checksum is not verified, and takes the form:
1. an Address character,
2. a Length character containing the binary number "00000011", indicating three characters following the Address character,
3. a code character containing the binary code "00100001", and
4. a Checksum character, which is the sum of all characters, except the address character, preceding the checksum character.

Referring again to FIG. 3A, the communication between microprocessor 58 and transceiver 54 for controlling home automation is generally similar to that described above, except that the conventional and well known X-10 protocol is followed. However, it should be noted that other types of communication buses or links between the transceiver 54 and various devices 56 may be used in place of the X-10 bus, and in such case, the protocols of those other types of buses or links would be followed.

While the manner in which programmable thermostat 42 is used to control many of the HVAC controller 34 parameters has been described at length above, the primary manner of changing either the HVAC controller 34 parameters or the water heater and automation control unit 28 parameters, particularly after the initial installation, is done using any common telephone to cause the customer command center computer 22 to send a paging message. An example of when such a change would be desired is when a person, who normally leaves work at 5:00 PM, desires to work late or go out for dinner. Since that person normally arrives home at, for example, 5:30 PM, the home is controlled to switch to the HOME mode for heating and air conditioning at 5:30 and no lights are automatically turned on by the home automation system. With a simple telephone call to the control center computer 22 (seen in FIG. 1), that person can cause the HVAC controller to remain in the AWAY mode, thereby saving energy, and can further cause the outside lights and one or more inside lights to automatically turn on to give the presence that the home is occupied.

The manner in which the control pursuant to the example of the preceding paragraph occurs is by customer command center computer 22 causing an appropriate message to be sent to the scheduler/controllers 30 and 44 in a designated facility. According to the preferred embodiment of this invention, these messages may be sent using conventional and available paging messages broadcast by, for example, the local telephone companies. With a twenty-three digit numeric paging message being used to transmit the message, nine different types of messages may be transmitted and the microprocessors 58 in either scheduler/controller 30 or 44 are designed to accept these messages and respond, under program control, in an appropriate manner. Also, a tenth message type is available for other message formats, such as the 80 character alpha-numeric type of paging messages. The ten types of message formats are set out below in Table II.

TABLE II

Figure 5:
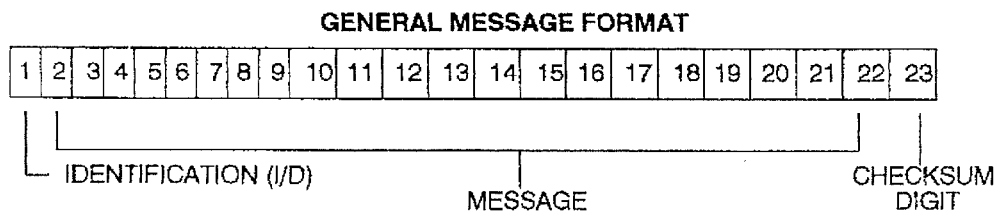
FIG. 5 illustrates the general format of a paging message sent from the customer command center computer to a pager receiver in a control unit.

0—Schedule Information
1—Schedule Information
2—Time, Date and Daylight Information
3—Weather Message
4—Initialization Message
5—Utility Company Setup Message
6—Utility Company Override Message
7—Customer Override Message
8—System Parameter Message
9—Other Paging Format Referring now to FIG. 5, a diagram generally representing any of the various twenty-three character messages is shown. As seen from FIG. 5, the message consists of twenty-three characters, each being one of the digits "0" through "9". The first character of the message is an identification (I/D) digit manifesting the type of the message, based upon the listing in Table II above. Thus, if the message sent is a Weather message, the first character contains the character information manifesting the digit "3". The next 21 characters contain the information of the message, as described in detail below, and the final character contains a parity, or checksum digit, which may based upon the sum of the digits of the first twenty-two characters.

Whenever a message is transmitted, it is received by every control unit 26 and 28 within every facility 12 responding to the particular phone number of the paging message. When the twenty-three character paging message is used, up to 1000 different control units 26 and 28 may share the same phone number and each is given an address code of "000" through "999". Some paging messages are to be acted upon by all control units 26 and 28, while others are addressed only to a specific control unit 26 or 28, and only that addressed control unit 26 or 28 responds. Further, the type of control unit 26 or 28 receiving the message will determine, in part, the information content of the message. For example, a type "0" Schedule Information message addressed to a HVAC control unit 26 will manifest different information than a type "0" message sent to a water heater and automation control unit 28.

Figure 6:
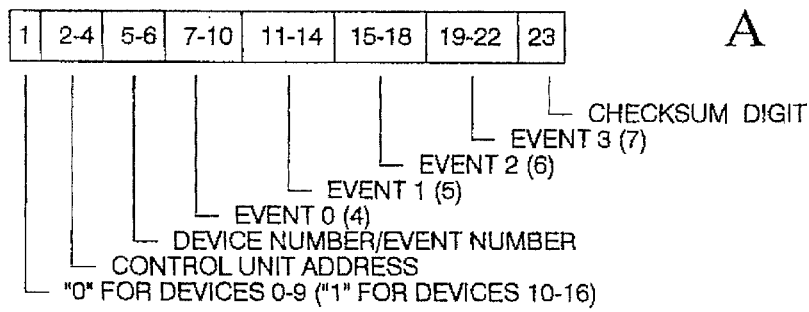
FIG. 6, having diagrams A, B and C, illustrates the makeup of the Schedule Information message sent from the customer command center computer to a pager receiver in a control unit.
Figure 6:
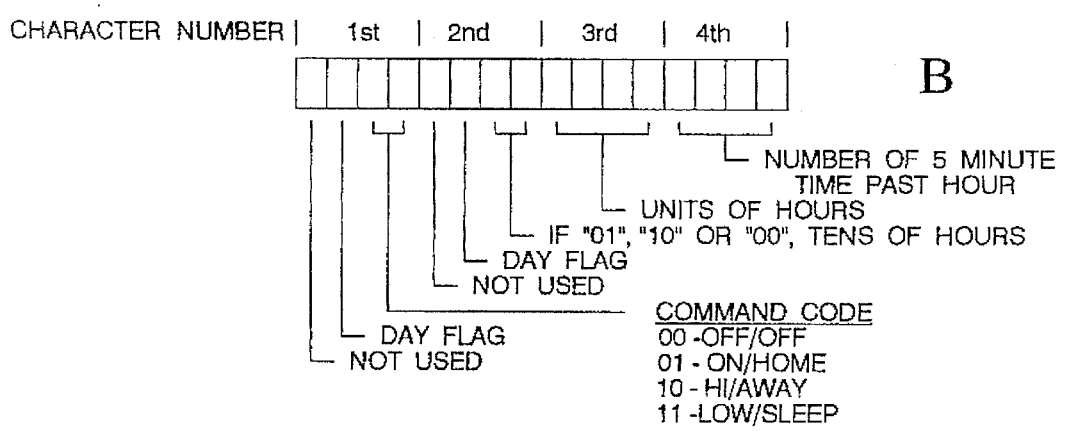
Figure 6:
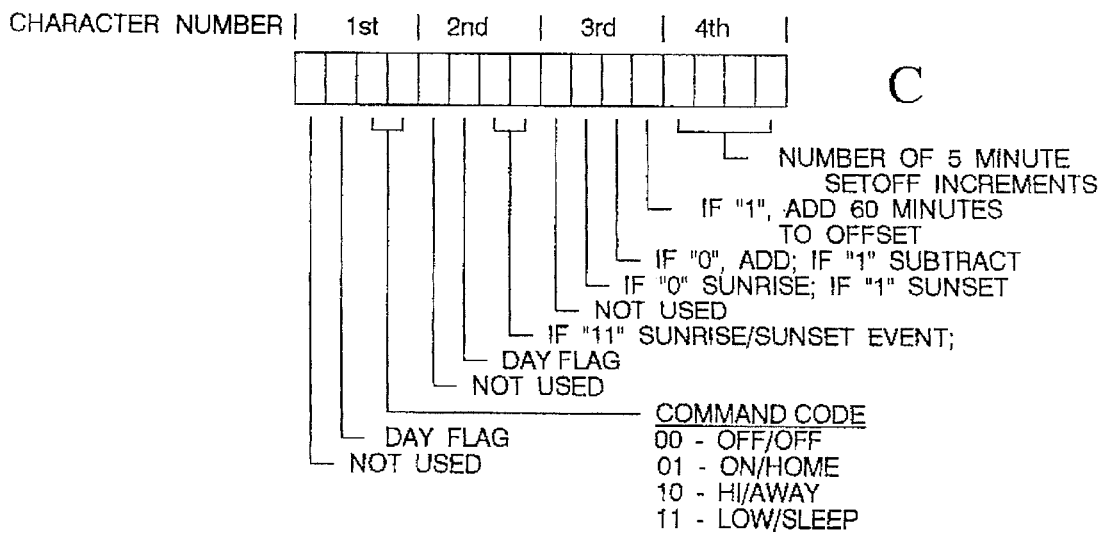

Referring now to FIG. 6, three diagrams, labeled A, B and C, useful in understanding the Schedule Information messages are shown. As noted from Table II, there are two different Schedule Information messages and these are distinguished by the first character being either "0" or "1". The difference is that a Schedule Information message beginning with "0" is for controlling the schedule of devices "0" through "9" being controlled by water heater and automation control unit 28, whereas a Schedule Information message beginning with "1" is for devices "10" through "16" being controlled by water heater and automation control unit 28. For an HVAC control unit 26, either type message may be used.

Diagram A of FIG. 6 illustrates the format of the twenty-three characters of a Schedule Information message. As seen, the first character is either a "0" or a "1" and manifests that, if the message is addressed to a water heater and automation control unit 28, it contains schedule information for either devices "0" through "9" if the first character is a "0" or devices "10" through "16" if the first character is a "1". It should be noted that the water heater 52 is always device "0" and the various devices 56 attached to transceiver 54 are devices "1" through "16". Then particular designation of each device being controlled is set using the protocols of the X-10, or other communication link, system being utilized.

The second through fourth characters of the Schedule Information message is an address code for the controller to which the Schedule Information message is intended to be sent. This may be any number between "000" and "999". Each scheduler/controller 30 and 44 is assigned with a specific address of between "000" and "999", which address is unique to that scheduler/controller. This address may be stored in the EPROM memory 60, or it may be hard-wired within the scheduler/controller. Generally, when a signal is received, the program controlling each scheduler/controller 30 or 44 looks at the signal to see if it should react. For global signals, such as time and date information, a reaction is programmed to always occurs. For other signals, the program must examine the address code to see if the signal is intended for that scheduler/controller 30 or 44.

The fifth and sixth characters represent the device number being addressed, (fifth character) and the event information (sixth character). The fifth character will be any number between "0" and "9" and represents devices "0" to "9" if the first character is a "0" and devices "10" to "16" if the first character is a "1". The sixth character may be any number between "0" and "7", which can be converted to a three bit binary code by microprocessor 58. After such conversion, the two low order bits represent how many event commands follow and the high order bit is set if the message is the second of a two part event message. A schedule for any device can consist of up to eight different events, such as turn on a device at a particular time or turn off a device at a particular time. However, each of the Schedule Information signals only contains sufficient room for four event commands, and thus, where more than four are needed, a second Schedule Information signal is needed and this is indicated by the sixth character being one of the numbers four through seven.

Following the sixth characters are four event commands of four characters each. The first event command is contained in characters seven through ten, the second event command in characters eleven through fourteen, the third event command in characters fifteen through eighteen and the fourth event command in characters nineteen through twenty-two. Diagram B of FIG. 6 illustrates any of the four character event commands, where the four characters of each event command are labeled only as first, second, third and fourth. For the first two characters of an event command, only the digits zero through seven may be used, and these digits are then converted into a three bit binary code by microprocessor 58. Hence, the first and second characters are shown as containing a "Not Used" most significant bit.

The high order bits of the three bits used in the first and second characters of each of the four event commands are dedicated to defining a day designation; hence they are referred to as the day flags. Since there are eight bits available for the day flag (two in each of the four event commands) each of the eight day designations, Sunday through Saturday and Holiday, may be specified by simply placing a "1" in the appropriate location of the appropriate command. It should be recalled at this point that each Schedule Information message is limited to one device for one day, with a maximum of eight different events for that device on that day being controllable.

Generally, an event command for water heater and automation control unit 28 will be an "on" or "off" command, followed by a time to execute the command, although for some appliances, such as lights with dimmers, intermediate degrees of "on" are possible. An event signal for the HVAC control unit 26 is a mode change at a specified time. In any case, the time may be a specified time, or it may be an offset from either sunrise or sunset.

As seen in Diagram B of FIG. 6, the higher ordered bits are shown on the left and the lower ordered bits are shown on the right. The highest order bits of the first and second character are not used and the second highest order bits are dedicated to the day flag, as explained above. The two low order bits of the first event command character manifest the command itself. For a Schedule Information message being provided to water heater and automation control unit 28, the two bit command to the device designated in character five may be as follows:

"0-0"–Off

"0-1"–On

"1-0"–High

"1-1"–Low

The "High" and "Low" manifestations are intermediate settings of a dimmable light, for example. For a Schedule Information message provided to the HVAC control unit 26, the two bit command is to enter the designated mode, at the time set out in the remainder of the event command. The designated modes are represented as follows:

"0-0"–Off

"0-1"–Home

"1-0"–Away

"1-1"–Sleep

The remainder of the Schedule Information message is dedicated to setting forth the time at which the command is to be executed. This time may be expressed either as an absolute time, or as an offset form either sunrise or sunset. If a sunrise or sunset offset time is being expressed, then the two low order bits of the second character will be binary "1-1", as seen in Diagram C of FIG. 6. Otherwise the two low order bits of the second character will manifest the tens digit of the absolute time, as seen in Diagram B of FIG. 6. As seen in Diagram B, for a non-sunrise/sunset time, the third character of the event command is the units digit of the hour and the fourth character represents the number of five minute increments past the hour designated by the second and third characters. With this arrangement, any time on a twenty-four hour basis in five minute increments, except times ending in XX:50 and XX:55 can be selected. While this is somewhat of a limitation, most events will be programmed on a quarter hour basis, and thus, the inability to program the occurrence of an event at fifty or fifty-five minutes past the hour is not significant.

Referring to Diagram C of FIG. 6, the organization of the information for a sunrise/sunset offset is shown. The first two characters and the fourth character are as described with respect to Diagram B of FIG. 6. However the third character, for a sunrise/sunset offset time is limited to digits zero through seven, which converts to a three bit binary code. When the high order bit is a "1", it designates an offset from sunset and when it is a "0", it designates an offset from sunrise. If the middle bit of the three bits of the third character is a "1", the offset is to be subtracted from the designated sunrise or sunset. On the other hand, if the middle bit of the three bits of the third character is a "0", the offset is to be added to the designated sunrise or sunset. If the low order bit of the third character is "1", then sixty minutes is to be added to the zero to forty-five minutes value in the fourth character. If the low order bit of the third character is a "0", then the value in the fourth character is the offset.

Figure 7:
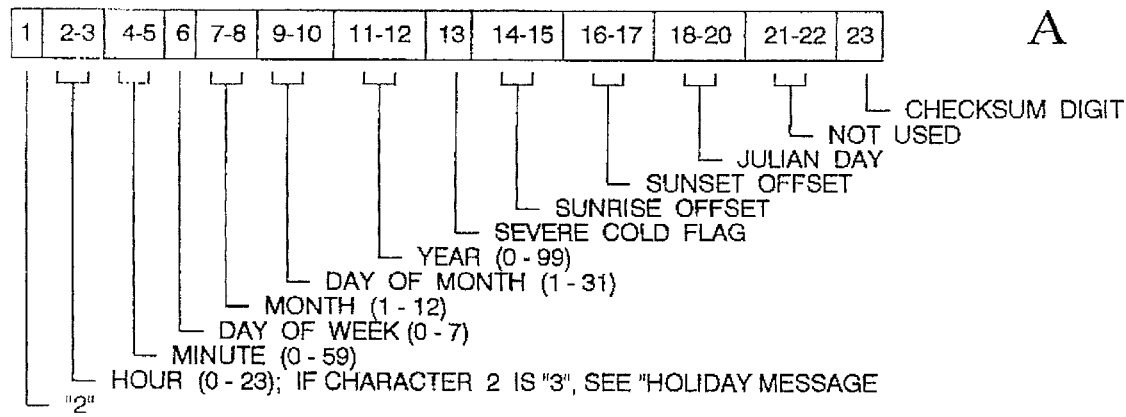
FIG. 7, having diagrams A and B, illustrates the makeup of the Time, Date and Daylight message sent from the customer command center computer to a pager receiver in a control unit.
Figure 7:
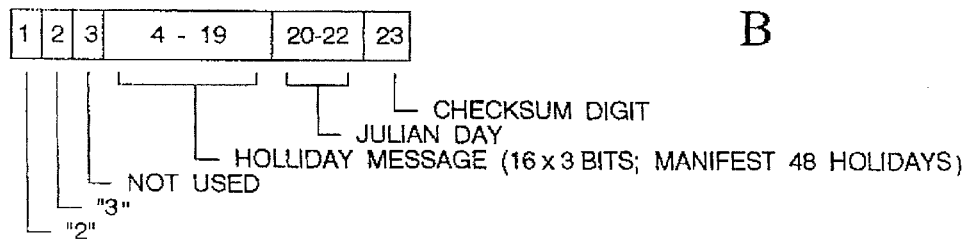

Referring now to FIG. 7, two Diagrams A and B, are shown. Diagram A illustrates the composition of the Time, Date and Daylight Message is shown and Diagram B illustrates the Holiday message. The Time, Date and Daylight message of Diagram A and the Holiday message shown in Diagram B are provided to all control units 26 and 28 which respond to the pager telephone number. The Time, Date and Daylight message of Diagram A is periodically provided, such as every fifteen minutes, in order to maintain the correct time for all control units 26 and 28 and in order to provide certain severe cold weather information in a timely manner. In addition, the time of sunrise and sunset is adjusted every day. The Holiday message, seen in Diagram B of FIG. 7, on the other hand, is only provided twice a day on the day before the designated holiday.

Referring specifically to Diagram A of FIG. 7, the I/D in the first character is a "2", indicating either a Time, Date and Daylight message or a Holiday message. For a Time, Date and Daylight message, characters two through five indicate the time, with characters two and three manifesting the current hour on a twenty four hour basis, and characters four and five manifesting the minute. In character two is a "3", then the Holiday message, shown in Diagram B, is indicated, as no hour can begin with a tens digit of three. Character six is a code from zero to seven indicating the day of the week. Specifically, characters zero through six represent Sunday through Saturday respectively, and character seven represents a holiday.

The next six characters of the Time, Date and Daylight message represent the current date, with characters seven and eight representing the month, characters nine and ten representing the day of the month and characters eleven and twelve representing the last two digits of the year. Character thirteen is severe cold temperature flag, which is set whenever very cold weather is anticipated and used in disabling a heat pump and enabling heat strips. Finally, characters fourteen and fifteen are an offset value from 4:00 AM in five minute increments to sunrise and characters sixteen and seventeen are an offset value from 4:00 PM in five minute increments to sunset. Characters eighteen through twenty represent the Julian Day count, which is the cumulative day count in any year, beginning with January 1 as day one. Characters twenty-one and twenty-two are not used and normally are zero and character twenty-three is a checksum digit.

The Time, Date and Daylight message is also used by each of the control units 26 and 28 to reset the proper time after a power outage. It should be noted that the power supply includes a large capacitor attached to the power output supplying RAM 60. This capacitor maintains power for up to two weeks in the event of a power outage, so the data stored in RAM 60 is not lost. However, the clock circuit 66 and microprocessor 58 are not operated during power outages and thus the time and date needs to be updated. Thus, the Time, Date and Daylight message is provided frequently, such as every fifteen minutes, to update the time and date information.

Diagram B of FIG. 7 shows the composition of the Holiday message, which is indicated if character one is a "2" and character two is a "3". Character three is not used and the sixteen characters four through nineteen are each limited to digits "0" through "7". Thus, the sixteen digits in characters four through nineteen may be used to represent forty-eight different pre-designated holidays by decoding these digits to a binary coded decimal format and ignoring the high order bit. As will be explained hereafter with respect to the initialization message in FIG. 9, each user of system 10 may designate only those of the pre-designated available holidays that are appropriate to the user's life style. In addition, users may designate their own holidays using the system parameter message shown in Diagram F of FIG. 13B. Finally, characters twenty through twenty-two of the Holiday message of Diagram B of FIG. 7 represent the Julian day and character twenty-three is a checksum, digit.

Figure 8:
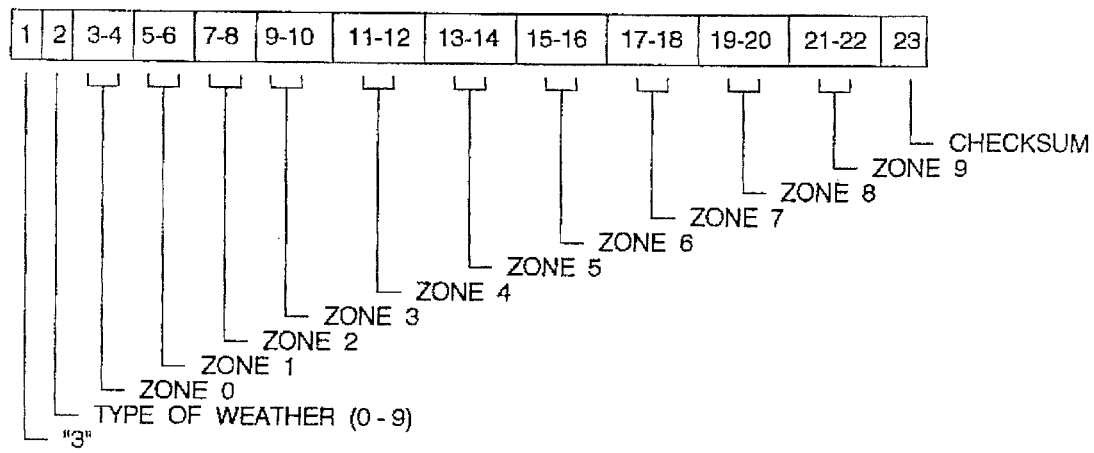
FIG. 8 illustrates the makeup of the Weather Information message sent from the customer command center computer to a pager receiver in a control unit.

Referring now to FIG. 8, a diagram illustrating the Weather Information message is shown. The Weather Information message begins with an I/D code of "3" and is broadcast to all control units 26 and 28, either when the weather changes, or alternately, one or more of these messages may follow the broadcast of the Time, Date and Daylight message. The second character is a number between zero and nine manifesting a type of weather indicator. For example, rainy, cloudy, humid, hot, sunny, and so forth may be represented by different numbers in character two. The next twenty characters manifest a two digit value for the identified weather information in each of ten different weather zones. A "00" in a zone portion of the weather message indicates that no change from the last weather message has occurred and any other number may indicate the degree of the type of weather indicated by the digit in character two. Each control unit 26 and 28 is programmed to know into which zone it falls, and thus, there the weather information is more localized than the area served by the paging transmitter. The final digit of the weather message is the checksum digit.

Figure 9:
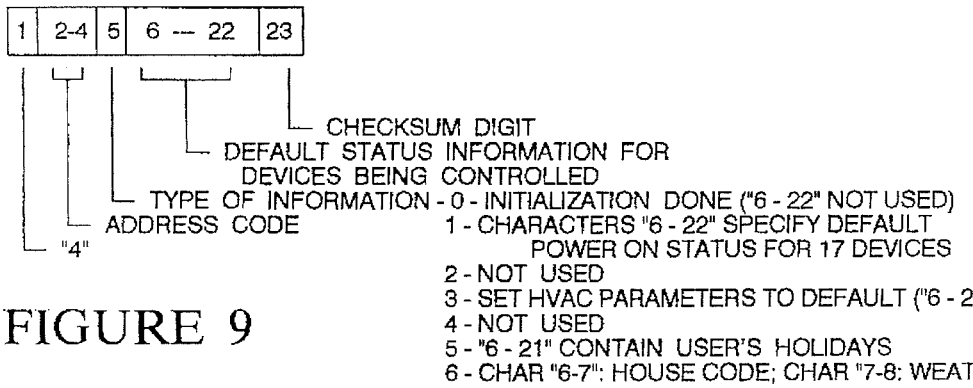
FIG. 9 illustrates the makeup of the Initialization message sent from the customer command center computer to a pager receiver in a control unit.

Referring now to FIG. 9, a diagram illustrating the Initialization message is shown and begins with an I/D code of "4". The Initialization message is generally provided in response to a telephone call to the customer command center computer 22, normally by an installer, at the time the customer premise equipment is installed. The Initialization message may be used to set the various parameters to the predefined default values, or it may be issued merely to see if the pager receiver 32 or 46 is set in the facility at a location to receive pager signals. The second through fourth characters manifest the address of the particular control units 26 and 28 requesting the initialization. The fifth character may be "0", "1", "3", "5" or "6" to indicate the type of information being transmitted in the following characters. Finally, the twenty-third, or last digit, is a checksum digit.

Specifically, if character five is a "0", then no data follows and if character five is a "1", then the data in the locations six through twenty-two is the default settings for various seventeen devices being controlled by facility automation control unit 28. These characters may each contain a value between zero and three. Similarly, if character five is a "3", then the data in characters six through twenty-two is the default settings for various HVAC parameters used in HVAC control unit 26. If character five is "5", then the data contained in characters six through twenty-one manifests the suer's selection of the appropriate pre-designated holidays. The encoding for characters six through twenty-one is the same as described above with respect to characters four to nineteen in Diagram B of FIG. 7. Finally, if character five contains the value "6", then characters six and seven contain a two digit house code and characters seven and eight contain a two digit weather region. This information is used to designate the weather zone for the user in order to respond to the weather message shown in FIG. 8.

Figure 10:
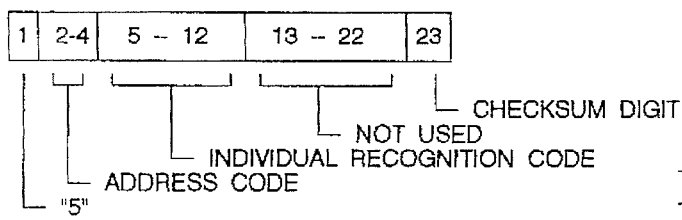
FIG. 10 illustrates the makeup of the Utility Company Setup message sent from the utility command center computer to a pager receiver in a control unit.
Figure 11:
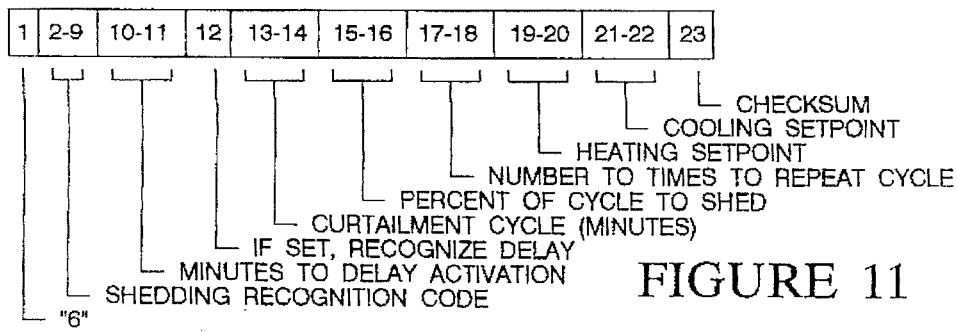
FIG. 11 illustrates the makeup of the Utility Company Initialization message sent from the customer command center computer to a pager receiver in a control unit.

Referring now to FIGS. 10 and 11, two messages initiated by a electric power utility company may also be sent to individual ones of the control units 26 and 28. These messages are used by the utility company to assist it in more equitably reducing power consumption under circumstances when the potential demand for power exceeds the ability of the utility company to generate power. In the past, the utility company has turned off the power completely for selected user groups or load groups when load reduction was required. In the past, there has been no ability for the utility company merely reduce the energy usage of selective devices, as opposed to completely disabling the devices for predetermined periods of time.

Alternate methods of reducing power loads are preferable to completely eliminating the power from an entire neighborhood. For example, a reduction in power consumption can occur by raising the temperature which all air conditioners begin cooling and this reduction in power consumption over a slightly wider area may be as great as the consumption reduction from turning off all power to a given neighborhood. Alternatively, a reduction in power may be achieved by merely permitting an air conditioner or water heater to run for only a certain time, or to run only after a certain time has elapsed since the last operation. In the latter cases, the convenience for the consumer is much better since all power is not reduced and some air conditioning or hot water generation is still available. The two utility company messages shown in FIGS. 10 and 11, operating in conjunction with the other equipment described above, permits an improved manner of permitting a utility company to reduce consumption.

The Utility Setup Message, seen in FIG. 10, begins with an I/D character of "5" and is sent to a specific control unit 26 or 28 addressed by characters two through four. Following the control unit address, an eight digit Individual Recognition Code contained in characters five through twelve is sent and stored in the RAM memory 60 associated with microprocessor 58. The particular eight digit Individual Recognition code is developed by the utility company in order to permit equitable power reduction among its customers and may be unique for each control unit 26 or 28, or unique for every control unit 26 or 28 in a selected area. It should be noted that the Utility Company Setup message is only sent to those customers of the utility company agreeing to participate in the power reduction program, for which the utility company must give some concessions, such as a lower rate to encourage participation.

In the recognition code, only the digits zero through eight are used, so that when the code is later addressed by the Utility Company Activation message, the character nine can be used as a wildcard, or a digit not requiring a match to be recognized. An example of a recognition code may use the first digit to designate the particular utility company, the next two digits to designate a utility company division, the next three digits to designate a region within a division, and the final three digits to identify a sector within a region. It is necessary to use at least one character to designate the particular utility company because the area served by a paging system may cover areas covered by more than one utility company.

Once each participating facility has been setup with a recognition code, the utility company can selectively address those control units 26 and 28 for which it desires to reduce consumption. This is accomplished by transmitting the Utility Company Activation message, seen in FIG. 11. The Utility Company Activation message is broadcast to all control units 26 and 28 and begins with the I/D character "6". Next the message has an eight digit Shedding Recognition Code, which is generated by the utility company to access those control units 26 and 28 which are to be controlled to use less power. Because of the ability to use the wildcard digit "9" in the recognition code, a large number of control units 26 and 28 may be reached using a single message, or alternatively, only those control units 26 and 28 in a specific territory requiring load reduction may be selected. For example, a recognition code of 19999008 may address every control unit 26 or 28 served by utility company "1" within sector 008 of all regions and divisions. After the Shedding Recognition Code, the remainder of the Utility Company Activation message contains various instructions and parameters dictating the manner in which the loads are to be reduced.

It should be understood that each of the HVAC control units 26 only control heating and air conditioning units, so the program therein responds to the Utility Company Activation message in a manner consistent with reducing the power consumption of a heating or cooling unit. On the other hand, the water heater and automation control unit 28 controls both a water heater, which consumes a substantial amount of energy and up to sixteen additional devices, such as lights, pumps, appliances and the like, which typically do not consume as much power. Thus, the water heater and automation control unit 28 may be programmed to only respond to power curtailment for the water heater, but not for the remaining items, such as lights and small appliances, being controlled. This is easily done, since the water heater is always device zero, whereas the remaining devices being controlled may be assigned any device number from one to sixteen.

The remaining data in the Utility Company Activation message permits various load reduction strategies to be adopted. For example, characters ten and eleven contain a two digit number manifesting, in minutes, a time to delay activating the load reduction operation. Character twelve, if set, indicates that the delay is to begin and end in a randomized manner over the set delay time, so that all units do not turn on at the same time after the reduction period. This technique permits total deactivation of the energy consuming device in a randomized order if desired.

The next six characters of the Utility Company Activation Message permits the energy usage of the heating/cooling units 38 or water heater 52 to be reduced, but not totally taken out of service. Specifically, characters thirteen and fourteen contain a two digit entry representing a time, in minutes, of a curtailment cycle, characters fifteen and sixteen contain a two digit number representing the percent of the cycle during which the load reduction is to occur and characters seventeen and eighteen contain a two digit character representing the number of times to repeat the cycle. With this data, the control units 26 and 28 respond by disabling the heating/cooling units 38 or water heater 52 for a certain percentage of each defined cycle time. For example, a cycle may be defined as thirty minutes and the percent of the cycle to reduce the load may be fifty percent; thus, during the first fifteen minutes of each half hour, the water heater 52 or heating/cooling unit 38 is disabled. Further, this cycle may be repeated as many times as directed.

The next four characters of the Utility Company Activation message is used only with respect to HVAC control units 26. Characters nineteen and twenty contain a two digit heating setpoint temperature and characters twenty-one and twenty-two contain a cooling setpoint temperature. By sending a Utility Company Activation message with these setpoint temperatures, the utility company can merely affect at what temperatures the heating or cooling occurs. For example, in hot weather, the utility company can limit air condition to a certain temperature, such as for example, 84° F. and in cold weather, the utility company can limit the temperature at which heating occurs, such as for example 65° F. In the past, it has never been possible to adopt a mandatory power load reduction strategy by merely adjusting the interior temperatures at which heating or cooling occurs. However, power companies have historically requested voluntary compliance with this type of strategy without the ability to enforce adherence.

Figure 12:
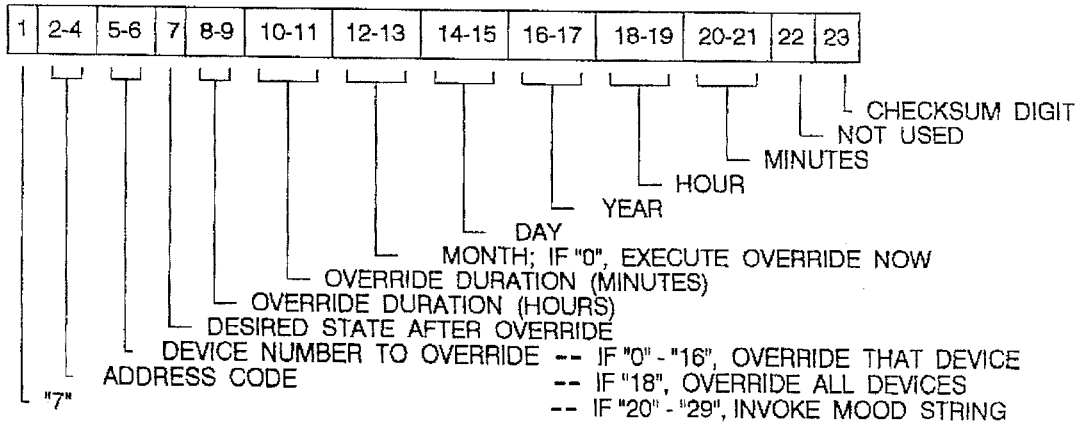
FIG. 12 illustrates the makeup of the User Override message sent from the customer command center computer to a pager receiver in a control unit.

Referring now to FIG. 12, a diagram illustrating the User Override message is shown. As previously noted, the user can manually override certain modes in the HVAC control unit 16 using the ON key 84 of thermostat 42. Generally, an override means to return the unit being controlled to the normal setting when the facility is occupied. In the case of HVAC control unit 26, this means returning the mode to the HOME mode of operation where the temperature heating setpoints are at the highest value and the cooling setpoints are at the lowest value. With respect to the water heater and automation control unit 28, the water heater, for example, will be permitted to heat the water, whereas the normal schedule for the water heater is to be disabled during periods of time no one occupies the facility.

In certain instances, a user of system 10 may desire to return home prior to a normal return time, and in such instance, would want the home at the proper HOME mode temperature and the water heater ready to provide sufficient hot water for a shower. This can be done by simply calling the customer command center computer 22 and directing that the control units be overridden for certain energy consuming devices. The manner in which the user communicates with the customer command center computer 22 will be described hereafter. After a proper order has been received by the customer command center computer 22, the User Override message is transmitted over the paging network.

As seen in FIG. 12, the first digit of the User Override message is a "7", and is followed by the three digit address code for the control unit 26 or 28 being overridden. Next, characters five and six contain a two digit code manifesting the device number of the device to be overridden. Thus, normally, characters five and six will contain a value between zero and sixteen. If the value in characters five and six is eighteen, then all devices being controlled are designated to be overridden to the default value. Finally, if the value in character 5 is a two, then, the override is designated to a specific set of states for the devices being controlled. This is referred to herein as a mood string and may be any combination of devices operating previously designated by the user.

Next, character seven contains a single digit manifesting the desired state of the device after the override. This digit may be between zero and three and may be similar to the Command code in an Event command of the Schedule Information message, as described above with respect to diagram B of FIG. 6. Next, the User Override message contains, in characters eight through eleven, four digits representing the hours and minutes of the desired override.

In some instances, the user does not desire to have the override occur until some point of time in the future, as opposed to immediately. In order to permit this future scheduling of override messages, characters twelve through twenty-one permit a date and time for the override to occur. Specifically, characters twelve and thirteen contain a two digit code representing the month in which the override is to occur, characters fourteen and fifteen contain a two digit code representing the day of the month in which the override is to occur, characters sixteen and seventeen contain a two digit code representing the year in which the override is to occur, characters eighteen and nineteen contain a two digit code representing the hour at which the override is to occur and characters twenty and twenty-one contain a two digit code representing the minute at which the override is to occur. In this scheme, character twenty-two is not used and as usual, character twenty-three is a checksum digit.

Figure 13A:
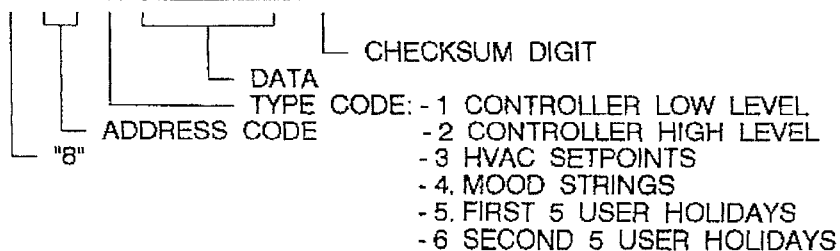
FIGS. 13A and 13B, having diagrams A, B, C, D, E and F, illustrates the makeup of the System Parameter message sent from the customer command center computer to a pager receiver in a control unit.
Figure 13A:
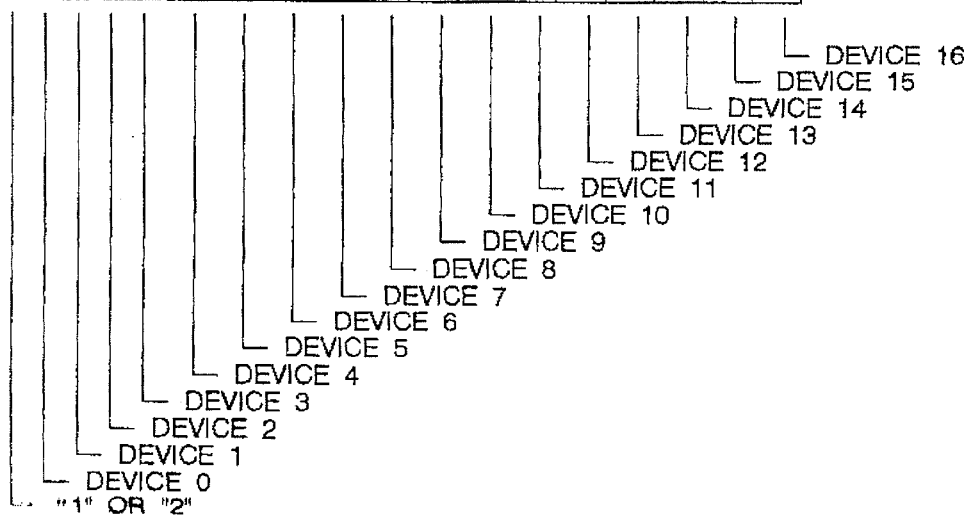
Figure 13A:
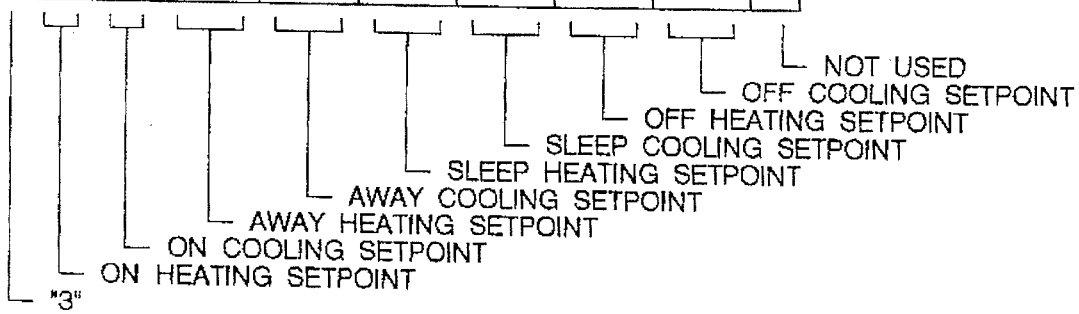
Figure 13B:
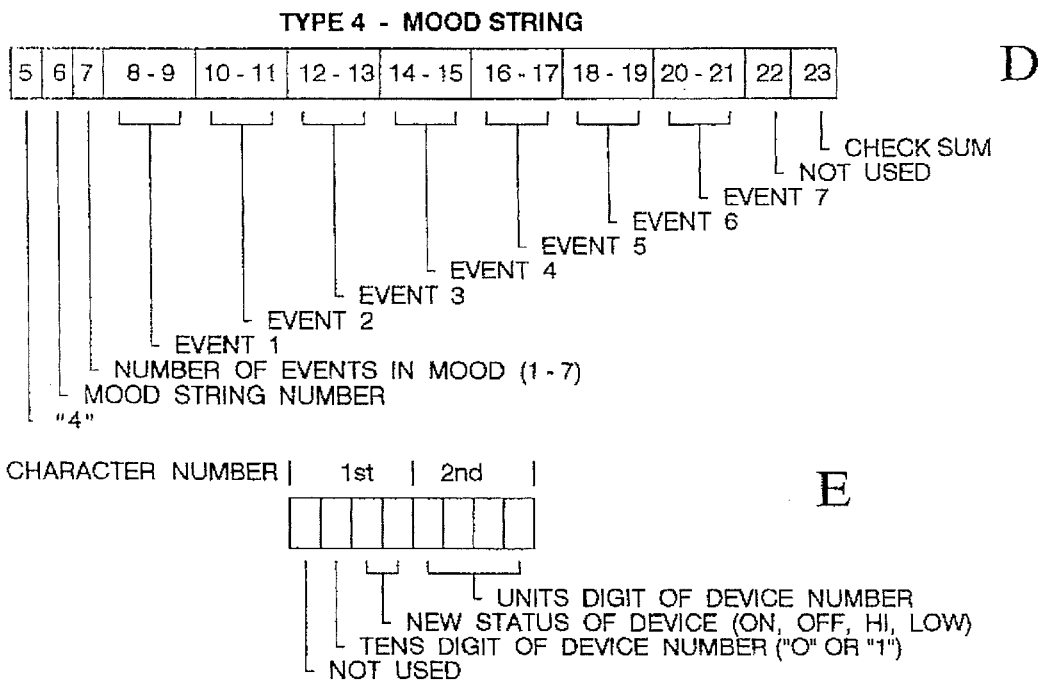
Figure 13B:
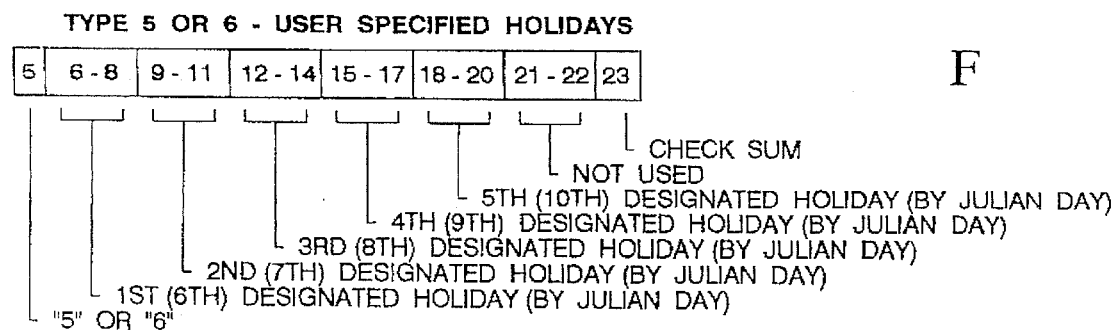

Referring now to FIGS. 13A and 13B, the System Parameter message is illustrated using diagrams A through F. The System Parameter message is used to permanently program the control units 26 and 28 and is used initially by the installers at initial installation and thereafter by the user any time a permenant schedule parameter change is desired to be implemented. This message should be contrasted with the Schedule Information message, which is used to send the time of various schedules, whereas the System Parameter message is used to set the parameters to be used at the time a particular scheduled event is to occur. For example, the Schedule Information message programs the scheduled time for HVAC control unit 26 causes the interior temperature to change as a result of a change from the AWAY mode to the HOME mode. On the other hand, the System Parameter message programs the various setpoint temperatures during the HOME an AWAY modes.

The basic System Parameter message is shown in diagram A of FIG. 13A, and begins with the I/D character "8" as the first character, followed by the three digit address of a control unit 26 or 28 as characters two through four. Next, character 5 contains a Type code, which may be the digits one through six, respectively manifesting:

Type 1–Device low level values

Type 2–Device high level values

Type 3–HVAC temperature setpoints

Type 4–Mood Strings

Type 5–First Five User Selected Holidays

Type 6–Second Five User Selected Holidays

After the type character, the next seventeen characters, six through twenty-two, contain the message portion of the System Parameter message. The message portion of the various types of System Parameter message are shown in Diagrams B and C of FIG. 13A and Diagrams D, E and F of FIG. 13B.

Diagram B of FIG. 13A shows the format of the type 1 and type 2 message portions of the System Parameter message. The type 1 message specifies the low dimming level for up to seventeen devices (designated as devices 0 through 17) under control of control unit 20, whereas the type 2 message controls the high dimming level for those seventeen devices. As seen in diagram B, the format of the message portion of the type 1 or type 2 System Parameter message is a single digit having a value of between zero and nine in each of character positions six through twenty-two, each representing devices zero through sixteen respectively.

Diagram C of FIG. 13A shows the format of the type 3 message portion of the System Parameter message, which is used to set the various temperature setpoints in an HVAC control unit 28. The format is a series of two digit value in character positions six through twenty-one, representing the following setpoint values:

Characters 6–7–Home Heating Setpoint Temperature
Characters 8–9–Home Cooling Setpoint Temperature
Characters 10–11–Away Heating Setpoint Temperature
Characters 12–13–Away Cooling Setpoint Temperature
Characters 14–15–Sleep Heating Setpoint Temperature
Characters 16–17–Sleep Cooling Setpoint Temperature
Characters 18–19–Off Heating Setpoint Temperature
Characters 20–21–Off Cooling Setpoint Temperature Character 2 is not used in the type three System Parameter message.

Referring now to FIG. 13B, Diagrams D and E represents the Type 4 Mood String message, which occurs when character five of the System Parameter Message is a "4". Up to ten different mood strings can be designated by the user and these are identified by the value ("0" through "9") in character six. As noted above, a mood string is activated by the override message discussed above with respect to FIG. 12. Each mood string may include up to seven different events, and each event is respectively specified in the next seven character pairs eight-nine, ten-eleven, twelve-thirteen, fourteen-fifteen, sixteen-seventeen, eighteen-nineteen and twenty-twenty-one. Character twenty-two is not used and character twenty-three contains the checksum digit.

Each of the two character events of the mood string message are shown in diagram E of FIG. 13B. The highest order bit of the binary decoded version of the first event character is not used. Thus, the first event character of a mood string message may only contain values of "0" through "7". The next highest order bit of the first event character represents the tens digit of the device number and the two low order characters of the first event character are the status of the designated device to be controlled, represented as follows:

"0-0"–OFF
"0-1"–ON
"1-0"–LOW
"1-1"–HIGH

Finally, the second character of the event represents the units digit of the device number.

Figure 14:
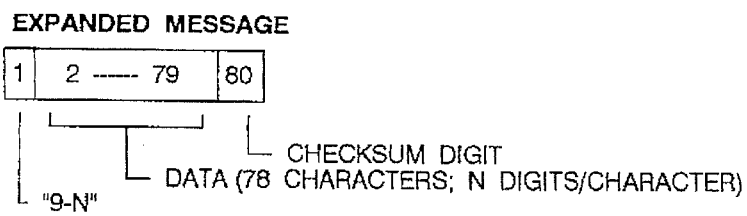
FIG. 14 illustrates the makeup of the Expanded message sent from the customer command center computer to a pager receiver in a control unit.

Referring now to FIG. 14, the final type of message is seen which can be sent from transmitter 20 to the various control units 26 and 28 is the Expanded message. The Expanded message format may be defined to use the eighty character alpha-numeric paging signal. Thus, each of the eighty characters of the expanded message may contain any value between zero and "255". However, to prevent this signal from interfering with the equipment described herein, the first character cannot begin with values between zero and eight.

With the exception of the Time, Date and Daylight message and Holiday message shown in FIG. 7 and the Weather Information message shown in FIG. 8, which are automatically sent out at a periodic interval, the remaining messages require some direction to the customer command center computer 22 in order to cause a transmission. Except for the Utility Company Setup and Utility Company Activation messages, shown in FIGS. 10 and 11, this communication is normally from the homeowner or installer and normally occurs via telephone. Within the customer command center computer 22, an automatic telephone communication system is used, in conjunction with a digitized voice platform, to request actions desired by the caller be designated by pressing various buttons on a telephone. In order to initiate a message, the caller must first enter his or her own telephone number, followed by a personal identification number (PID). Based upon that information, the customer command center computer 22 can determine the identity of the user, the type of controllers 26 or 28 installed and the type of equipment being controlled by each control unit 26 or 28. With this information, the customer command center computer 22, through pre-programmed voice messages accessing the digitized voice platform, then asks various questions which can be answered by pressing the keys on a DTMF tone telephone.

Generally, a customer can select one of the many pre-defined schedules which are published to the user and assigned a number. For example, a published heating/air conditioning schedule, which includes heating or cooling sleeping areas, may be as seem in FIG. 15. If the homeowner has a second heating/cooling unit which is only used to heat or cool common areas where no person sleeps, a similar schedule to that shown above is used, but all codes are increased by one. The principal difference is that if the second mentioned schedule is used, the AWAY mode setpoints are used in place of the SLEEP mode setpoints. In using the published schedule, a person's home occupancy and sleeping habits may be conveniently entered by merely entering a three digit number for each day. However, if a person's occupancy and sleeping habits are not included in the published schedules, a custom schedule may be entered, although it will may a longer time to enter the data. Alternatively, the provider of the service may enter the customized schedule for its customers based upon information provided by the customer.

Similar schedules are published for times hot water is needed, lights are to be automatically turned on or off, pool pump or sprinkler motors are to be turned on, and the like. With respect to the lights, the schedules may be based on turning lights on at or a fixed time from sunset and turning them off at or a fixed time from sunrise.

In addition to the published schedules, the customer command center computer 22 permits the user to identify appliances placed on the X-10 bus by their common name or in the case of lights, by a room identification. For example, device number one may be the coffee maker, and device number two may be the lights in "Boy's Room", or "Third Bedroom".

A typical conversation between a user and the customer command center computer 22, where the user wishes to turn the water heater on for the next two and a half hours, may be as follows:

Computer: Hello, this is the Command Center. Please enter your home area code and telephone number.

Customer: enters ten digit number.

Computer: Thank you. Please enter your personal identification number.

Customer: enters four digit PIN code.

Computer: Thank you. You are now at the Main Menu. Please choose a category. For Heating and Air Conditioning, press 1; for water heating, press 2; for lights that your only turn on or off, press 3; for lights that you dim, press 4; for appliances, press 5.

Customer: presses 2.

Computer: Water Heater, Actions choices follow: To override ON, press 1; to override off, press 2; to return to your normal schedule, press 3; to assign an energy guide schedule, press 4; to return to the main menu, press *.

Customer: presses 1.

Computer: Please enter the override duration in hours and minutes. First enter the number of hours.

Customer: enters 2.

Computer: Now enter the number of minutes.

Customer: enters 30.

Computer: To put your water heater on for two hours and thirty minutes, press 1. To choose a different action for this device, press 2. To return to the main menu, press *.

Customer: presses 1.

Computer: Your water heater will be overridden on for two hours and thirty minutes. Thank you for calling the Command Center. Good-bye.

Attached hereto as Appendix I is a listing of the various words and phrases which can be generated by the digitized voice platform of customer command center computer 22.

Within customer command center computer 22, a database is maintained containing information regarding each user. Such information includes the types and names of the various equipment of each user, the modes of operation and schedules as programmed by the user, the various setpoint temperatures and other parameters as set by the user, and so forth. When the user calls the customer command center computer 22, the program therein uses the data base and the prior responses of the customer to generate the next appropriate series of choices for the user. The query generated by customer command center computer 22 that is common for each customer is the request to enter the telephone number and personal identification code. Even the main menu is uniquely generated for the customer, because some customers will not control items other than HVAC units, whereas others will control many different energy consuming devices. Thus, unlike other systems, there is no set series of programmed queries, but rather, each user has a unique sequence of queries, built from the data stored in the database record for that user and in response to prior queries.

With respect to the Utility Company messages, seen in FIGS. 10 and 11, they may generated by the utility company and provided directly to transmitter 20, or through customer command center computer 22 for transmission to the various control units 26 and 28.

Figure 16:
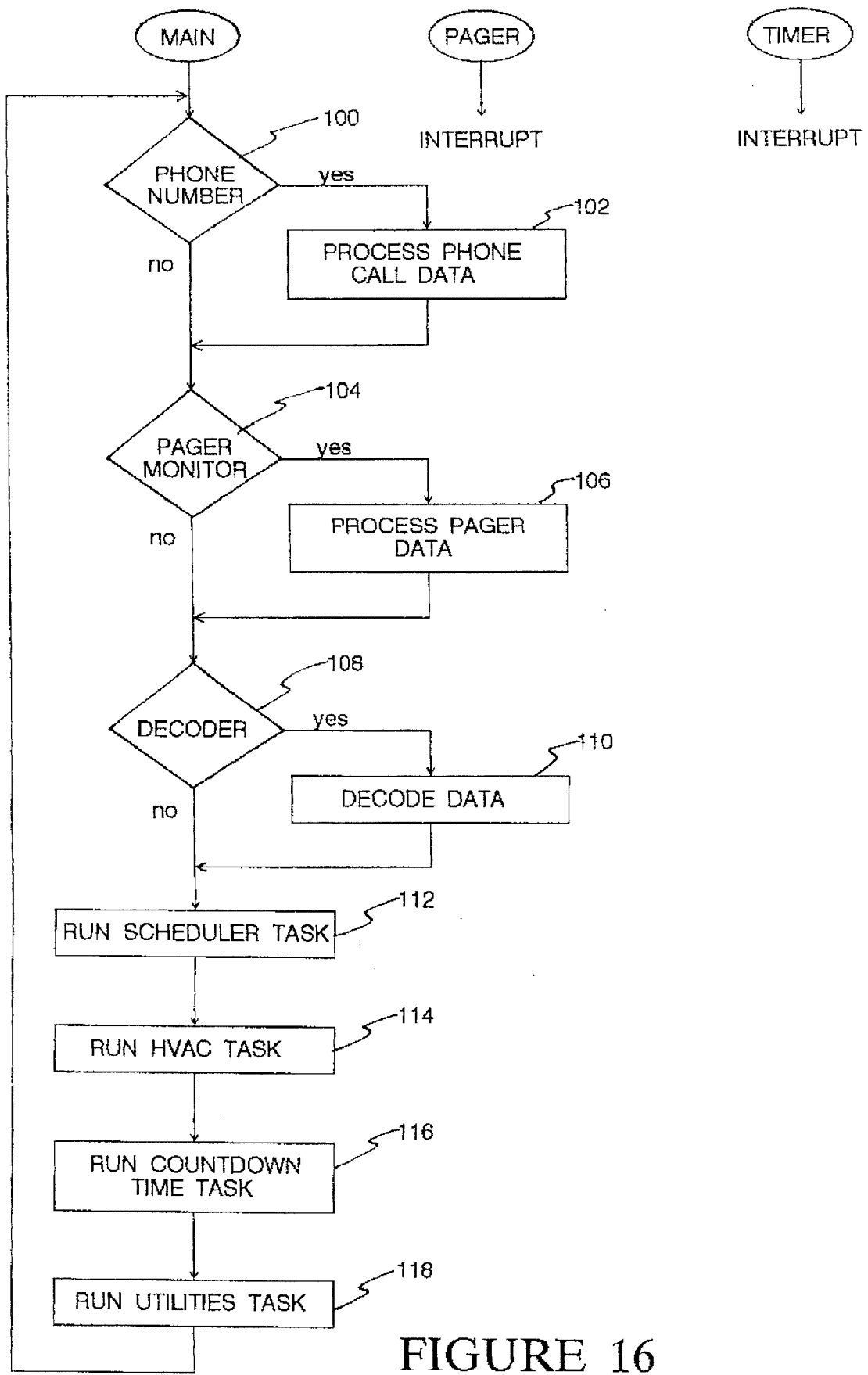
FIG. 16 is a general flow diagram useful in understanding the operation of the program controlling the microprocessors used in the control units.

Referring now to FIG. 16, a broad view flow diagram of the program controlling microprocessors 58 in FIGS. 3A and 3B is shown. A copy of the object code of the entire program is attached hereto as Appendix II. By constructing the apparatus described herein in FIGS. 3A or 3B and placing the program set out in Appendix II, the operations described herein are obtained. The set of instructions constituting the program for microprocessors 58 is contained in EPROM 62 and the general operation of microprocessor 58, RAM memory 60, EPROM memory 62 in operating microprocessor is well known. Generally, the program merely proceeds through a loop checking if various activities are required to be performed. In addition, two interrupt signals can occur, which cause a deviation from the main program to service the interrupt. The highest priority interrupt is the TIMER signal, which occurs every 8.33 milliseconds, and is provided to the non-maskable interrupt (NMI) input of microprocessor 58. Whenever a TIMER signal occurs, the time of day counter is updated, whereby, the correct time is always maintained.

The other interrupt signal occurs whenever the pager receiver 32 or 46 has received a message. As this signal is received by the pager receiver 32 or 46, it is decoded and saved in a seven segment format. After the pager message is received and decoded, it is provided as the PDATA serial signal to the display output lines of the pager receiver 32 or 46, one bit at a time, in synchronism with the CLOCK signal. As previously noted, the first CLOCK signal of a new message also interrupts microprocessor 58, which disables the INT input for a time sufficient to permit the entire PDATA message to be transmitted to shift register 82. The first panel of eleven or twelve seven segment signals are then stored in shift register 82 while the INT interrupt is disabled. After the interrupt disable time expires the data stored in shift register 82 is read by microprocessor and each bit is stored in an appropriate memory location relating to which character and segment it represents. After all ninety two bits are transferred and the eighty-four segment bits are appropriately sorted and stored, the program of microprocessor 58 causes a seven segment to BCD (binary coded decimal) decoding for each sorted character to occur using conventional table look-up techniques. Thus, if a seven segment sorted group of signals represents a "9", the decoding results in a "1-0-0-1" being stored as the particular character.

After the first panel of the message is transferred to microcomputer 58, the READ signal is caused to issue and the above procedure is repeated for the second panel of the twenty-three character message. At this time, the entire pager message is stored in RAM 60 in a manner which can be acted upon by the remainder of the program of microprocessor 58. This may be indicated by setting a pager message flag.

The Main loop of the program controlling microprocessor 58 begins at block 100 by determining if the telephone interface 36 or 48 requires servicing. If telephone interface service is required, then according to block 102, the information sent to the telephone interface 36 or 48 is processed. Typically, such information will only occur during installation and will consist of the Initialization messages, seen in FIG. 9, or the initial Schedule Information messages seen in FIG. 6. The processing consists of storing the information received in the appropriate portions of RAM 60. Any other two way communication over telephone lines between system 10 and other points is also handled at block 102. For example, if system 10 or the telephone interfaces 36 or 48 are extended to include an auto-dialer and one or more of the X-10 devices 56 serves as a meter reading device, then the results of the meter reading would sent to the utility company at this point using the telephone interface module. Alternatively, a utility company could pole the data saved by HVAC controller 34 to determine if energy were being efficiently used.

If the telephone interface does not require servicing, or if the servicing is completed, then the next event, as indicated by block 104, is to determine if a paging signal has caused information to be stored in shift register 82. This may be determined by determining if a pager interrupt has occurred and expired, thereby indicating that the pager data is stored in shift register 82. If so, then, according to block 106, the pager data is transferred to microprocessor 58, sorted and stored in RAM 60.

Then, according to block 108, a determination is made whether all of the data from shift register 82 has been stored in RAM 60 and is ready for decoding. If so, block 110 caused the stored seven segment data to be checked and, if proper, decoded. After decoding, the data is stored in the appropriate portions of RAM 60, as appropriate, or other actions dictated are performed in response to the message. For example, if the message provides a new HOME mode heating setpoint temperature, the value of that new parameter is stored in RAM 60 and a flag is set indicating the new value is to be provided to the HVAC controller 34.

Next, various tasks are performed, as necessary, and thereafter, the entire Main loop is repeated. The various tasks performed in each loop are the Scheduler task, as indicated by block 112, the HVAC task, as indicated by block 114, the Countdown Time task, as indicated by block 116 and the Utilities task, as indicated by block 118. The Scheduler Task module 112 generally determines if it is time to turn on or turn off some appliance being controlled by water heater and automation controller 28 and then provides the appropriate signal to accomplish that task. It also keeps track of the current state of all devices being controlled. In calculating the next event to be performed, the Scheduler considers the program schedule, the unprocessed customer override messages and any current utility override messages.

The scheduler module also considers an advanced start time (explained hereafter with respect to block 114), which is a time to reach the proper setpoint temperatures when changing to a more demanding mode. This advance start time permits the temperature of the facility to be correct when the change of modes occurs. When conflicts in the schedule of events to occur results, the priority is first, the utility override, second, the user override, third, the advance start time and finally, the schedule itself. The scheduler also determines whether a device is already in the scheduled state at the time it finds an event is to occur, in which case, the event is ignored. For example, a light may be scheduled to be turned on at a certain time, but previously had been turned on by a user override message. In such case, no signal is sent again turning that light on.

The HVAC Task module 114 determines three variables which are used by the scheduler module 112 in providing proper data and control information to the HVAC controller 34. The three variables determined by the HVAC task module 114 are calculating the advance start time, monitoring the heating or cooling demand and monitoring whether heat strips are required in the event a reverse cycle heat pump is used as the heating/cooling unit 38. The manner in which the HVAC task module 114 performs these functions will be described hereafter.

The key to the operation of the Scheduler Task module 112 and HVAC Task module 114 is knowing the time an action is to occur. This time is determined by the Countdown Timer Task module 116. To determine the time an action is to occur, a schedule is maintained for all devices being controlled for the entire week. Then, the next event is determined from the schedule and a timer is set to indicate when that next event is to occur. The basic schedule is primarily a day scheduler, which contains up to one hundred entries, each containing up to eight events and the time of each events for a single device. For some events, it is necessary to calculate the time for each event based upon information provided to microprocessor. For example, the lighting commands based upon sunset and sunrise times must be calculated based upon the sunrise and sunset times provided to controller units 26 and 28 by the Time, Date and Daylight message, shown in FIG. 7.

After the various time tasks are completed, the Utilities Tasks module 118 is executed if any Utility messages have been provided. As previously described, these messages would either be a Utility Initialization message, or a Utility Activation message. If a Utility Activation message is received, the information is transferred to the schedule so that the next time the scheduler task module 112 is executed, the utility order is followed.

As noted above, an advance start time must be calculated. This is the time necessary to raise or lower the temperature to the next mode setpoint by the time the next mode commences. For example, where the AWAY mode is to end and the HOME mode is to begin at 5:00 PM, that is, the user returns home from work at 5:00 PM, the user expects the home to be at the HOME mode temperature when he or she enters the facility. Thus, the heating or cooling must begin at some time, referred to herein as the advance start time, prior to the time the person returns. An advance start time is calculated whenever the mode (HOME, AWAY or SLEEP) changes to a more energy demanding mode.

In calculating the advanced start time for any facility, many factors must be considered, such as, the temperature difference to make up, the outside temperature and other weather conditions, the insulation of the facility and the capacity of the heating/cooling unit 38 being used. In the past, the advance start times have been specified to each energy management systems based only upon the weather factors alone. However, this strategy is wasteful of energy for thermally efficient facilities and generally was too short a time for thermally inefficient facilities, or facilities with under capacity heating/cooling units. The program controlling microprocessor 58 adopts a different approach to determining the advance start and advance stop times. It calculates them based upon historical data for the particular facility and thus obtains a much more accurate advance start or advance stop time.

To calculate the advance start or advance stop times, the program makes use of the data generated by and stored in the HVAC controller 34. Specifically, program uses a learning algorithm which will adapt over time to changing conditions. Briefly, current demand is monitored and a prediction is made of how much time will be required to attain the temperature goal. Then, the mode change is set to change at this advanced time.

The algorithm uses a weighted average value based upon the most recent heating/cooling history. For example, the most recent current demand values are multiplied by three and added to the next most recent demand value, multiplied by two, and this sum is added to the preceding four next most recent demand values. This sum is then divided by nine to arrive at an average demand value. This history may be limited to only heating or cooling calls during a recent period, such as two hours, and if six events do not occur, only those which do occur are used and then the divisor is adjusted appropriately. The current demand value is the heating or cooling ramp as percent signals and thus will be between zero and one hundred.

With this average demand signal, the following calculation is made by microprocessor to obtain the advance start time:

*Advanced Start Time*={(*Avg. Demand*)($K_1$)+$K_2$)}($\delta T$)+$K_3$($\delta T$−4)

where $K_1$ is a heating or cooling multiplier between zero and sixty (initial setting of twenty) that is constantly modified, as needed, after the fact to have provided the correct value, $K_2$ is a constant equal to a minimum minutes per degree time, which generally is set to a value of one, $\delta T$ is the required temperature change as a result of the new mode, and $K_3$ is a constant used only when $\delta T$ is more than four degrees and is initially set equal to five, although it may be changed by an appropriate message signal. After each advance time calculation, the value of $K_1$ may be adjusted. If after several days, the value of $K_1$ is not relatively constant, than the values of $K_2$ and $K_3$ may also be adjusted by appropriate measures.

In some instances, there may not be any recent heating or cooling demand information and it would not be possible to calculate an advance start time. For example, where the temperature outside is approximately the same as the AWAY setpoint, it is not likely that the heating/cooling unit 38 will be turned on. In this situation, the heating/cooling unit 38 is forced on for a defined time and the temperature change is measured. From this information, an approximation of the Average Demand value can be approximated.

When the user's heating/cooling unit 38 is a reverse cycle heat pump, having one or two states of auxiliary electric heat strips, special energy savings strategies are employed. This strategy is based on the fact that the most efficient heating occurs by the heat pump alone, without need for the heat strips. First, the heat strips are disabled in all modes except the most energy demanding mode. Then, the need for the heat strips is monitored and they are only engaged if actually needed. This may be done by monitoring the heat call variable from HVAC controller 34 and if it is at 99, (indicating that the temperature is dropping even though the heating unit is continuously enabled for the entire ramp time), the first heat strip is enabled. If the heat call variable remains at 99 twenty minutes later, then the second heat strip is enabled.

In performing the advance start heating task, it is most desirable to raise the temperature, if possible, using only the heat pump. Thus, after the advance start time is calculated, as explained above, and the heat pump heating/cooling unit 38 is rendered operational, the heat strips are initially maintained off. During the advance start heat recovery period, the rate of recovery is monitored and a determination is made whether the heat pump alone will permit the setpoint temperature to be reached by the end of the advanced start period. If not, then one stage of heat strips is enabled and again, the recovery is continually monitored. If it still appears that the setpoint temperature will not be reached by the end of the period, the second stage of heat strips are enabled.

There are two situations where the heat strips are permitted to operate in the lower energy consuming modes and in the recovery period. First, if the system is overridden to a higher energy consuming mode by either a manual actuation of the ON key 84 on thermostat 42 or by an override message indicating a change to a higher energy consuming mode, the heat strips are permitted to operate normally. Second, if the severe weather flag is set in the Time, Date and Daylight message, seen in FIG. 7, then the heat strips are permitted to operate and the heat pump is disabled because in cold weather, the heat pump is very inefficient. Once the severe weather flag ceases being set, the heat pump is engaged and the heat strips are disabled.

While the energy management and home automation system of this invention has been described in great detail herein and with many examples, it should be appreciated that many variations and additions are possible, particularly in using the various message structures to command additional functions. Further, other communication links between the command centers 22 and 24 and the controllers 14 and between the controllers 14 and the various devices 18 being controlled are possible. It is also possible to include intelligent devices, such as personal computers, as devices attached to controllers 14 and then to permit various other devices to be attached to the intelligent device.

-- APPENDIX I

HEX DUMP

```
000000   F3 ED 56 3E   00 32 5C 80   3E D7 D3 03   C3 00 01 00   ..V>.2\.>.......
000010   00 00 00 00   00 00 00 00   00 00 00 00   56 45 52 53   ............VERS
000020   49 4F 4E 20   20 37 2D 30   20 3B 20 53   45 52 23 20   ION  7-0 ; SER#
000030   30 30 30 30   3F 3F 3F 3F   F5 E5 3A A5   81 67 3A A4   0000????..:..g:.
000040   81 FE 01 28   0C 3E 01 32   A4 81 26 00   3E 00 32 A7   ...(.>.2..&.>.2.
000050   81 7C 3C 32   A5 81 E1 F1   FB ED 4D 00   00 00 00 00   .|<2......M.....
000060   00 00 00 00   00 00 F5 E5   C3 98 0C 00   00 00 00 00   ................
000070   00 00 00 00   00 00 00 00   00 00 00 00   00 00 00 00   ................
000080   00 00 00 00   00 00 00 00   00 00 00 00   00 00 00 00   ................
000090   00 00 00 00   54 52 41 4E   53 50 4F 4E   44 45 52 20   ....TRANSPONDER
0000A0   43 4F 44 45   20 43 6F 70   79 72 69 67   68 74 28 43   CODE Copyright(C
0000B0   29 20 31 39   38 39 20 54   65 6C 65 74   69 6D 65 72   ) 1989 Teletimer
0000C0   20 49 6E 74   65 72 6E 61   74 69 6F 6E   61 6C 20 49    International I
0000D0   6E 63 2E 42   6F 63 61 20   52 61 74 6F   6E 2C 20 46   nc.Boca Raton, F
0000E0   4C 2E 20 33   33 34 38 37   20 20 20 54   65 6C 3A 20   L. 33487   Tel:
0000F0   34 30 37 2D   39 39 34 2D   39 30 34 34   20 00 00 00   407-994-9044 ...
000100   00 C3 15 01   08 95 73 00   9C 00 A0 FF   FF 60 92 00   ......s......`..
000110   00 00 00 FF   FF 01 23 01   ED 7B 07 01   FD 2A 09 01   ......#..{...*..
000120   C3 27 01 82   0B D5 E5 0A   03 6F 0A 03   67 5E 23 56   .'.......o..g^#V
000130   EB E9 13 EB   5E 23 56 D5   C3 27 01 13   D5 C3 27 01   ....^#V..'....'.
000140   13 EB 5E 23   56 D5 C3 27   01 FD 2B FD   2B FD 71 00   ..^#V..'..+.+.q.
000150   FD 70 01 C1   13 D5 C3 27   01 CD 49 01   D5 01 08 00   .p.....'..I.....
000160   30 04 63 06   B3 08 6D 06   7A 01 FD 2B   FD 70 00 FD   0.c...m.z..+.p..
000170   2B FD 71 00   13 4B 42 C3   27 01 7C 01   FD 4E 00 FD   +.q..KB.'.|..N..
000180   23 FD 46 00   FD 23 C3 27   01 6A 01 AD   05 08 06 77   #.F..#.'.j.....w
000190   06 42 04 9D   05 30 04 8D   05 7A 01 6A   01 F9 05 81   .B...0...z.j....
0001A0   02 28 00 1F   08 1F 08 D5   01 22 00 13   08 CB 08 8B   .(......."......
0001B0   07 19 08 D5   01 22 00 13   08 57 09 57   09 8B 07 19   ....."...W.W....
0001C0   08 1F 08 FA   0B 73 02 04   00 F3 05 7A   01 6A 01 8B   .....s.....z.j..
0001D0   07 19 08 7A   01 D7 01 0A   03 6F 0A 03   67 C3 26 01   ...z.....o..g.&.
0001E0   E2 01 0A 03   6F 0A 03 67   E5 0A 03 6F   0A 03 67 C3   ....o..g...o..g.
0001F0   26 01 F4 01   11 FA FF FD   19 0A FD 77   04 03 0A FD   &..........w....
000200   77 05 03 D9   D1 C1 B7 21   00 80 ED 42   FD 75 02 FD   w......!...B.u..
000210   74 03 19 FD   75 00 FD 74   01 D9 C3 27   01 1F 02 D1   t...u..t...'....
000220   E1 E5 D5 B7   ED 52 C2 F4   01 D1 D1 60   69 4E 23 46   .....R.....`iN#F
000230   C3 27 01 35   02 FD 4E 04   FD 46 05 11   06 00 FD 19   .'.5..N..F......
000240   C3 27 01 45   02 FD 34 00   C2 75 02 FD   34 01 E2 75   .'.E..4..u..4..u
000250   02 11 06 00   FD 19 03 03   C3 27 01 5D   02 D1 FD 6E   .........'.]...n
000260   00 FD 66 01   B7 ED 5A EA   51 02 FD 75   00 FD 74 01   ..f...Z.Q..u..t.
000270   C3 75 02 75   02 60 69 5E   23 56 2B 19   4D 44 C3 27   .u.u.`i^#V+.MD.'
000280   01 83 02 E1   7D B4 CA 75   02 03 03 C3   27 01 90 02   ....}..u....'...
000290   E1 D1 AF ED   52 CA 9C 02   D5 C3 75 02   03 03 C3 27   ....R.....u....'
0002A0   01 6A 01 83   08 63 06 2F   09 6D 06 7A   01 AF 02 E1   .j...c./.m.z....
0002B0   D1 7B D6 30   FA CE 02 FE   0A FA C3 02   D6 07 FE 0A   .{.0............
0002C0   FA CE 02 BD   F2 CE 02 5F   21 FF FF C3   26 01 6C C3   ......._!...&.l.
0002D0   26 01 D4 02   E1 7D C6 30   FE 3A DA DF   02 C6 07 6F   &....}.0.:.....o
0002E0   E5 C3 27 01   E6 02 D9 D1   C1 E1 78 B1   CA FB 02 7E   ..'.......x....~
0002F0   BB CA FB 02   23 0B 78 B1   C2 EF 02 E5   C5 D9 C3 27   ....#.x........'
000300   01 21 00 00   0E 08 29 17   D2 0E 03 19   CE 00 0D C2   .!....).........
000310   06 03 C9 15   03 D1 E1 C5   44 7D CD 01   03 E5 67 78   ........D}....gx
000320   44 CD 01 03   D1 4A 09 CE   00 55 6C 67   C1 D5 C3 26   D....J...Ulg...&
000330   01 33 03 D9   C1 D1 21 00   00 3E 0F CB   23 CB 12 D2   .3....!..>..#...
000340   43 03 09 29   3D C2 3B 03   B2 F2 4D 03   09 E5 D9 C3   C..)=.;...M.....
000350   27 01 7D 91   7C 98 DA 60   03 21 FF FF   11 FF FF C9   '.}.|..`.!......
000360   78 B4 C2 81   03 EB 06 10   29 7B 8B D2   74 03 91 2C   x.......){..t..,
000370   5F C3 7B 03   5F 91 DA 7B   03 2C 5F 05   C2 68 03 EB   _.{._..{.,_..h..
000380   C9 3E 10 EB   29 EB ED 6A   D2 91 03 B7   ED 42 C3 98   .>..)..j.....B..
000390   03 ED 42 D2   98 03 09 1D   1C 3D C2 83   03 C9 A0 03   ..B......=......
0003A0   D9 C1 E1 D1   CD 52 03 E5   D5 D9 C3 27   01 AF 95 6F   .....R.....'...o
0003B0   3E 00 9C 67   C9 AF 91 4F   3E 00 98 47   C9 AF 93 5F   >..g...O>..G..._
0003C0   3E 00 9A 57   C9 AF 93 5F   3E 00 9A 57   3E 00 9D 6F   >..W..._>..W...o
0003D0   3E 00 9C 67   C9 7C A8 F5   C5 7C B7 FC   C5 03 78 B7   >..g.|...|....x.
0003E0   FC B5 03 CD   52 03 C1 78   B7 FC AD 03   F1 F0 CD BD   ....R..x........
0003F0   03 7C B5 C8   1B CD AD 03   09 C9 FC 03   D9 C1 E1 D1   .|..............
000400   CD D5 03 E5   D5 D9 C3 27   01 0B 04 D9   C1 D1 7A B7   .......'......z.
000410   21 00 00 F2   00 04 2B C3   00 04 1C 04   D9 C1 D1 7A   !.....+........z
000420   B7 21 00 00   F2 28 04 2B   CD D5 03 D5   D9 C3 27 01   .!...(.+......'.
000430   32 04 D1 B1   19 C3 26 01   3A 04 D1 E1   B7 ED 52 C3   2.....&.:.....R.
000440   26 01 44 04   E1 23 C3 26   01 4B 04 E1   23 23 C3 26   &.D..#.&.K..##.&
000450   01 53 04 E1   2B C3 26 01   5A 04 E1 2B   2B C3 26 01   .S..+.&.Z..++.&.
```

```
000460  62 04 E1 29  C3 26 01 69  04 D9 C1 D1  E1 E3 19 EB   b..).&.i........
000470  E1 ED 4A D5  E5 D9 C3 27  01 7B 04 D9  C1 D1 E1 E3   ..J....'.{......
000480  B7 ED 52 EB  E1 ED 42 D5  E5 D9 C3 27  01 8F 04 D1   ..R...B....'....
000490  E1 7B A5 6F  7A A4 67 C3  26 01 9C 04  D1 E1 7B B5   .{.oz.g.&.....{.
0004A0  6F 7A B4 67  C3 26 01 A9  04 D1 E1 7B  AD 6F 7A AC   oz.g.&.....{.oz.
0004B0  67 C3 26 01  B6 04 E1 7C  2F 67 7D 2F  6F E5 C3 27   g.&....|/g}/o..'
0004C0  01 C3 04 E1  D1 AF ED 52  67 6F C2 26  01 2B C3 26   .......Rgo.&.+.&
0004D0  01 D3 04 D1  E1 B7 ED 52  E2 DE 04 7C  EE 80 21 FF   .......R...|..!.
0004E0  FF FA 26 01  23 C3 26 01  EA 04 E1 D1  B7 ED 52 E2   ..&.#.&.......R.
0004F0  F5 04 7C EE  80 21 FF FF  FA 26 01 23  C3 26 01 01   ..|..!...&.#.&..
000500  05 D1 E1 AF  ED 52 21 00  00 D2 26 01  2B C3 26 01   .....R!...&.+.&.
000510  12 05 E1 D1  AF ED 52 21  00 00 D2 26  01 2B C3 26   ......R!...&.+.&
000520  01 23 05 E1  7C B7 21 00  00 F2 26 01  2B C3 26 01   .#..|.!...&.+.&.
000530  32 05 E1 7D  B4 21 00 00  C2 26 01 2B  C3 26 01 41   2..}.!...&.+.&.A
000540  05 E1 D1 7C  B5 B2 B3 21  00 00 C2 26  01 2B C3 26   ...|...!...&.+.&
000550  01 53 05 E1  D1 7C B7 21  00 00 F2 26  01 2B C3 26   .S...|.!...&.+.&
000560  01 63 05 D9  E1 D1 C1 B7  ED 42 EB C1  ED 42 7C B5   .c.......B...B|.
000570  B2 B3 D9 21  00 00 C2 26  01 2B C3 26  01 7F 05 21   ...!...&.+.&...!
000580  00 00 39 C3  26 01 88 05  E1 F9 C3 27  01 8F 05 D1   ..9.&......'....
000590  FD 2B FD 2B  FD 73 00 FD  72 01 C3 27  01 9F 05 FD   .+.+.s..r..'....
0005A0  5E 00 FD 23  FD 56 00 FD  23 C3 27 01  01 AF 05 FD   ^..#.V..#.'.....
0005B0  5E 00 FD 56  01 D5 C3 27  01 BB 05 FD  6E 00 FD 66   ^..V...'....n..f
0005C0  01 FD 5E 02  FD 56 03 B7  ED 52 E5 C3  27 01 D0 05   ..^..V...R..'...
0005D0  FD 6E 06 FD  66 07 FD 5E  08 FD 56 09  B7 ED 52 E5   .n..f..^..V...R.
0005E0  C3 27 01 E5  05 E1 C3 2D  01 EB 05 E1  5E 23 56 EB   .'.....-....^#V.
0005F0  C3 2D 01 F5  05 E1 C3 27  01 FB 05 E1  E3 C3 26 01   .-.....'......&.
000600  02 06 D1 E1  E5 C3 25 01  0A 06 E1 E5  C3 26 01 11   ......%......&..
000610  06 E1 E5 7C  B5 CA 27 01  C3 26 01 1D  06 D1 E1 E3   ...|..'..&......
000620  C3 25 01 25  06 E1 29 39  5E 23 56 D5  C3 27 01 31   .%.%..)9^#V..'.1
000630  06 E1 D1 D5  E5 C3 25 01  3A 06 D9 D1  E1 C1 E3 D5   ......%.:.......
000640  E5 C5 D9 C3  27 01 48 06  33 33 33 33  C3 27 01 51   ....'.H.3333.'.Q
000650  06 D9 C1 D1  E1 DD E1 DD  E5 E5 C5 D9  DD E5 E5 D9   ................
000660  C3 27 01 65  06 E1 5E 23  56 D5 C3 27  01 6F 06 E1   .'.e..^#V..'.o..
000670  D1 73 23 72  C3 27 01 79  06 E1 6E 26  00 C3 26 01   .s#r.'.y..n&..&.
000680  82 06 E1 D1  73 C3 27 01  8A 06 E1 D1  7E 83 77 23   ....s.'.....~.w#
000690  7E 8A 77 C3  27 01 98 06  E1 55 5C D5  C3 27 01 A1   ~.w.'....U\..'..
0006A0  06 E1 D1 73  23 72 23 D1  73 23 72 C3  27 01 B0 06   ...s#r#.s#r.'...
0006B0  E1 11 03 00  19 56 2B 5E  D5 26 5E 2B  5E D5 C3 27   .....V+^.&^+^..'
0006C0  01 C3 06 D1  21 00 00 B7  ED 52 C3 26  01 CF 06 D9   ....!....R.&....
0006D0  D1 C1 21 00  00 B7 ED 42  E5 21 00 00  ED 52 E5 D9   ..!....B.!...R..
0006E0  C3 27 01 E5  06 D1 7A B7  FA EF 06 D5  C3 27 01 21   .'....z......'.!
0006F0  00 00 ED 52  E5 C3 27 01  FA 06 D9 E1  D1 44 4D AF   ...R..'......DM.
000700  ED 52 EA 12  07 FA 0D 07  C5 D9 C3 27  01 D5 D9 C3   .R.........'....
000710  27 01 FA 1A  07 D5 D9 C3  27 01 C5 D9  C3 27 01 21   '.......'....'.!
000720  07 D9 E1 D1  44 4D AF ED  52 EA 39 07  F2 34 07 C5   ....DM..R.9..4..
000730  D9 C3 27 01  D5 D9 C3 27  01 F2 41 07  D5 D9 C3 27   ..'....'..A....'
000740  01 C5 D9 C3  27 01 48 07  21 00 00 C3  26 01 50 07   ....'.H.!...&.P.
000750  21 01 00 C3  26 01 58 07  21 02 00 C3  26 01 60 07   !...&.X.!...&.`.
000760  21 03 00 C3  26 01 68 07  21 FF FF C3  26 01 70 07   !...&.h.!...&.p.
000770  D9 D1 C1 E1  78 B1 CA 7F  07 73 23 0B  C3 74 07 D9   ....x....s#..t..
000780  C3 27 01 6A  01 46 07 6E  07 7A 01 8D  07 E1 5E 23   .'.j.F.n.z....^#
000790  16 00 E5 D5  C3 27 01 99  07 D9 C1 D1  E1 78 B1 CA   .....'.......x..
0007A0  A4 07 ED B0  D9 C3 27 01  AA 07 D9 C1  D1 E1 78 B1   ......'.......x.
0007B0  CA A4 07 C0  09 EB 09 EB  2B 1B ED B8  C3 A4 07 C0   ........+.......
0007C0  D9 C1 ED 68  26 00 E5 D9  C3 27 01 CD  07 D1 E1 7A   ...h&....'.....z
0007D0  B7 F2 E1 07  7A B3 CA 26  01 CB 3C CB  1D 13 C3 D4   ....z..&..<.....
0007E0  07 7A B3 CA  26 01 CB 25  CB 14 1B C3  E1 07 F0 07   .z..&..%........
0007F0  FD 4E 00 FD  23 FD 46 00  FD 23 C3 27  01 FF 07 E1   .N..#.F..#.'....
000800  36 FF 23 36  FF C3 27 01  0A 08 E1 36  00 23 36 00   6.#6..'....6.#6.
000810  C3 27 01 6A  01 F3 05 7A  01 6A 01 46  06 7A 01 6A   .'.j...z.j.F.z.j
000820  01 7A 01 6A  01 FF FF D5  01 81 00 EF  08 D5 01 20   .z.j........... 
000830  00 EF 08 46  07 E1 08 CB  08 7F 08 63  06 08 06 E1   ...F.......c....
000840  08 49 04 63  06 42 04 E1  08 7F 08 6D  06 CB 08 49   .I.c.B.....m...I
000850  04 E1 08 46  07 E1 08 D5  01 59 01 A1  02 7A 01 59   ...F.....Y...z.Y
000860  01 81 20 95  73 00 00 01  00 20 80 32  01 22 80 32   .. .s.... .2.".2
000870  01 24 80 32  01 26 80 32  01 28 80 32  01 2A 80 32   .$.2.&.2.(.2.*.2
000880  01 2C 80 32  01 2E 80 32  01 30 80 32  01 32 80 32   .,.2...2.0.2.2.2
000890  01 34 80 32  01 36 80 32  01 38 80 32  01 3A 80 32   .4.2.6.2.8.2.:.2
0008A0  01 3C 80 32  01 3E 80 32  01 40 80 32  01 42 80 32   .<.2.>.2.@.2.B.2
0008B0  01 44 80 32  01 46 80 32  01 48 80 40  01 00 9B 40   .D.2.F.2.H.@...@
0008C0  01 02 00 40  01 20 00 40  01 50 00 6A  01 7B 08 63   ...@. .@.P.j.{.c
0008D0  06 7A 01 6A  01 CB 08 7A  01 7B 08 7A  01 88 06 7A   .z.j...z.{.z...z
0008E0  01 6A 01 56  07 D9 08 CB  08 58 04 6D  06 7A 01 6A   .j.V.....X.m.z.j
0008F0  01 4E 07 D9  08 CB 08 51  04 80 06 7A  01 6A 01 D5   .N.....Q...z.j..
000900  01 0A 00 9F  08 6D 06 7A  01 6A 01 D5  01 10 00 9F   .....m.z.j......
```

```
000910  08 6D 06 7A  01 6A 01 8B  07 D5 01 1F  00 8D 04 30   .m.z.j.........0
000920  04 7A 01 6A  01 49 04 7A  01 6A 01 49  04 7A 01 6A   .z.j.I.z.j.I.z.j
000930  01 15 09 29  09 7A 01 6A  01 66 07 AB  08 88 06 AB   ...).z.j.f......
000940  08 63 06 80  06 7A 01 6A  01 9F 08 63  06 DA 09 1B   .c...z.j...c....
000950  06 D2 02 37  09 7A 01 6A  01 C3 08 13  08 7A 01 6A   ...7.z.j.....z.j
000960  01 9B 08 63  06 30 05 89  01 10 63 6F  6D 70 69 6C   ...c.0....compil
000970  61 74 69 6F  6E 20 6F 6E  6C 79 9B 01  7A 01 6A 01   ation only.z.j.
000980  B2 09 89 01  14 69 6E 63  6F 6D 70 6C  65 74 65 20   .....incomplete
000990  73 74 72 75  63 74 75 72  65 9B 01 7A  01 6A 01 89   structure..z.j..
0009A0  01 0C 69 73  20 75 6E 64  65 66 69 6E  65 64 9B 01   ..is undefined..
0009B0  7A 01 6A 01  C1 04 30 05  7A 01 6A 01  E8 04 30 05   z.j...0.z.j...0.
0009C0  7A 01 6A 01  D1 04 30 05  7A 01 6A 01  30 05 B4 04   z.j...0.z.j.0...
0009D0  7A 01 6A 01  79 04 51 05  7A 01 6A 01  8D 05 46 07   z.j.y.Q.z.j...F.
0009E0  AD 05 9E 03  9D 05 F9 05  8D 05 9E 03  9D 05 7A 01   ..............z.
0009F0  6A 01 09 04  F3 05 7A 01  6A 01 8D 05  04 0A 9D 05   j.....z.j.......
000A00  FA 03 7A 01  6A 01 2F 06  A7 04 8D 05  E3 06 F9 05   ..z.j./.........
000A10  B3 06 13 03  9D 05 21 05  81 02 04 00  CD 06 7A 01   ......!.......z.
000A20  6A 01 B7 08  63 06 63 06  7A 01 6A 01  83 08 63 06   j...c.c.z.j...c.
000A30  08 06 77 06  D5 01 40 00  9A 04 F9 05  80 06 7A 01   ..w...@.......z.
000A40  6A 01 B3 08  63 06 B7 08  6D 06 7A 01  6A 01 9D 05   j...c...m.z.j...
000A50  08 06 49 04  8D 05 63 06  E1 08 7A 01  6A 01 5F 09   ..I...c...z.j._.
000A60  4C 0A F2 01  CB 08 46 07  E1 08 5E 07  7A 01 6A 01   L.....F...^.z.j.
000A70  5F 09 4C 0A  1D 02 CB 08  46 07 E1 08  5E 07 7A 01   _.L.....F...^.z.
000A80  6A 01 5F 09  5E 07 7E 09  4C 0A 43 02  08 06 49 04   j._.^.~.L.C...I.
000A90  CB 08 38 04  E1 08 CB 08  F9 05 6D 06  7A 01 6A 01   ..8.......m.z.j.
000AA0  5F 09 5E 07  7E 09 4C 0A  5B 02 08 06  49 04 CB 08   _.^.~.L.[...I...
000AB0  38 04 E1 08  CB 08 F9 05  6D 06 7A 01  6A 01 5F 09   8.......m.z.j._.
000AC0  4C 0A 33 02  7A 01 6A 01  CB 08 38 04  E1 08 7A 01   L.3.z.j...8...z.
000AD0  6A 01 5F 09  4C 0A 81 02  CB 08 46 07  E1 08 56 07   j._.L.....F...V.
000AE0  7A 01 6A 01  5F 09 56 07  7E 09 CB 08  00 06 38 04   z.j._.V.~.....8.
000AF0  F9 05 6D 06  7A 01 6A 01  5F 09 56 07  7E 09 4C 0A   ..m.z.j._.V.~.L.
000B00  73 02 CB 08  46 07 E1 08  F9 05 56 07  E2 0A 56 07   s...F.....V...V.
000B10  7A 01 6A 01  5F 09 CB 08  4E 07 7A 01  6A 01 5F 09   z.j._...N.z.j._.
000B20  4E 07 7E 09  4C 0A 81 02  C6 0A 7A 01  6A 01 5F 09   N.~.L.....z.j._.
000B30  D0 0A 49 04  7A 01 6A 01  5F 09 4E 07  7E 09 4C 0A   ..I.z.j._.N.~.L.
000B40  73 02 C6 0A  7A 01 6A 01  5F 09 8D 05  8D 05 36 0B   s...z.j.......6.
000B50  9D 05 9D 05  58 04 E2 0A  7A 01 6A 01  7F 08 63 06   ....X...z.j...c.
000B60  08 06 81 02  1A 00 08 06  56 07 38 04  63 06 00 06   ........V.8.c...
000B70  D5 01 04 00  30 04 63 06  6D 06 73 02  E2 FF F3 05   ....0.c.m.s.....
000B80  7A 01 6A 01  D5 01 07 01  63 06 6B 08  6D 06 D5 01   z.j.....c.k.m...
000B90  09 01 63 06  6F 08 6D 06  D5 01 0B 01  63 06 73 08   ..c.o.m.....c.s.
000BA0  6D 06 D5 01  0D 01 63 06  7B 08 6D 06  D5 01 11 01   m.....c.{.m.....
000BB0  63 06 83 08  6D 06 D5 01  05 01 63 06  D5 01 5F 08   c...m.....c..._.
000BC0  D5 01 0A 00  30 04 63 06  6D 06 D5 01  0F 01 63 06   ....0.c.m.....c.
000BD0  7F 08 6D 06  8B 08 08 08  8F 08 08 08  A3 08 08 08   ..m.............
000BE0  87 08 08 08  AF 08 08 08  97 08 08 08  5A 0B 5F 08   ............Z._.
000BF0  40 0A FD 08  FA 0B 7A 01  1A 7B 6A 01  6B 08 63 06   @.....z..{j.k.c.
000C00  86 05 FD 08  9B 08 08 08  D5 01 F8 0B  63 06 E3 05   ............c...
000C10  7A 01 14 0C  16 00 E1 5C  26 00 E5 D5  C3 27 01 21   z......\&....'.!
000C20  0C D1 E1 63  E5 C3 27 01  00 00 00 00  00 01 00 CC   ...c..'.........
000C30  40 01 40 00  40 01 20 00  40 01 07 00  40 01 D8 00   @.@.@. .@...@...
000C40  40 01 47 00  40 01 90 00  40 01 0C 00  40 01 04 00   @.G.@...@...@...
000C50  40 01 0C 00  40 01 08 00  40 01 80 00  40 01 40 00   @...@...@...@.@.
000C60  40 01 04 00  40 01 02 00  40 01 01 00  40 01 01 00   @...@...@...@...
000C70  40 01 80 00  40 01 40 00  40 01 02 00  40 01 17 00   @...@.@.@...@...
000C80  40 01 15 00  40 01 12 00  40 01 02 00  40 01 09 00   @...@...@...@...
000C90  40 01 2A 00  40 01 09 00  21 59 80 3A  29 82 FE 01   @.*.@...!Y.:)...
000CA0  28 04 CB 9E  18 02 CB DE  3A 5A 80 B6  D3 03 DB 01   (.......:Z......
000CB0  32 88 81 C5  D5 00 3A 5C  80 FE EE 2B  03 C3 43 10   2.....:\...+..C.
000CC0  3A 55 80 FE  01 CA 0B 0E  06 8E 10 FE  DB 01 EE 20   :U.............
000CD0  4F 3A 29 82  FE 01 20 0F  21 59 80 3A  5A 80 B6 CB   O:)... .!Y.:Z...
000CE0  9F 06 91 10  FE D3 03 21  35 82 CB 7E  C2 A1 0D CB   .......!5..~....
000CF0  46 20 14 3A  36 82 CB 27  CB AE CB 69  28 04 CB EE   F :6.'...i(...
000D00  CB C7 32 36  82 18 0D 79  AE CB 6F 28  4A 21 37 82   ..26...y..o(J!7.
000D10  34 21 35 82  CB 4E 20 17  3A 36 82 E6  0F FE 0E C2   4!5..N :6.......
000D20  A1 0D CB CE  3E 00 32 36  82 32 37 82  C3 A1 0D 7B   ....>.26.27....~
000D30  EE 01 77 CB  57 20 0E 3A  37 82 FE 04  C2 A1 0D CB   ..w.W :7........
000D40  D6 3E 00 18  35 CB 5E 20  4C 3A 37 82  FE 05 C2 A1   .>..5.^ L:7.....
000D50  0D CB DE 3E  01 18 23 3A  37 82 F6 80  32 5B 82 3A   ...>..#:7...2[.:
000D60  35 82 32 5C  82 3A 36 82  32 5D 82 3E  00 32 35 82   5.2\.:6.2].>.25.
000D70  3E 00 18 06  CB FE 79 C3  A1 0D 21 33  82 86 86 5F   >.....y...!3..._
000D80  16 00 3A 36  82 21 38 82  19 77 3E 00  32 36 82 32   ..:6.!8..w>.26.2
000D90  37 82 C3 A1  0D 3E 00 77  3A 33 82 3C  E6 0F 32 33   7....>.w:3.<..23
000DA0  82 3A 5B 82  FE 00 28 0D  3E 00 32 2B  82 32 2C 82   .:[...(.>.2+.2,.
000DB0  32 90 81 18  46 21 2C 82  3E 00 BE 20  20 21 2B 82   2...F!,.>.. !+.
```

```
000DC0  BE 28 38 35  21 2C 82 36  08 11 00 00  3A 2B 82 5F  .(85!,.6....:+._
000DD0  21 32 82 87  ED 52 7E 32  28 82 21 2C  82 35 21 28  !2...R~2(.!,.5!(
000DE0  82 3E 00 CB  7E 28 02 3E  01 32 29 82  CB 26 21 35  .>..~(.>.2)..&!5
000DF0  82 CB BE 3E  07 32 90 81  C3 53 0F 3A  27 82 FE 00  ...>.2...S.:'...
000E00  CA 53 0F 21  35 82 CB FE  C3 53 0F 3A  84 81 FE 00  .S.!5....S.:....
000E10  20 15 3E 01  32 29 82 3A  83 81 FE 01  C2 9F 0E 3E   .>.2).:.......>
000E20  00 32 90 81  C3 2B 0F 21  86 81 3E 00  BE 20 1A 3E  .2...+.!..>.. .>
000E30  0B 77 21 85  81 4E 34 06  00 21 82 80  09 7E 32 87  .w!..N4..!...~2.
000E40  81 3E 00 32  29 82 C3 44  0F 3E 03 BE  20 13 3A 85  .>.2)..D.>.. .:.
000E50  81 FE 01 28  07 3E 06 32  87 81 18 05  3E 07 32 87  ...(.>.2....>.2.
000E60  81 21 87 81  7E E6 01 32  29 82 CB 1E  21 86 81 35  .!..~..2)...!..5
000E70  3E 00 BE C2  44 0F 21 84  81 35 3E 00  BE C2 44 0F  >...D.!..5>...D.
000E80  32 85 81 3A  82 81 FE 00  28 15 3E 09  32 86 81 3E  2..:....(.>.2..>
000E90  01 32 60 82  3A 59 80 CB  B7 32 59 80  C3 44 0F 3A  .2`.:Y...2Y..D.:
000EA0  82 81 FE 00  CA 2B 0F 3A  60 82 FE 01  C2 44 0F 3A  .....+.:`....D.:
000EB0  59 80 CB 77  20 16 3A 88  81 CB 6F C2  44 0F 21 59  Y..w .:...o.D.!Y
000EC0  80 CB F6 3A  5A 80 B6 D3  03 C3 44 0F  3A 86 81 FE  ...:Z.....D.:...
000ED0  00 20 32 3A  88 81 CB 6F  28 47 21 85  81 4E 34 06  . 2:...o(G!..N4.
000EE0  00 21 02 81  09 3A 87 81  77 21 82 81  35 3E 00 BE  .!...:..w!..5>..
000EF0  28 39 3E 09  32 86 81 21  59 80 CB B6  3A 5A 80 B6  (9>.2..!Y...:Z..
000F00  D3 03 C3 44  0F 21 86 81  7E 35 FE 01  CA 44 0F 21  ...D.!..~5...D.!
000F10  87 81 CB 3E  3A 88 81 CB  6F CA 44 0F  CB FE C3 44  ...>:...o.D....D
000F20  0F 21 8A 81  CB C6 3E 00  32 82 81 3E  00 32 60 82  .!....>.2..>.2`.
000F30  32 85 81 32  86 81 32 82  81 32 83 81  3A 59 80 CB  2..2..2..2..:Y..
000F40  F7 32 59 80  3E 00 21 5F  82 BE 28 04  35 C3 43 10  .2Y.>.!_..(.5.C.
000F50  3E 0A 77 3A  9F 81 FE 00  20 1F 3A 97  81 FE 00 28  >.w:.... .:....(
000F60  2A 3A 98 81  FE 00 20 02  3E 01 32 9F  81 3A 59 80  *:.... .>.2..:Y.
000F70  21 97 81 AE  32 59 80 18  12 21 9F 81  35 20 0C 3A  !...2Y...!..5 .:
000F80  59 80 21 97  81 AE 32 59  80 36 00 CD  63 10 3A A3  Y.!...2Y.6..c.:.
000F90  81 FE 01 CC  63 10 3A 6F  80 FE FF 20  0F DB 01 CB  ....c.:o... ....
000FA0  77 28 28 DB  03 E6 0F 32  6F 80 18 1F  DB 01 CB 77  w((....2o......w
000FB0  20 19 3A 70  80 5F 16 00  3C E6 02 32  70 80 3A 6F   .:p._...<..2p.o
000FC0  80 21 72 80  19 77 3E FF  32 6F 80 3A  6C 80 FE 00  .!r..w>.2o.:l...
000FD0  28 0A FE 01  28 26 3D 32  6C 80 18 20  06 09 3A 6B  (...(&=2l.. ..:k
000FE0  80 4F 37 38  06 21 2C 0C  7E 18 04 21  2D 0C 7E CB  .O78.!,.~..!-.~.
000FF0  39 10 F0 21  2D 0C 7E 3E  03 32 6C 80  21 A7 81 3A  9..!-.~>.2l.!..:
001000  A5 81 BE 28  03 77 18 3B  3A A4 81 FE  00 28 1C ED  ...(.w.;:....(..
001010  6B AB 81 ED  63 AD 81 ED  6B A9 81 ED  63 AB 81 21  k...c...k...c..!
001020  00 00 ED 63  A9 81 3E 00  32 A4 81 3A  AA 81 FE 0F  ...c..>.2..:....
001030  28 11 ED 6B  A9 81 23 3A  A3 81 FE 00  28 01 23 ED  (..k..#:....(.#.
001040  63 A9 81 21  59 80 3A 5A  80 B6 32 62  82 CB 5F C2  c..!Y.:Z..2b.._.
001050  58 10 3E 01  21 89 81 77  3E 01 32 61  82 D1 C1 E1  X.>.!..w>.2a....
001060  F1 ED 45 3E  00 21 AF 81  BE 28 01 35  3E 00 21 8F  ..E>.!...(.5>.!.
001070  81 BE 28 01  35 21 91 81  BE 28 09 35  BE 20 05 21  ..(.5!...(.5. .!
001080  5A 80 CB CE  21 90 81 BE  28 01 35 21  8E 81 BE 28  Z...!...(.5!...(
001090  01 35 21 8D  81 BE 28 01  35 21 9C 81  35 20 14 21  .5!...(.5!..5 .!
0010A0  63 82 34 3E  78 32 9C 81  21 63 80 35  20 05 3E D7  c.4>x2..!c.5 .>.
0010B0  D3 03 C7 21  64 82 3E 00  BE 28 05 35  21 63 82 35  ...!d.>..(.5!c.5
0010C0  C9 C3 10 F5  C5 E5 F3 26  00 06 08 3E  00 32 61 82  .......&...>.2a.
0010D0  3A 61 82 FE  01 20 F9 3A  62 82 CB E7  4F CB 24 DB  :a... .:b...O.$.
0010E0  01 CB 67 20  02 CB C4 79  CB A7 D3 03  79 D3 03 10  ..g ...y....y...
0010F0  EC 7C 21 CC  81 35 4E 06  00 21 BC 81  09 77 79 FE  .|!..5N..!...wy.
001100  00 C2 C7 10  FB E1 C1 F1  C3 27 01 0D  11 E1 3E 00  .........'....>.
001110  BE 28 01 35  0A 03 6F 0A  03 67 5E 23  56 EB E9 40  .(.5..o..g^#V..@
001120  01 04 00 40  01 11 00 40  01 80 00 40  01 20 00 40  ...@...@...@. .@
001130  01 10 00 40  01 08 00 40  01 10 00 40  01 0B 00 40  ...@...@...@...@
001140  01 11 00 40  01 02 00 40  01 08 00 40  01 08 00 40  ...@...@...@...@
001150  01 64 00 40  01 10 00 40  01 0A 00 40  01 01 00 40  .d.@...@...@...@
001160  01 07 00 40  01 07 00 40  01 08 00 40  01 04 00 40  ...@...@...@...@
001170  01 02 00 40  01 01 00 40  01 46 00 40  01 80 00 40  ...@...@.F.@...@
001180  01 FF 00 40  01 F0 00 40  01 0F 00 40  01 08 00 40  ...@...@...@...@
001190  01 04 00 40  01 03 00 40  01 7F 00 40  01 06 00 40  ...@...@...@...@
0011A0  01 07 00 6A  01 7A 01 6A  01 56 07 30  04 7A 01 6A  ...j.z.j.V.0.z.j
0011B0  01 D5 01 04  00 30 04 7A  01 6A 01 D5  01 08 00 30  .....0.z.j.....0
0011C0  04 7A 01 6A  01 D5 01 0A  00 30 04 7A  01 6A 01 D5  .z.j.....0.z.j..
0011D0  01 0C 00 30  04 7A 01 6A  01 D5 01 0A  00 30 04 7A  ...0.z.j.....0.z
0011E0  01 6A 01 08  06 CA 09 81  02 0C 00 00  06 C3 11 00  .j..............
0011F0  06 D7 11 6D  06 F9 05 C3  11 6D 06 7A  01 6A 01 08  ...m.....m.z.j..
001200  06 CA 09 81  02 0C 00 00  06 CD 11 00  06 D7 11 6D  ...............m
001210  06 F9 05 CD  11 6D 06 7A  01 6A 01 08  06 CD 11 63  .....m.z.j.....c
001220  06 8D 05 08  06 1B 06 FD  11 9D 05 7A  01 6A 01 08  ...........z.j..
001230  06 81 02 02  00 B9 11 63  06 7A 01 0A  01 00 06 30  .......c.z.....0
001240  05 81 02 0A  00 56 07 23  06 2D 12 EE  07 56 07 23  .....V.#.-...V.#
001250  06 30 05 81  02 12 00 1B  06 F3 05 00  06 F9 05 56  .0.............V
001260  07 23 06 2D  12 EE 07 56  07 23 06 AF  11 56 07 23  .#.-...V.#...V.#
```

```
001270   06 AF 11 AE   06 1B 06 AE   06 38 06 D2   09 81 02 0C   .........8......
001280   00 1B 06 19   12 D3 18 73   02 08 00 F9   05 19 12 F9   .........s......
001290   05 73 02 AA   FF 7A 01 6A   01 00 06 30   05 81 02 08   .s...z.j...0....
0012A0   00 46 06 F3   05 EE 07 1B   06 F3 05 00   06 CD 11 63   .F.............c
0012B0   06 D3 18 00   06 C3 11 63   06 2D 12 00   06 D1 04 81   .......c.-......
0012C0   02 26 00 F3   05 08 06 C3   11 63 06 2D   12 42 04 00   .&.......c.-.B..
0012D0   06 08 06 C3   11 63 06 FD   11 00 06 D5   01 04 00 23   .....c.........#
0012E0   06 E1 11 73   02 0E 00 42   04 00 06 D5   01 04 00 23   ...s...B.......#
0012F0   06 FD 11 08   06 56 07 23   06 B9 11 6D   06 8D 05 1B   .....V.#...m....
001300   06 F3 05 F9   05 08 06 9D   05 73 02 EE   FF 7A 01 6A   .........s...z.j
001310   01 46 07 3B   12 97 12 7A   01 6A 01 D5   01 DF 86 7A   .F.;...z.j.....z
001320   01 6A 01 08   06 19 13 6D   06 08 06 30   05 81 02 06   .j.....m...0....
001330   00 F3 05 EE   07 D7 11 19   13 F9 05 6D   06 7A 01 6A   ...........m.z.j
001340   01 08 06 D7   11 63 06 63   06 C1 04 7A   01 6A 01 08   .....c.c...z.j..
001350   06 3F 13 B4   04 81 02 04   00 EE 07 46   07 00 06 D7   .?.........F....
001360   11 63 06 6D   05 08 06 C3   11 63 06 00   06 CD 11 63   .c.m.....c.....c
001370   06 19 13 63   06 0F 13 0F   13 21 13 7A   01 6A 01 4D   ...c.....!.z.j.M
001380   13 46 07 00   06 C3 11 6D   06 46 07 00   06 CD 11 6D   .F.....m.F.....m
001390   06 4E 07 00   06 B9 11 6D   06 19 13 63   06 0F 13 21   .N.....m...c...!
0013A0   13 7A 01 6A   01 19 13 63   06 08 06 30   05 81 02 04   .z.j...c...0....
0013B0   00 EE 07 08   06 08 06 C3   11 63 06 F9   05 CD 11 63   .........c.....c
0013C0   06 0F 13 21   13 7A 01 6A   01 08 06 D5   01 5D 80 6D   ...!.z.j.....].m
0013D0   06 19 13 63   06 30 05 81   02 06 00 F3   05 EE 07 08   ...c.0..........
0013E0   06 D5 01 E5   86 E9 05 08   06 C3 11 63   06 0F 06 81   ...........c....
0013F0   02 04 00 C7   13 CD 11 63   06 0F 06 81   02 04 00 C7   .......c........
001400   13 7A 01 6A   01 D5 01 E5   86 6D 06 19   13 63 06 C7   .z.j.....m...c..
001410   13 7A 01 6A   01 AF 11 08   06 8D 05 AE   06 D5 01 A0   .z.j............
001420   05 D5 01 3C   00 04 0A 79   04 2F 06 51   05 81 02 0C   ...<...y./.Q....
001430   00 4E 07 1F   18 DB 18 73   02 06 00 9D   05 9F 06 7A   .N.....s.......z
001440   01 6A 01 D5   01 13 14 03   14 7A 01 6A   01 19 13 63   .j.......z.j...c
001450   06 0F 06 30   05 81 02 04   00 EE 07 AF   11 AE 06 61   ...0...........a
001460   15 79 04 2F   06 51 05 81   02 28 00 46   06 A3 13 8D   .y./.Q...(.F....
001470   05 AD 05 A7   11 63 06 0F   06 81 02 08   00 AD 05 F9   .....c..........
001480   05 E3 05 9D   05 2F 11 83   07 D5 01 00   00 D5 01 00   ...../..........
001490   00 D5 01 F5   86 9F 06 7A   01 6A 01 08   06 8D 05 AF   .......z.j......
0014A0   11 9F 06 AD   05 A7 11 6D   06 AD 05 A3   11 6D 06 9D   ...m.....m...m..
0014B0   05 7D 13 7A   01 6A 01 AF   11 AE 06 61   15 79 04 2F   .}.z.j.....a.y./
0014C0   06 51 05 81   02 0A 00 46   06 46 07 73   02 08 00 F3   .Q.....F.F.s....
0014D0   05 4E 07 F8   06 7A 01 6A   01 19 13 63   06 81 02 04   .N...z.j...c....
0014E0   00 EE 07 D5   01 F9 86 D5   01 D9 88 00   06 38 04 08   .............8..
0014F0   06 46 07 38   06 59 19 B4   04 81 02 16   00 D5 01 F9   .F.8.Y..........
001500   86 D5 01 D9   98 00 06 38   04 83 07 D5   01 5F 80 B9   .......8....._..
001510   18 7A 01 6A   01 08 06 63   06 51 04 46   07 F8 06 F9   .z.j...c.Q.F....
001520   05 6D 06 7A   01 6A 01 D5   01 75 83 77   06 D5 01 3C   .m.z.j...u.w...<
001530   00 31 03 D5   01 74 83 77   06 30 04 7A   01 6A 01 D5   .1...t.w.0.z.j..
001540   01 3C 00 0A   0A 7A 01 6A   01 25 15 D5   01 86 8A 63   .<...z.j.%.....c
001550   06 0F 06 81   02 0A 00 30   04 D5 01 A0   05 F0 09 7A   .......0.......z
001560   01 6A 01 47   15 3D 15 D5   01 73 83 77   06 46 07 67   .j.G.=...s.w.F.g
001570   04 7A 01 6A   01 A3 11 46   07 F9 05 6D   06 7A 01 6A   .z.j...F...m.z.j
001580   01 8D 05 08   06 8D 05 D5   01 73 15 9D   05 46 07 61   .........s...F.a
001590   15 67 04 9D   05 99 14 7A   01 6A 01 F9   05 D5 01 3C   .g.....z.j.....<
0015A0   00 31 03 08   06 D5 01 FF   00 8D 04 30   05 81 02 06   .1.........0....
0015B0   00 4E 07 9A   04 F9 05 7F   15 7A 01 6A   01 4B 14 7A   .N.......z.j.K.z
0015C0   01 6A 01 D5   01 01 00 42   19 08 06 D5   01 B6 89 80   .j.....B........
0015D0   06 48 0C 8D   04 D5 01 83   82 80 06 D5   01 03 00 42   .H.............B
0015E0   19 D5 01 B7   89 80 06 D5   01 02 00 42   19 D5 01 B8   ...........B....
0015F0   89 80 06 D5   01 59 80 77   06 D5 01 B3   89 80 06 D5   .....Y.w........
001600   01 5A 80 77   06 D5 01 B4   89 80 06 D5   01 97 81 77   .Z.w...........w
001610   06 D5 01 B5   89 80 06 7A   01 6A 01 46   07 D5 01 B9   .......z.j.F....
001620   83 80 06 46   07 C3 4E DB   4E 23 11 1F   11 31 03 00   ...F..N.N#...1..
001630   06 30 04 F9   05 F2 01 6B   16 B9 05 63   06 08 06 CA   .0.....k...c....
001640   09 81 02 20   00 51 04 46   07 F8 06 08   06 B9 05 6D   ...Q.F.......m
001650   06 CA 09 81   02 0A 00 4E   07 D5 01 89   83 80 06 73   .......N.......s
001660   02 04 00 F3   05 1F 11 58   02 D0 FF D5   01 AB 89 13   .......[........
001670   15 7A 01 6A   01 41 14 D5   01 63 89 0B   11 D5 01 62   .z.j.A...c.....b
001680   89 0B 11 46   07 D5 01 83   83 80 06 46   07 D5 01 7F   ...F.......F....
001690   83 80 06 7A   01 6A 01 D5   01 2D 00 E8   04 D5 01 75   ...z.j...-.....u
0016A0   83 77 06 D5   01 17 00 C1   04 8D 04 81   02 0E 00 4E   .w.............N
0016B0   07 D5 01 7F   83 80 06 73   02 0E 00 D5   01 7F 83 77   .......s.......w
0016C0   06 81 02 04   00 73 16 D7   14 C1 15 C9   6D 7A 01 6A   .....s......mz.j
0016D0   01 D5 01 83   83 77 06 81   02 0A 00 D5   01 07 00 73   .....w.........s
0016E0   02 08 00 D5   01 78 83 77   06 7A 01 6A   01 BB 15 D5   .....x.w.z.j....
0016F0   01 73 83 08   06 77 06 42   04 D5 01 3C   00 F0 09 08   .s...w.B...<....
001700   06 1B 06 80   06 CA 09 81   02 04 00 EE   07 19 16 D5   ................
001710   01 74 83 08   06 77 06 42   04 D5 01 3C   00 F0 09 08   .t...w.B...<....
```

```
001720  06 1B 06 80  06 08 06 95  16 CA 09 81  02 04 00 EE  ................
001730  07 D5 01 75  83 08 06 77  06 42 04 D5  01 18 00 F0  ...u...w.B......
001740  09 08 06 1B  06 80 06 CA  09 81 02 04  00 EE 07 73  ...............s
001750  16 D5 01 78  83 08 06 77  06 42 04 D5  01 07 00 F0  ...x...w.B......
001760  09 08 06 1B  06 80 06 CA  09 81 02 04  00 EE 07 7A  ...............z
001770  01 6A 01 D5  01 64 82 77  06 81 02 04  00 EE 07 D5  .j...d.w........
001780  01 63 82 77  06 81 02 38  00 4E 07 D5  01 64 82 80  .c.w...8.N...d..
001790  06 EB 16 D5  01 73 83 77  06 D5 01 3C  00 F0 09 30  .....s.w...<...0
0017A0  05 D5 01 A3  81 77 06 8D  04 81 02 14  00 EB 16 D5  .....w..........
0017B0  01 74 83 77  06 56 07 F0  09 81 02 04  00 EB 16 7A  .t.w.V.........z
0017C0  01 6A 01 8D  05 BF 08 31  03 C1 06 7D  05 56 07 BF  .j.....1...}.V..
0017D0  08 31 03 30  04 30 04 8D  05 E3 05 7D  05 9D 05 B2  .1.0.0.....}....
0017E0  09 81 02 2C  00 D5 01 68  82 08 06 AE  06 9D 05 D5  ...,...h........
0017F0  01 10 00 09  04 81 02 08  00 0A 19 73  02 0A 00 F9  ...........s....
001800  05 8D 05 0A  19 9D 05 1B  06 9F 06 73  02 08 00 4E  ...........s...N
001810  07 1F 18 F3  05 7A 01 6A  01 4C 0A 1A  17 7A 01 6A  .....z.j.L...z.j
001820  01 0F 06 81  02 12 00 9D  05 9D 05 F9  05 8D 05 F9  ................
001830  05 51 04 73  02 EC FF 7A  01 6A 01 D5  01 8E 81 80  .Q.s...z.j......
001840  06 D5 01 8E  81 77 06 30  05 81 02 F6  FF 7A 01 6A  .....w.0.....z.j
001850  01 46 07 F2  01 63 18 8A  79 D5 01 14  00 39 18 43  .F...c..y....9.C
001860  02 F6 FF 7A  01 6A 01 30  05 81 02 04  00 EE 07 D5  ...z.j.0........
001870  01 08 00 46  07 F2 01 8D  18 D5 01 0A  00 39 18 11  ...F.........9..
001880  55 D5 01 05  00 39 18 FF  54 43 02 EE  FF D5 01 1E  U....9..TC......
001890  00 39 18 7A  01 6A 01 D5  01 97 81 77  06 30 05 81  .9.z.j.....w.0..
0018A0  02 F6 FF D5  01 98 81 80  06 D5 01 97  81 80 06 7A  ...............z
0018B0  01 6A 01 F9  05 80 06 7A  01 6A 01 08  06 77 06 42  .j.....z.j...w.B
0018C0  04 B1 18 7A  01 6A 01 80  06 7A 01 6A  01 F9 05 F3  ...z.j...z.j....
0018D0  05 7A 01 6A  01 1B 06 1B  06 7A 01 6A  01 F3 05 46  .z.j.....z.j...F
0018E0  06 7A 01 E5  18 E1 7C B5  CA 27 01 FD  4E 00 FD 23  .z....|..'..N..#
0018F0  FD 46 00 FD  23 C3 27 01  6A 01 4E 07  F9 05 CB 07  .F..#.'.j.N.....
001900  D5 01 FF FF  A7 04 8D 04  7A 01 6A 01  4E 07 F9 05  ........z.j.N...
001910  CB 07 9A 04  7A 01 6A 01  C1 06 CB 07  4E 07 8D 04  ....z.j.....N...
001920  7A 01 6A 01  1B 06 00 06  F8 18 D3 18  CB 07 9A 04  z.j.............
001930  7A 01 6A 01  C1 06 CB 07  4E 07 8D 04  4E 07 C1 04  z.j.....N...N...
001940  7A 01 6A 01  BE 07 7A 01  4A 19 E1 7D  D3 03 0A 03  z.j...z.J..}....
001950  6F 0A 03 67  5E 23 56 EB  E9 6A 01 00  06 30 04 F9  o..g^#V..j...0..
001960  05 46 07 D3  18 F2 01 7B  19 00 06 B9  05 77 06 C1  .F.....{.....w..
001970  04 81 02 04  00 42 04 43  02 F0 FF F9  05 F3 05 BA  .....B.C........
001980  09 7A 01 6A  01 1B 06 1F  07 F8 06 7A  01 6A 01 46  .z.j.......z.j.F
001990  07 D5 01 39  83 80 06 46  07 F2 01 C1  19 2F 06 B9  ...9...F...../..
0019A0  05 30 04 77  06 F9 05 B9  05 30 04 77  06 B2 09 81  .0.w.....0.w....
0019B0  02 0C 00 4E  07 D5 01 39  83 80 06 33  02 43 02 DE  ...N...9...3.C..
0019C0  FF 46 06 D5  01 39 83 77  06 4E 07 C1  04 7A 01 6A  .F...9.w.N...z.j
0019D0  01 46 07 D5  01 91 82 6D  06 D5 01 0F  27 D5 01 8F  .F.....m....'...
0019E0  82 6D 06 D5  01 FA 00 D5  01 8E 82 80  06 46 07 D5  .m...........F..
0019F0  01 BD 82 80  06 D5 01 FA  00 D5 01 8C  82 80 06 46  ...............F
001A00  07 D5 01 8B  82 80 06 46  07 D5 01 86  82 80 06 46  .......F.......F
001A10  07 D5 01 87  82 80 06 46  07 D5 01 1D  83 80 06 46  .......F.......F
001A20  07 D5 01 88  82 80 06 46  07 D5 01 89  82 80 06 46  .......F.......F
001A30  07 D5 01 19  83 80 06 46  07 D5 01 1A  83 80 06 46  .......F.......F
001A40  07 D5 01 1B  83 80 06 46  07 D5 01 82  82 80 06 7A  .......F.......z
001A50  01 53 1A FB  0A 03 6F 0A  03 67 5E 23  56 EB E9 61  .S....o..g^#V..a
001A60  1A F3 0A 03  6F 0A 03 67  5E 23 56 EB  E9 6A 01 7A  ....o..g^#V..j.z
001A70  01 6A 01 5F  1A 46 07 D5  01 7A 82 80  06 46 07 D5  .j._.F...z...F..
001A80  01 CE 81 80  06 46 07 D5  01 7B 82 80  06 46 07 D5  .....F...{...F..
001A90  01 7C 82 80  06 46 07 D5  01 CC 81 80  06 46 07 D5  .|...F.......F..
001AA0  01 CD 81 80  06 46 07 D5  01 A4 81 80  06 46 07 D5  .....F.......F..
001AB0  01 A5 81 6D  06 46 07 D5  01 A7 81 6D  06 46 07 D5  ...m.F.....m.F..
001AC0  01 91 82 6D  06 46 07 D5  01 A9 81 6D  06 46 07 D5  ...m.F.....m.F..
001AD0  01 AB 81 6D  06 46 07 D5  01 AD 81 6D  06 46 07 D5  ...m.F.....m.F..
001AE0  01 7E 82 80  06 4E 07 D5  01 85 82 8D  06 51 1A 7A  .~...N.......Q.z
001AF0  01 6A 01 D5  01 FA 00 39  18 D5 01 FA  00 39 18 71  .j.....9.....9.q
001B00  1A 58 0C AB  23 95 18 7A  01 6A 01 D5  01 55 80 77  .X..#..z.j...U.w
001B10  06 D5 01 A3  81 77 06 9A  04 81 02 08  00 4E 07 73  .....w.......N.s
001B20  02 04 00 3F  11 7A 01 6A  01 53 11 31  03 D5 01 CA  ...?.z.j.S.1....
001B30  8A 30 04 7A  01 40 01 FF  FF 40 01 A0  05 40 01 E0  .0.z.@...@...@..
001B40  00 40 01 18  00 40 01 07  00 6A 01 00  06 CA 09 D5  .@...@...j......
001B50  01 6F 85 77  06 9A 04 81  02 04 00 EE  07 08 06 35  .o.w...........5
001B60  1B C1 04 81  02 7C 00 4E  07 D5 01 6F  85 80 06 00  .....|.N...o....
001B70  06 D5 01 79  83 77 06 42  04 D5 01 07  00 F0 09 F9  ...y.w.B........
001B80  05 46 07 D7  1E 08 06 35  1B C1 04 81  02 06 00 F3  .F.....5........
001B90  05 EE 07 00  06 5E 07 D1  04 81 02 42  00 5E 07 CB  .....^.....B.^..
001BA0  07 8D 05 D5  01 3C 00 31  03 30 04 39  1B 30 04 D5  .....<.1.0.9.0..
001BB0  01 A4 06 1F  07 D5 01 05  00 CB 07 9D  05 9A 04 D5  ................
001BC0  01 07 00 9A  04 F9 05 F3  05 2F 06 F9  05 43 11 31  ........./...C.1
```

```
001BD0  03 D5 01 94   91 30 04 6D   06 73 02 06   00 46 06 F3   .....O.m.s...F.
001BE0  05 7A 01 6A   01 49 1B F9   05 F3 05 7A   01 6A 01 08   .z.j.I.....z.j.
001BF0  06 43 11 31   03 D5 01 94   91 30 04 63   06 E3 1B 08   .C.1.....O.c...
001C00  06 35 1B C1   04 81 02 0C   00 F3 05 46   07 4E 07 66   .5.........F.N.f
001C10  07 EE 07 08   06 D5 01 FB   FF CB 07 F9   05 41 1B 8D   .............A.
001C20  04 D5 01 FD   FF CB 07 46   07 7A 01 6A   01 D5 01 7E   .......F.z.j...~
001C30  8A 77 06 81   02 08 00 46   06 46 07 EE   07 30 05 F9   .w.....F.F...0.
001C40  05 4E 07 C1   04 8D 04 81   02 1E 00 D5   01 55 80 77   .N...........U.w
001C50  06 81 02 0C   00 D5 01 51   8A 63 06 73   02 06 00 D5   .......Q.c.s....
001C60  01 1E 00 73   02 04 00 46   07 7A 01 6A   01 D5 01 2B   ...s...F.z.j...+
001C70  1C 66 07 D5   01 04 00 C1   17 7A 01 6A   01 08 06 8D   .f.......z.j....
001C80  05 ED 1B 81   02 0E 00 4E   07 1F 18 F3   05 46 06 46   .......N.....F.F
001C90  07 EE 07 AD   05 30 05 81   02 0A 00 08   06 D5 01 53   .....0.........S
001CA0  8A 80 06 AD   05 6B 1C 08   06 8D 05 38   04 47 15 08   .....k.....8.G..
001CB0  06 1B 06 D1   04 B4 04 F9   05 00 06 AD   05 CA 09 8D   ................
001CC0  04 81 02 0C   00 9D 05 9D   05 0B 3C 73   02 0A 00 56   ..........<s...V
001CD0  07 1F 18 46   06 F3 05 7A   01 40 01 00   C0 40 01 7F   ...F...z.@...@.
001CE0  00 6A 01 08   06 66 07 C1   04 81 02 04   00 EE 07 08   .j...f..........
001CF0  06 D9 1C 8D   04 D9 1C B2   09 81 02 04   00 EE 07 08   ................
001D00  06 41 1B 45   1B 9A 04 8D   04 8D 05 D5   01 FB FF CB   .A.E............
001D10  07 08 06 DD   1C 8D 04 8D   05 D5 01 F9   FF CB 07 08   ................
001D20  06 4E 07 32   19 81 02 0A   00 D5 01 12   85 73 02 06   .N.2.........s..
001D30  00 D5 01 10   85 63 06 9D   05 1B 06 46   07 32 19 81   .....c.....F.2..
001D40  02 04 00 C1   06 30 04 D5   01 05 00 CB   07 9D 05 9A   .....0..........
001D50  04 7A 01 6A   01 35 1B F9   05 53 11 00   06 30 04 F9   .z.j.5...S...0.
001D60  05 F2 01 81   1D B9 05 63   06 08 06 35   1B C1 04 81   .......c...5....
001D70  02 06 00 F3   05 33 02 F9   05 F3 05 43   11 5B 02 E6   .....3.....C.[..
001D80  FF 7A 01 6A   01 4B 11 31   03 D5 01 0A   91 30 04 30   .z.j.K.1.....0.0
001D90  04 77 06 08   06 7F 11 C1   04 81 02 08   00 66 07 73   .w...........f.s
001DA0  02 0E 00 53   11 31 03 D5   01 CA 8A 30   04 46 07 7A   ...S.1.....0.F.z
001DB0  01 6A 01 8D   05 83 1D 81   02 0C 00 4E   07 1F 18 46   .j.........N...F
001DC0  06 35 1B EE   07 9D 05 43   11 31 03 30   04 63 06 7A   .5.....C.1.0.c.z
001DD0  01 6A 01 D5   01 79 83 77   06 51 04 D5   01 07 00 F0   .j...y.w.Q......
001DE0  09 00 06 83   1D 81 02 06   00 46 06 EE   07 53 1D 08   .........F...S..
001DF0  06 35 1B C1   04 81 02 06   00 46 06 EE   07 41 1B 8D   .5.......F...A..
001E00  04 D5 01 FD   FF CB 07 F9   05 D5 01 B6   91 30 04 80   .............0.
001E10  06 7A 01 6A   01 D5 01 79   83 77 06 F9   05 08 06 D5   .z.j...y.w.....
001E20  01 B6 91 30   04 35 1B 47   11 46 07 F2   01 6B 1E 4F   ...0.5.G.F...k.O
001E30  06 B9 05 B1   1D F9 05 F3   05 08 06 35   1B C1 04 81   ...........5....
001E40  02 04 00 33   02 E1 1C 08   06 D5 01 FB   FF CB 07 47   ...3...........G
001E50  15 10 05 81   02 04 00 33   02 2F 06 41   1B 8D 04 D5   .......3./.A....
001E60  01 FD FF CB   07 B1 18 43   02 C6 FF 8D   05 F3 05 46   .......C.......F
001E70  06 9D 05 7A   01 6A 01 08   06 8D 05 D1   1D D5 01 79   ...z.j.........y
001E80  83 77 06 AD   05 83 1D F9   05 F3 05 81   02 08 00 35   .w.............5
001E90  1B 73 02 06   00 AD 05 13   1E 9D 05 43   11 31 03 D5   .s.........C.1.
001EA0  01 94 91 30   04 6D 06 7A   01 6A 01 D5   01 75 1E 66   ...0.m.z.j...u.f
001EB0  07 4E 07 C1   17 7A 01 6A   01 08 06 41   1B 8D 04 D5   .N...z.j...A...
001EC0  01 FD FF CB   07 F9 05 D5   01 FB FF CB   07 D5 01 3C   ...............<
001ED0  00 09 04 1B   06 7A 01 6A   01 B1 1D 08   06 35 1B B2   .....z.j.....5..
001EE0  09 81 02 06   00 E1 1C B7   1E 7A 01 6A   01 8D 05 42   .........z.j...B
001EF0  04 08 06 47   11 D1 04 81   02 1E 00 D5   01 79 83 77   ...G.........y.w
001F00  06 AD 05 1B   06 B1 1D 08   06 35 1B B2   09 81 02 04   .........5......
001F10  00 E1 1C 73   02 06 00 F3   05 35 1B 9D   05 43 11 31   ...s.....5...C.1
001F20  03 D5 01 94   91 30 04 6D   06 7A 01 6A   01 08 06 D5   .....O.m.z.j....
001F30  01 C7 91 30   04 77 06 8D   05 08 06 7B   1C 81 02 36   ...0.w.....{...6
001F40  00 08 06 8D   05 43 11 31   03 D5 01 94   91 30 04 63   .....C.1.....0.c
001F50  06 08 06 45   1B 8D 04 AD   05 EB 1E 41   1B 8D 04 D5   ...E.......A...
001F60  01 FD FF CB   07 08 06 9D   05 D5 01 B6   91 30 04 80   .............0.
001F70  06 73 02 0A   00 D5 01 B6   91 30 04 77   06 9D 05 D5   .s.........0.w...
001F80  01 61 89 77   06 81 02 08   00 CB 18 73   02 04 00 F3   .a.w.......s....
001F90  05 7A 01 6A   01 3F 11 46   07 F2 01 BF   1F B9 05 2F   .z.j.?.F......./
001FA0  11 31 03 D5   01 C9 87 30   04 4D 13 F3   05 B9 05 33   .1.....0.M.....3
001FB0  11 31 03 D5   01 D9 88 30   04 83 07 43   02 E0 FF 7A   .1.....0...C...z
001FC0  01 6A 01 7A   01 6A 01 4E   07 30 04 7A   01 6A 01 56   .j.z.j.N.0.z.j.V
001FD0  07 30 04 7A   01 6A 01 5E   07 30 04 7A   01 6A 01 D5   .0.z.j.^.0.z.j.
001FE0  01 04 00 30   04 7A 01 6A   01 D5 01 05   00 30 04 7A   ...0.z.j.....0.z
001FF0  01 6A 01 D5   01 06 00 30   04 7A 01 6A   01 D5 01 07   .j.....0.z.j....
002000  00 30 04 7A   01 6A 01 08   06 33 11 31   03 D5 01 D9   .0.z.j...3.1...
002010  88 30 04 08   06 8D 05 E7   1F 77 06 AD   05 F1 1F 77   .0.......w.....w
002020  06 AD 05 FB   1F 77 06 73   2E 46 07 9D   05 C1 1F 80   .....w.s.F......
002030  06 7A 01 6A   01 A3 11 46   06 06 20 7A   01 6A 01 00   .z.j...F.. z.j..
002040  06 8D 05 8D   05 D5 01 33   20 9D 05 3D   15 9D 05 2F   .......3 ..=.../
002050  11 31 03 D5   01 C9 87 30   04 99 14 7A   01 6A 01 08   .1.....0...z.j..
002060  06 8D 05 33   11 31 03 D5   01 D9 88 30   04 8D 05 AD   ...3.1.....0...
002070  05 C1 1F 77   06 08 06 30   05 F9 05 D5   01 80 83 77   ...w...0.......w
```

```
002080  06 B2 09 9A  04 AD 05 C5  1F 77 06 D5  01 81 83 77   .........w.....w
002090  06 B2 09 9A  04 AD 05 CD  1F 77 06 D5  01 82 83 77   .........w.....w
0020A0  06 B2 09 9A  04 81 02 0A  00 56 07 1F  18 46 06 EE   .........V...F..
0020B0  07 AD 05 D5  1F 77 06 D5  01 3C 00 31  03 9D 05 DD   .....w...<.1....
0020C0  1F 77 06 30  04 9D 05 F9  05 08 06 47  15 38 04 46   .w.0.......G.8.F
0020D0  07 F8 06 81  02 08 00 3D  02 73 02 06  00 F3 05 05   .......=.s......
0020E0  20 7A 01 6A  01 1B 06 F3  05 46 07 F8  06 57 11 51    z.j.....F...W.Q
0020F0  04 1F 07 63  11 31 03 D5  01 65 89 30  04 2F 06 77   ...c.1...e.0./.w
002100  06 08 06 D5  01 FF 00 B2  09 81 02 1C  00 08 06 D5   ................
002110  01 0F 00 8D  04 F9 05 D5  01 FC FF CB  07 D3 18 31   ...............1
002120  4F 42 04 73  02 D8 FF 46  06 46 06 7A  01 6A 01 D5   OB.s...F.F.z.j..
002130  01 34 00 D5  01 91 8A 80  06 D5 01 7C  00 D5 01 92   .4.........|....
002140  8A 80 06 D5  01 AC 00 D5  01 93 8A 80  06 D5 01 34   ...............4
002150  00 D5 01 94  8A 80 06 D5  01 E0 00 D5  01 95 8A 80   ................
002160  06 D5 01 1A  00 D5 01 96  8A 80 06 7A  01 6A 01 2F   ...........z.j./
002170  06 7B 39 F3  05 C1 04 81  02 08 00 46  06 73 02 04   .{9........F.s..
002180  00 43 3B 7A  01 6A 01 D5  01 91 8A 77  06 C9 36 6D   .C;z.j.....w..6m
002190  21 D5 01 92  8A 77 06 CD  36 6D 21 7A  01 6A 01 D5   !....w..6m!z.j..
0021A0  01 FF 00 C9  36 6D 21 7A  01 6A 01 D5  01 93 8A 77   ....6m!z.j.....w
0021B0  06 D1 36 6D  21 D5 01 94  8A 77 06 D5  36 6D 21 7A   ..6m!....w..6m!z
0021C0  01 6A 01 D5  01 FF 00 D1  36 6D 21 7A  01 6A 01 D5   .j......6m!z.j..
0021D0  01 95 8A 77  06 D9 36 6D  21 D5 01 96  8A 77 06 DD   ...w..6m!....w..
0021E0  36 6D 21 7A  01 6A 01 D5  01 FF 00 D9  36 6D 21 7A   6m!z.j......6m!z
0021F0  01 6A 01 46  07 53 50 F5  35 C1 04 46  07 C3 4E DB   .j.F.SP.5..F..N.
002200  4E 63 06 CA  09 8D 04 79  36 7B 39 8D  04 CA 09 D5   Nc.....y6{9.....
002210  01 57 8A 77  06 30 05 8D  04 9A 04 01  36 9A 04 2D   .W.w.0......6..-
002220  36 9A 04 7A  01 6A 01 85  21 A9 21 CD  21 7A 01 6A   6..z.j..!.!.!z.j
002230  01 D5 01 72  83 77 06 81  02 06 00 5D  22 EE 07 F1   ...r.w.....]"...
002240  21 81 02 08  00 25 22 73  02 08 00 85  21 C1 21 E5   !....%"s....!.!.
002250  21 D5 01 14  00 D5 01 79  87 99 15 7A  01 6A 01 9D   !......y...z.j..
002260  21 CD 21 2D  36 81 02 08  00 C1 21 73  02 04 00 A9   !.!-6.....!s....
002270  21 7A 01 6A  01 D5 01 58  8A 77 06 D5  01 6E 8A 77   !z.j...X.w...n.w
002280  06 38 04 E3  06 D5 01 D5  01 AB 89 63  06 D5 01 8C   .8.........c....
002290  06 38 04 46  07 F8 06 D5  01 6E 8A 77  06 D5 01 8C   .8.F.....n.w....
0022A0  8A 77 06 38  04 E3 06 4E  07 F8 06 1A  04 31 03 D5   .w.8...N.....1..
0022B0  01 AB 89 63  06 D5 01 1E  00 30 04 38  04 46 07 F8   ...c.....0.8.F..
0022C0  06 0F 06 81  02 16 00 D5  01 8B 8A 08  06 77 06 1B   .............w..
0022D0  06 F8 06 81  18 46 07 F8  02 04 00 66  07 7A 01 6A   .....F.s...f.z.j
0022E0  01 D5 01 7E  8A 77 06 81  02 08 00 73  22 73 02 04   ...~.w.....s"s..
0022F0  00 46 07 6D  36 7B 39 F3  05 D5 01 FF  00 D1 04 9A   .F.m6{9.........
002300  04 7A 01 6A  01 D1 36 7B  39 F3 05 D5  01 FF 00 C1   .z.j..6{9.......
002310  04 81 02 12  00 4E 07 D5  01 8D 8A 80  06 A9 21 D5   .....N........!.
002320  01 14 00 EE  07 D9 36 7B  39 F3 05 D5  01 FF 00 C1   ......6{9.......
002330  04 81 02 0C  00 4E 07 D5  01 8D 8A 80  06 CD 21 D5   .....N........!.
002340  01 1E 00 7A  01 6A 01 01  36 81 02 08  00 D5 01 05   ...z.j..6.......
002350  00 EE 07 D5  01 72 83 77  06 81 02 0A  00 5D 22 D5   .....r.w.....]".
002360  01 0A 00 EE  07 F1 21 81  02 0A 00 25  22 D5 01 05   ......!....%"...
002370  00 EE 07 DF  22 81 02 06  00 4E 07 EE  07 03 23 7A   ...."....N....#z
002380  01 6A 01 D5  01 79 87 77  06 CA 09 81  02 04 00 EB   .j...y.w........
002390  07 45 23 D5  01 79 87 99  15 7A 01 6A  01 D5 01 81   .E#..y...z.j....
0023A0  23 46 07 D5  01 18 00 C1  17 7A 01 40  01 0D 00 40   #F.......z.@...@
0023B0  01 0A 00 40  01 0C 00 40  01 7D 00 40  01 60 00 40   ...@...@.}.@.`.@
0023C0  01 05 00 40  01 3E 00 40  01 7A 00 40  01 63 00 40   ...@.>.@.z.@.c.@
0023D0  01 5B 00 40  01 5F 00 40  01 4F 00 40  01 70 00 40   .[.@._.@.O.@.p.@
0023E0  01 71 00 40  01 7F 00 40  01 7B 00 40  01 73 00 40   .q.@...@.{.@.s.@
0023F0  01 33 00 40  01 4E 00 40  01 00 00 40  01 08 00 40   .3.@.N.@...@...@
002400  01 02 00 40  01 1D 00 40  01 0E 00 40  01 13 00 40   ...@...@...@...@
002410  01 0D 00 40  01 FF 00 40  01 00 00 40  01 01 00 6A   ...@...@...@...j
002420  01 B7 23 8E  02 08 00 46  07 73 02 B8  00 BB 23 8E   ..#....F.s....#.
002430  02 08 00 4E  07 73 02 AC  00 BF 23 8E  02 08 00 4E   ...N.s....#....N
002440  07 73 02 A0  00 C3 23 8E  02 08 00 56  07 73 02 94   .s....#....V.s..
002450  00 C7 23 8E  02 08 00 5E  07 73 02 88  00 CB 23 8E   ..#....^.s....#.
002460  02 0A 00 D5  01 04 00 73  02 7A 00 CF  23 8E 02 0A   .......s.z..#...
002470  00 D5 01 05  00 73 02 6C  00 D3 23 8E  02 0A 00 D5   .....s.l..#.....
002480  01 06 00 73  02 5E 00 D7  23 8E 02 0A  00 D5 01 06   ...s.^..#.......
002490  00 73 02 50  00 DB 23 8E  02 0A 00 D5  01 07 00 73   .s.P..#........s
0024A0  02 42 00 DF  23 8E 02 0A  00 D5 01 07  00 73 02 34   .B..#........s.4
0024B0  00 E3 23 8E  02 0A 00 D5  01 08 00 73  02 26 00 E7   ..#........s.&..
0024C0  23 8E 02 0A  00 D5 01 09  00 73 02 18  00 EB 23 8E   #........s....#.
0024D0  02 0A 00 D5  01 09 00 73  02 0A 00 D5  01 20 00 F9   .......s..... ..
0024E0  05 F3 05 7A  01 6A 01 D5  01 BC 81 D5  01 0B 00 30   ...z.j.........0
0024F0  04 77 06 97  11 8D 04 08  06 D5 01 C3  82 80 06 03   .w..............
002500  24 8E 02 10  00 1B 24 D5  01 84 82 80  06 66 07 73   $.....$......f.s
002510  02 4C 00 07  24 8E 02 10  00 1B 24 D5  01 84 82 80   .L..$.....$.....
002520  06 66 07 73  02 38 00 0B  24 8E 02 10  00 1B 24 D5   .f.s.8..$.....$.
```

```
002530  01 84 82 80  06 66 07 73  02 24 00 FB  23 8E 02 10   .....f.s.$..#...
002540  00 17 24 D5  01 84 82 80  06 46 07 73  02 10 00 17   ..$......F.s....
002550  24 D5 01 84  82 80 06 66  07 F9 05 F3  05 7A 01 6A   $......f.....z.j
002560  01 D5 01 75  83 77 06 D5  01 0C 00 C1  04 7A 01 6A   ...u.w.......z.j
002570  01 46 07 F9  05 08 06 7C  0C 30 04 F9  05 F2 01 9F   .F.....|.0......
002580  25 B9 05 77  06 1F 24 08  06 B9 05 80  06 D5 01 20   %..w..$........
002590  00 C1 04 81  02 06 00 F3  05 66 07 43  02 E4 FF 7A   .........f.C...z
0025A0  01 6A 01 D5  01 E6 81 90  0C D5 01 FF  00 6E 07 7A   .j...........n.z
0025B0  01 6A 01 D5  01 BC 81 D5  01 B0 81 D5  01 84 82 77   .j.............w
0025C0  06 30 04 B3  23 97 07 7A  01 6A 01 D5  01 FA 00 D5   .0..#..z.j......
0025D0  01 8E 81 80  06 D5 01 8E  81 77 06 30  05 81 02 06   .........w.0....
0025E0  00 66 07 EE  07 D5 01 A4  81 77 06 81  02 E8 FF D5   .f.......w......
0025F0  01 FA 00 D5  01 8E 81 80  06 D5 01 8E  81 77 06 30   .............w.0
002600  05 81 02 06  00 66 07 EE  07 D5 01 A4  81 77 06 30   .....f.......w.0
002610  05 81 02 E6  FF 46 07 7A  01 6A 01 D5  54 D5 01 0C   .....F.z.j..T...
002620  00 D5 01 CC  81 80 06 C1  10 7A 01 6A  01 11 55 D5   .........z.j..U.
002630  01 A4 81 77  06 81 02 06  00 66 07 EE  07 58 0C AB   ...w.....f...X..
002640  23 95 18 C9  25 81 02 06  00 66 07 EE  07 C9 25 81   #...%....f....%.
002650  02 06 00 66  07 EE 07 19  26 46 07 7A  01 6A 01 08   ...f....&F.z.j..
002660  06 77 06 D5  01 DB 91 80  06 42 04 D5  01 E6 81 D5   .w.......B......
002670  01 80 82 6D  06 7A 01 6A  01 D5 01 CF  81 7C 0C 97   ...m.z.j.....|..
002680  07 7A 01 6A  01 8D 05 46  07 F9 05 08  06 9D 05 30   .z.j...F.......0
002690  04 F9 05 F2  01 A1 26 B9  05 77 06 30  04 43 02 F8   ......&..w.0.C..
0026A0  FF D5 01 0A  00 F0 09 7A  01 6A 01 7C  0C 51 04 2F   .......z.j.|.Q./
0026B0  06 30 04 8D  05 83 26 9D  05 77 06 B2  09 7A 01 6A   .0....&..w...z.j
0026C0  01 08 06 77  26 08 06 A9  26 81 02 0E  00 F3 05 6B   ...w&...&......k
0026D0  11 D5 01 82  82 80 06 EE  07 5D 26 D5  01 E6 81 80   .........]&.....
0026E0  0C 97 07 4E  07 D5 01 7A  82 80 06 7A  01 6A 01 D5   ...N...z...z.j..
0026F0  01 BF 26 66  07 56 07 C1  17 7A 01 6A  01 D5 01 84   ..&f.V...z.j....
002700  82 77 06 D5  01 B0 81 30  04 08 06 6F  25 81 02 12   .w.....0...o%...
002710  00 F3 05 6F  11 D5 01 82  82 80 06 66  07 73 02 06   ...o.......f.s..
002720  00 ED 26 46  07 7A 01 6A  01 D5 01 BC  81 D5 01 0B   ..&F.z.j........
002730  00 30 04 08  06 77 06 D5  01 BC 81 D5  01 0A 00 30   .0...w.........0
002740  04 77 06 D5  01 07 00 16  19 D5 01 06  00 22 19 D5   .w..........."..
002750  01 BC 81 D5  01 09 00 30  04 77 06 D5  01 07 00 16   .......0.w......
002760  19 D5 01 05  00 22 19 D5  01 BC 81 D5  01 08 00 30   ....."..........
002770  04 77 06 D5  01 07 00 16  19 D5 01 04  00 22 19 B1   .w..........."..
002780  18 7A 01 6A  01 D5 01 82  82 77 06 DF  06 81 02 48   .z.j.....w.....H
002790  00 08 06 D5  01 1B 83 80  06 D5 01 88  82 B9 18 08   ................
0027A0  06 4E 07 C1  04 81 02 08  00 D5 01 19  83 B9 18 08   .N..............
0027B0  06 D5 01 04  00 C1 04 81  02 08 00 D5  01 1A 83 B9   ................
0027C0  18 D5 01 89  82 08 06 77  06 1B 06 9A  04 B1 18 46   .......w.......F
0027D0  07 D5 01 82  82 80 06 7A  01 6A 01 D5  01 86 82 B9   .......z.j......
0027E0  18 4E 07 D5  01 85 82 80  06 46 07 D5  01 DD 91 80   .N.......F......
0027F0  06 83 27 46  07 D5 01 D8  91 80 06 46  07 D5 01 7A   ..'F.......F...z
002800  82 80 06 D5  01 18 83 77  06 08 06 D5  01 8D 82 77   .......w.......w
002810  06 F8 06 D5  01 8D 82 80  06 D5 01 8E  82 77 06 1F   .............w..
002820  07 D5 01 8E  82 80 06 46  07 D5 01 C1  82 80 06 46   .......F.......F
002830  07 D5 01 18  83 80 06 77  87 99 15 4E  ...............w
002840  07 D5 01 78  82 80 06 7A  01 6A 01 4E  07 D5 01 85   ...x...z.j.N....
002850  82 80 06 7A  01 6A 01 D5  01 BC 81 08  06 D5 01 0C   ...z.j..........
002860  00 30 04 F9  05 F2 01 79  28 B9 05 77  06 97 11 8D   .0.....y(..w....
002870  04 B9 05 80  06 43 02 F2  FF 7A 01 6A  01 D5 01 BC   .....C...z.j....
002880  81 D5 01 0C  00 59 19 7A  01 6A 01 56  07 EF 23 7B   .....Y.z.j.V..#{
002890  28 56 07 F3  23 7B 28 8D  04 81 02 08  00 D9 24 EF   (V..#{(.......$.
0028A0  23 EE 07 D5  01 06 00 F7  23 7B 28 81  02 06 00 F7   #.......#{(.....
0028B0  23 EE 07 D5  01 06 00 FF  23 7B 28 81  02 0A 00 49   #.......#{(....I
0028C0  28 FF 23 73  02 04 00 7F  11 7A 01 6A  01 D5 01 BC   (.#s.....z.j....
0028D0  81 77 06 D5  01 C2 82 80  06 27 27 55  28 89 28 08   .w.......''U(.(.
0028E0  06 D5 01 7D  82 80 06 7A  01 6A 01 2B  26 81 02 06   ...}...z.j.+&...
0028F0  00 46 07 EE  07 CB 28 7A  01 6A 01 66  07 D5 01 0A   .F....(z.j.f....
002900  00 46 07 F2  01 1B 29 E9  28 FF 23 C1  04 81 02 08   .F....).(.#.....
002910  00 F3 05 46  07 33 02 43  02 EE FF 7A  01 6A 01 E9   ...F.3.C...z.j..
002920  28 7F 11 B2  09 81 02 06  00 66 07 EE  07 E5 24 B4   (........f....$.
002930  04 81 02 06  00 66 07 EE  07 B1 25 E9  28 7F 11 B2   .....f....%.(...
002940  09 7A 01 6A  01 D5 01 84  82 77 06 D5  01 B0 81 30   .z.j.....w.....0
002950  04 D5 01 10  82 7C 0C 82  07 7A 01 6A  01 D5 01 84   .....|...z.j....
002960  82 77 06 D5  01 B0 81 30  04 D5 01 10  82 7C 0C 8D   .w.....0.....|..
002970  19 7A 01 6A  01 1D 29 0F  06 81 02 04  00 EE 07 43   .z.j..)........C
002980  29 F9 28 0F  06 81 02 04  00 EE 07 1D  29 0F 06 81   ).(.........)...
002990  02 04 00 EE  07 5B 29 0F  06 81 02 04  00 EE 07 FB   .....[).........
0029A0  26 7A 01 40  01 00 07 6A  01 A3 29 D5  01 A9 81 63   &z.@...j..)....c
0029B0  06 00 06 E8  04 D5 01 AB  81 63 06 1B  06 E8 04 8D   .........c......
0029C0  04 7A 01 6A  01 19 26 C8  28 EF 23 B2  09 81 02 04   .z.j..&.(.#.....
0029D0  00 EE 07 66  07 D5 01 04  00 46 07 F2  01 F9 29 73   ...f.....F....)s
```

```
0029E0  29 B4 04 81  02 08 00 F3  05 46 07 33  02 F9 28 81   }........F.3..(.
0029F0  02 04 00 33  02 43 02 E8  FF 81 02 04  00 EE 07 F9   ...3.C..........
002A00  28 81 02 04  00 33 02 D5  01 82 82 77  06 81 02 24   (....3.....w...$
002A10  00 4E 07 D5  01 DD 91 80  06 46 07 D6  01 7C 82 80   .N.......F...|..
002A20  06 A1 25 4E  07 D5 01 D8  91 80 06 46  07 D5 01 7A   ..%N.......F...z
002A30  82 80 06 7A  01 6A 01 D5  01 7A 82 77  06 CA 09 81   ...z.j...z.w....
002A40  02 04 00 EE  07 A7 29 81  02 1A 00 C3  29 46 07 D5   ......).....)F..
002A50  01 78 82 80  06 D5 01 7A  82 77 06 30  05 81 02 04   .x.....z.w.0....
002A60  00 71 1A 7A  01 6A 01 D5  01 DB 86 77  06 81 02 04   .q.z.j.....w....
002A70  00 EE 07 D5  01 35 2A 46  07 D5 01 12  00 C1 17 7A   .....5*F.......z
002A80  01 40 01 04  00 40 01 03  00 6A 01 D5  01 FA 82 08   .@...@...j......
002A90  06 D5 01 BC  83 D5 01 10  00 97 07 D5  01 10 00 D5   ................
002AA0  01 FF 00 6E  07 7A 01 6A  01 00 06 8D  05 30 04 46   ...n.z.j.....0.F
002AB0  07 00 06 9D  05 F2 01 C9  2A D5 01 0A  00 31 03 B9   ........*....1..
002AC0  05 77 06 30  04 43 02 F2  FF 7A 01 6A  01 08 06 77   .w.0.C...z.j...w
002AD0  06 08 06 5E  07 8D 04 1B  06 80 06 D5  01 04 00 8D   ...^............
002AE0  04 81 02 06  00 4E 07 9A  04 7A 01 6A  01 46 07 D5   .....N...z.j.F..
002AF0  01 04 00 46  07 F2 01 23  2B 4E 07 CB  07 00 06 B9   ...F...#+N......
002B00  05 D5 01 04  00 31 03 30  04 CB 2A 4E  07 CB 07 00   .....1.0..*N....
002B10  06 B9 05 D5  01 04 00 31  03 30 04 42  04 CB 2A 43   .....1.0.B..*C
002B20  02 D8 FF D5  01 0B 83 80  06 7A 01 6A  01 F9 05 8D   .........z.j....
002B30  05 D5 01 0A  83 77 06 81  2A 8D 04 81  02 08 00 D5   .....w..*.......
002B40  01 04 00 30  04 8D 05 D5  01 05 00 31  03 8D 05 F9   ...0.......1....
002B50  05 08 06 5E  07 C1 04 81  02 30 00 56  07 CB 07 00   ...^.....0.V....
002B60  06 66 07 CB  07 9A 04 D5  01 07 00 CB  07 F9 05 4E   .f.............N
002B70  07 8D 04 D5  01 0A 00 31  03 05 00 31  03 09 9D     .......1....1...
002B80  05 30 04 9A  04 73 02 16  00 D5 01 0A  00 31 03 30   .0...s.......1.0
002B90  04 D5 01 3C  00 31 03 4E  07 1F 18 30  04 D5 01 05   ...<.1.N...0....
002BA0  00 CB 07 F9  05 5E 07 CB  07 9A 04 AD  05 9A 04 9D   .....^..........
002BB0  05 56 07 31  03 D5 01 FA  82 30 04 6D  06 9D 05 7A   .V.1.....0.m...z
002BC0  01 6A 01 D5  01 0A 83 77  06 D5 01 09  00 C1         .j.....w......
002BD0  04 81 02 06  00 46 06 EE  07 85 2A 8D  04 42 04 46   .....F....*..B.F
002BE0  07 F2 01 05  2C 4E 07 A7  2A F9 05 4E  07 A7 2A F9   ....,N..*..N.*.
002BF0  05 4E 07 A7  2A F9 05 4E  07 A7 2A F9  05 B9 05 2B   .N.*..N.*.....+
002C00  2B 43 02 E2  FF F3 05 7A  01 6A 01 5E  07 A7 2A 08   +C.....z.j.^..*.
002C10  06 D5 01 6D  85 6D 06 C0  79 B2 09 08  06 81 02 0A   ...m.m..y.......
002C20  00 73 11 D5  01 82 82 80  06 7A 01 6A  01 F3 05 D5   .s.......z.j....
002C30  01 F7 82 77  06 08 06 D5  01 F6 82 77  06 C1 04 81   ...w.......w....
002C40  02 12 00 08  06 42 04 4F  11 51 04 1F  07 D5 01 F6   .....B.O.Q......
002C50  82 80 06 D5  01 FA 82 00  06 53 11 31  03 D5 01 CA   .........S.1....
002C60  8A 30 04 53  11 97 07 7A  01 6A 01 66  07 F9 05 47   .0.S...z.j.f...G
002C70  11 46 07 F2  01 9D 2C B9  05 60 04 2F  06 30 04 63   .F...,...`./.0.c
002C80  06 F9 05 D5  01 FA 82 30  04 63 06 B2  09 81 02 0A   .......0.c......
002C90  00 46 06 46  07 46 07 33  02 43 02 DC  FF F3 05 7A   .F.F.F.3.C.....z
002CA0  01 6A 01 D5  01 0A 83 77  06 D5 01 09  00 C1 04 81   .j.....w........
002CB0  02 08 00 D5  01 FF 00 EE  07 D5 01 FF  00 D5 01 F8   ................
002CC0  82 80 06 D5  01 FA 82 30  06 D5 01 F6  82 77 06 08   .......0.....w..
002CD0  06 D5 01 F7  82 80 06 46  07 F2 01 17  2D B9 05 27   .......F....-..'
002CE0  1B 2F 06 63  06 C1 04 81  02 16 00 69  2C 81 02 0C   ./.c.......i,...
002CF0  00 B9 05 D5  01 F8 82 80  06 33 02 73  02 16 00 63   .........3.s...c
002D00  06 66 07 C1  04 81 02 0C  00 B9 05 D5  01 F7 82 80   .f..............
002D10  06 33 02 43  02 C8 FF F3  05 D5 01 F8  82 77 06 08   .3.C.........w..
002D20  06 D5 01 FF  00 C1 04 81  02 1C 00 D5  01 AE 89 77   ...............w
002D30  06 81 02 10  00 D5 01 FF  00 D5 01 AE  89 80 06 73   ...............s
002D40  02 04 00 2B  2C 7A 01 6A  01 4B 11 31  03 D5 01 0A   ...+,z.j.K.1....
002D50  91 30 04 4B  11 46 07 F2  01 95 2D D5  01 0B 83 77   .0.K.F....-....w
002D60  06 B9 05 32  19 81 02 2A  00 2F 06 B9  05 30 04 D5   ...2...*./...0..
002D70  01 AE 89 77  06 81 02 18  00 77 06 B2  09 81 02 0C   ...w.....w......
002D80  00 D5 01 FF  00 D5 01 AE  89 80 06 73  02 04 00 80   ...........s....
002D90  06 43 02 C8  FF 46 06 7A  01 6A 01 4E  07 A7 2A 1B   .C...F.z.j.N..*.
002DA0  06 D5 01 0A  00 31 03 30  04 46 07 F8  06 23 11 1F   .....1.0.F...#..
002DB0  07 D5 01 F9  82 80 06 4E  07 A7 2A 08  06 D5 01 0A   .......N..*.....
002DC0  83 80 06 08  06 D5 01 09  00 C1 04 81  02 06 00 F3   ................
002DD0  05 EE 07 81  2A 8D 04 81  02 04 00 89  2A 7A 01 6A   ....*.......*z.j
002DE0  01 D5 01 0A  83 77 06 08  06 81 2A 8D  04 F9 05 D5   .....w....*.....
002DF0  01 09 00 B2  09 8D 04 81  02 04 00 EE  07 D5 01 F9   ................
002E00  82 77 06 A1  2C 00 06 47  2D D5 01 AE  89 77 06 81   .w..,..G-....w..
002E10  02 08 00 F3  05 73 02 08  00 08 06 07  4F A9 1E 89   .....s......O...
002E20  2A 7A 01 6A  01 09 2C 81  02 06 00 46  06 EE 07 99   *z.j..,....F....
002E30  2D EB 2A C1  2B DF 2D 7A  01 6A 01 46  07 F9 05 23   -.*.+.-z.j.F...#
002E40  2E 7A 01 6A  01 4E 07 F9  05 23 2E 7A  01 6A 01 F3   .z.j.N...#.z.j..
002E50  05 CB 18 D5  01 04 00 8E  02 08 00 1F  50 73 02 12   ............Ps..
002E60  00 D5 01 05  00 8E 02 08  00 93 1F 73  02 04 00 F3   ...........s....
002E70  05 7A 01 6A  01 F9 05 D5  01 3C 00 31  03 30 04 00   .z.j.....<.1.0..
002E80  06 5E 07 E8  04 81 02 08  00 4D 2E 73  02 16 00 08   .^.......M.s....
```

```
002E90  06 CA 09 81  02 0A 00 4E  07 D5 01 B9  83 80 06 1B   .......N........
002EA0  06 07 50 7A  01 6A 01 D5  01 05 00 23  06 3F 11 1F   ..Pz.j.....#.?..
002EB0  07 33 11 31  03 D5 01 D9  88 30 04 8D  05 56 07 A7   .3.1.....0...V..
002EC0  2A AD 05 C5  1F 80 06 56  07 A7 2A AD  05 CD 1F 80   *......V..*.....
002ED0  06 56 07 A7  2A AD 05 D5  1F 80 06 56  07 A7 2A AD   .V..*......V..*.
002EE0  05 DD 1F 80  06 F3 05 AD  06 C1 1F 80  06 AD 05 FB   ................
002EF0  1F 80 06 AD  05 F1 1F 80  06 9D 05 E7  1F 80 06 5D   ...............]
002F00  20 7A 01 6A  01 09 2C 81  02 06 00 F3  05 EE 07 D5    z.j.,.........
002F10  01 55 80 77  06 81 02 0E  00 46 07 79  36 43 3B 46   .U.w.....F.y6C;F
002F20  07 7D 36 43  3B 56 07 A7  2A F9 05 4E  07 A7 2A F9   .}6C;V..*..N..*.
002F30  05 56 07 A7  2A F9 05 56  07 A7 2A F9  05 56 07 A7   .V..*..V..*..V..
002F40  2A F9 05 00  06 81 02 08  00 A5 2E 73  02 06 00 46   *..........s...F
002F50  06 73 2E 7A  01 6A 01 09  2C 81 02 06  00 F3 05 EE   .s.z.j..,.......
002F60  07 D5 01 E9  86 D5 01 08  00 97 07 7A  01 6A 01 08   ...........z.j..
002F70  06 D5 01 08  00 30 04 46  07 1B 06 D5  01 E9 86 F9   .....0.F........
002F80  05 D5 01 08  00 46 07 F2  01 C1 2F 2F  06 B9 05 30   .....F....//...0
002F90  04 77 06 08  06 D5 01 09  00 B2 09 81  02 1E 00 F9   .w..............
002FA0  05 B9 05 30  04 77 06 B2  09 81 02 0C  00 DB 18 66   ...0.w.........f
002FB0  07 46 07 46  07 33 02 73  02 04 00 46  06 43 02 CC   .F.F.3.s...F.C..
002FC0  FF 46 06 7A  01 6A 01 6D  2F 81 02 06  00 F3 05 EE   .F.z.j.m/.......
002FD0  07 D5 01 55  80 77 06 81  02 08 00 46  07 79 36 43   ...U.w.....F.y6C
002FE0  3B 56 07 A7  2A F9 05 4E  07 A7 2A 08  06 D5 01 F1   ;V..*..N..*.....
002FF0  86 80 06 FD  4C C1 04 81  02 0A 00 F9  05 51 4C 73   ....L........QLs
003000  02 04 00 F9  05 D5 01 19  87 99 15 56  07 A7 2A D5   ...........V..*.
003010  01 F2 86 80  06 56 07 A7  2A D5 01 63  00 1F 07 08   .....V..*..c....
003020  06 D5 01 63  00 C1 04 81  02 08 00 F3  05 D5 01 64   ...c...........d
003030  00 D5 01 F3  86 80 06 56  07 A7 2A D5  01 F4 86 80   .......V..*.....
003040  06 F3 05 46  07 D5 01 F9  86 80 06 46  07 D5 01 09   ...F.......F....
003050  87 80 06 7A  01 6A 01 F3  05 7A 01 6A  01 4E 07 A7   ...z.j...z.j.N..
003060  2A 81 02 0A  00 D5 01 08  00 73 02 04  00 46 07 D5   *........s...F..
003070  01 92 83 30  04 08 06 D5  01 08 00 30  04 F9 05 F2   ...0.......0....
003080  01 8F 30 4E  07 A7 2A B9  05 80 06 43  02 F6 FF 7A   ..0N..*....C...z
003090  01 6A 01 56  07 A7 2A 0F  06 81 02 0A  00 D5 01 10   .j.V..*.........
0030A0  00 1F 07 91  47 56 07 A7  2A D5 01 70  83 80 06 7A   ....GV..*..p...z
0030B0  01 6A 01 4E  07 A7 2A 46  07 8E 02 2E  00 4E 07 D5   .j.N..*F.....N..
0030C0  01 7C 83 80  06 46 07 D5  01 5F 80 80  06 46 07 D5   .|...F..._...F..
0030D0  01 5D 80 6D  06 46 07 D5  01 64 80 80  06 46 07 D5   .].m.F...d...F..
0030E0  01 66 80 80  06 73 02 5C  00 4E 07 8E  02 16 00 08   .f...s.\.N......
0030F0  06 D5 01 C7  91 3F 11 D5  01 12 00 1F  07 97 07 73   .....?.........s
003100  02 42 00 5E  07 8E 02 08  00 1D 6D 73  02 36 00 D5   .B.^......ms.6..
003110  01 04 00 8E  02 10 00 4E  07 A7 2A D5  01 61 89 80   .......N..*..a..
003120  06 73 02 20  00 D5 01 05  00 8E 02 08  00 5B 30 73   .s. .........[0s
003130  02 12 00 D5  01 06 00 8E  02 08 00 91  30 73 02 04   ............0s..
003140  00 F3 05 7A  01 6A 01 09  2C 81 02 06  00 F3 05 EE   ...z.j..,.......
003150  07 B1 30 F3  05 7A 01 6A  01 0F 06 81  02 14 00 D5   ..0..z.j........
003160  01 05 00 31  03 D5 01 F0  00 30 04 D5  01 10 85 6D   ...1.....0.....m
003170  06 7A 01 6A  01 0F 06 81  02 14 00 D5  01 05 00 31   .z.j...........1
003180  03 D5 01 C0  03 30 04 D5  01 12 85 6D  06 7A 01 6A   .....0.....m.z.j
003190  01 D5 01 55  80 77 06 30  05 01 36 9A  04 81 02 06   ...U.w.0..6.....
0031A0  00 F3 05 EE  07 D5 01 72  83 2F 06 77  06 F9 05 81   .......r./.w....
0031B0  02 14 00 F3  05 5D 22 D5  01 14 00 D5  01 79 87 99   .....]"......y..
0031C0  15 73 02 08  00 81 02 04  00 2F 22 80  06 7A 01 6A   .s......./"..z.j
0031D0  01 46 07 D5  01 92 83 08  06 37 11 30  04 F9 05 F2   .F.......7.0....
0031E0  01 F7 31 F9  05 4E 07 A7  2A B9 05 77  06 8D 04 1B   ..1..N..*..w....
0031F0  06 9A 04 43  02 EE FF 81  02 0E 00 5E  07 A7 2A D5   ...C.......^..*.
003200  01 A2 83 6D  06 51 52 F3  05 7A 01 6A  01 D5 01 75   ...m.QR..z.j...u
003210  83 80 06 56  07 A7 2A D5  01 74 80 80  06 4E 07 A7   ...V..*..t...N..
003220  2A D5 01 78  83 80 06 56  07 A7 2A D5  01 80 83 80   *..x...V..*.....
003230  06 56 07 A7  2A D5 01 81  83 80 06 56  07 A7 2A D5   .V..*......V..*.
003240  01 82 83 80  06 4E 07 A7  2A 8F 31 56  07 A7 2A 57   .....N..*.1V..*W
003250  31 56 07 A7  2A 73 31 5E  07 A7 2A D5  01 76 83 6D   1V..*s1^..*..v.m
003260  06 F3 05 4E  07 D5 01 7E  83 80 06 7A  01 6A 01 A6   ...N...~...z.j..
003270  73 81 02 08  00 6D 30 33  73 02 04 00  F3 05 7A 01 6A   s....m033s....z.j
003280  01 4E 07 A7  2A 08 06 56  07 E8 04 81  02 24 00 5E   .N..*..V.....$.^
003290  07 8E 02 08  00 CF 31 73  02 14 00 D5  01 04 00 8E   ......1s........
0032A0  02 08 00 6D  32 73 02 06  00 F3 05 F3  05 73 02 2A   ...m2s.......s.*
0032B0  00 D5 01 0A  00 31 03 F9  05 4E 07 A7  2A 1B 06 30   .....1...N..*..0
0032C0  04 08 06 D5  01 17 00 B2  09 D5 01 7F  83 77 06 8D   .............w..
0032D0  04 81 02 04  00 73 16 0B  32 7A 01 6A  01 00 06 CA   .....s..2z.j....
0032E0  09 81 02 08  00 F9 3A 73  02 04 00 46  06 7A 01 6A   ......:s...F.z.j
0032F0  01 56 07 A7  2A 85 36 DB  32 56 07 A7  2A 89 36 DB   .V..*.6.2V..*.6.
003300  32 56 07 A7  2A 8D 36 DB  32 56 07 A7  2A 91 36 DB   2V..*.6.2V..*.6.
003310  32 56 07 A7  2A 95 36 DB  32 56 07 A7  2A 99 36 DB   2V..*.6.2V..*.6.
003320  32 56 07 A7  2A B5 36 DB  32 56 07 A7  2A B9 36 DB   2V..*.6.2V..*.6.
003330  32 F3 05 7A  01 6A 01 46  07 F2 01 61  33 D5 01 04   2..z.j.F...a3...
```

```
003340  00 A7 2A 08  06 30 05 81  02 0A 00 F3  05 33 02 73   ..*..0.......3.s
003350  02 04 00 F9  05 5E 07 A7  2A 1B 06 6D  61 43 02 DE   .....^..*..maC..
003360  FF F3 05 7A  01 6A 01 5E  07 35 33 7A  01 6A 01 D5   ...z.j.^.53z.j..
003370  01 04 00 35  33 7A 01 6A  00 C1 06 23  11 30 04 F9   ...53z.j...#.0..
003380  05 F2 01 97  33 4E 07 A7  2A 0F 06 81  02 06 00 B9   ....3N..*.......
003390  05 80 06 43  02 F0 FF F3  05 7A 01 6A  01 D5 01 15   ...C.....z.j....
0033A0  85 77 33 7A  01 6A 01 D5  01 26 85 77  33 7A 01 6A   .w3z.j...&.w3z.j
0033B0  01 1B 06 46  07 F8 06 57  11 51 04 1F  07 63 11 31   ...F...W.Q...c.1
0033C0  03 D5 01 65  89 30 04 08  06 63 11 D5  01 FF 00 6E   ...e.0...c.....n
0033D0  07 F9 05 46  07 F8 06 5F  11 1F 07 5B  11 31 03 00   ...F..._...[.1..
0033E0  06 30 04 F9  05 1D 02 39  34 4E 07 A7  2A F9 05 4E   .0.....94N..*..N
0033F0  07 A7 2A 1B  06 08 06 5E  07 8D 04 D5  01 04 00 CB   ..*....^........
003400  07 F9 05 D5  01 04 00 8D  04 81 02 0A  00 D5 01 0A   ................
003410  00 73 02 04  00 46 07 1B  06 30 04 08  06 23 11 D1   .s...F...0...#..
003420  04 81 02 0C  00 9A 04 B9  05 80 06 73  02 06 00 46   ...........s...F
003430  06 33 02 5B  11 5B 02 B2  FF F3 05 7A  01 6A 01 4E   .3.[.[.....z.j.N
003440  07 A7 2A F9  05 4E 07 A7  2A AF 33 7A  01 6A 01 D5   ..*..N..*.3z.j..
003450  01 05 00 31  03 42 04 60  04 D5 01 A2  83 30 04 08   ...1.B.`.....0..
003460  06 D5 01 0A  00 30 04 F9  05 F2 01 87  34 5E 07 A7   .....0......4^..
003470  2A 0F 06 81  02 0A 00 B9  05 6D 06 73  02 04 00 33   *........m.s...3
003480  02 56 07 5B  02 E8 FF F3  05 7A 01 6A  01 09 2C 81   .V.[.....z.j..,.
003490  02 08 00 F3  05 73 02 68  00 4E 07 A7  2A 46 07 8E   .....s.h.N..*F..
0034A0  02 08 00 65  33 73 02 58  00 4E 07 8E  02 08 00 9B   ...e3s.X.N......
0034B0  33 73 02 4C  00 56 07 8E  02 08 00 A5  33 73 02 40   3s.L.V......3s.@
0034C0  00 5E 07 8E  02 08 00 EF  32 73 02 34  00 D5 01 04   .^......2s.4....
0034D0  00 8E 02 08  00 3D 34 73  02 26 00 D5  01 05 00 8E   .....=4s.&......
0034E0  02 0A 00 46  07 4D 34 73  02 16 00 D5  01 06 00 8E   ...F.M4s........
0034F0  02 0A 00 4E  07 4D 34 73  02 06 00 F3  05 F3 05 7A   ...N.M4s.......z
003500  01 6A 01 46  07 8E 02 08  00 39 2E 73  02 7E 00 4E   .j.F.....9.s.~.N
003510  07 8E 02 08  00 43 2E 73  02 72 00 56  07 8E 02 08   .....C.s.r.V....
003520  00 7F 32 73  02 66 00 5E  07 8E 02 08  00 55 30 73   ..2s.f.^.....U0s
003530  02 5A 00 D5  01 04 00 8E  02 08 00 45  31 73 02 4C   .Z.........E1s.L
003540  00 D5 01 05  00 8E 02 08  00 55 2F 73  02 3E 00 D5   .........U/s.>..
003550  01 06 00 8E  02 08 00 C5  2F 73 02 30  00 D5 01 07   ......../s.0....
003560  00 8E 02 08  00 03 2F 73  02 22 00 D5  01 08 00 8E   ....../s."......
003570  02 08 00 8B  34 73 02 14  00 D5 01 09  00 8E 02 08   ....4s..........
003580  00 F3 05 73  02 06 00 F3  05 F3 05 D5  01 87 82 B9   ...s............
003590  18 4E 07 D5  01 79 82 80  06 7A 01 6A  01 D5 01 80   .N...y...z.j....
0035A0  82 63 06 D5  01 DB 91 77  06 01 35 7A  01 6A 01 D5   .c.....w..5z.j..
0035B0  01 7A 82 77  06 CA 09 81  02 1E 00 9B  35 66 07 65   .z.w........5f.e
0035C0  18 11 55 4E  07 D5 01 DD  91 80 06 46  07 D5 01 7C   ..UN.......F...|
0035D0  82 80 06 A1  25 71 1A 7A  01 6A 01 D5  01 AD 35 46   ....%q.z.j....5F
0035E0  07 D5 01 11  00 C1 17 7A  01 40 01 63  00 40 01 2F   .......z.@.c.@./
0035F0  00 40 01 00  00 40 01 01  00 40 01 02  00 40 01 03   .@...@...@...@..
003600  00 6A 01 D5  01 55 80 77  06 30 05 81  02 06 00 66   .j...U.w.0.....f
003610  07 EE 07 59  36 7B 39 81  02 0E 00 D5  01 20 00 8D   ...Y6{9...... ..
003620  04 30 05 73  02 06 00 F3  05 66 07 7A  01 6A 01 D5   .0.s.....f.z.j..
003630  01 55 80 77  06 30 05 81  02 06 00 66  07 EE 07 59   .U.w.0.....f...Y
003640  36 7B 39 81  02 0E 00 D5  01 03 00 8D  04 30 05 73   6{9..........0.s
003650  02 06 00 F3  05 46 07 7A  01 40 01 00  00 40 01 04   .....F.z.@...@..
003660  00 40 01 07  00 40 01 08  00 40 01 0B  00 40 01 0C   .@...@...@...@..
003670  00 40 01 0D  00 40 01 0E  00 40 01 0F  00 40 01 10   .@...@...@...@..
003680  00 40 01 11  00 40 01 12  00 40 01 13  00 40 01 16   .@...@...@...@..
003690  00 40 01 17  00 40 01 1A  00 40 01 18  00 40 01 14   .@...@...@...@..
0036A0  00 40 01 15  00 40 01 18  00 40 01 19  00 40 01 1C   .@...@...@...@..
0036B0  00 40 01 1D  00 40 01 1E  00 40 01 1F  00 40 01 20   .@...@...@...@.
0036C0  00 40 01 21  00 40 01 22  00 40 01 23  00 40 01 24   .@.!.@.".@.#.@.$
0036D0  00 40 01 25  00 40 01 26  00 40 01 27  00 40 01 28   .@.%.@.&.@.'.@.(
0036E0  00 40 01 29  00 40 01 2A  00 40 01 2B  00 40 01 2C   .@.).@.*.@.+.@.,
0036F0  00 40 01 2D  00 40 01 2E  00 40 01 2F  00 6A 01 E9   .@.-.@..@./.j..
003700  35 79 36 43  3B 7A 01 6A  01 E9 35 7D  36 43 3B 7A   5y6C;z.j..5}6C;z
003710  01 6A 01 D5  01 55 80 77  06 81 02 5A  00 D5 01 FA   .j...U.w...Z....
003720  00 39 18 D5  01 5A 00 E5  36 43 3B D5  01 32 00 E9   .9...Z..6C;..2..
003730  36 43 3B 46  07 ED 36 43  3B 46 07 F1  36 43 3B 25   6C;F..6C;F..6C;%
003740  22 D5 01 7C  83 77 06 30  05 6C 0C 42  19 48 0C 8D   "..|.w.0.l.B.H..
003750  04 54 0C C1  04 9A 04 81  02 04 00 B5  37 D5 01 63   .T..........7..c
003760  89 77 06 81  02 04 00 07  37 D5 01 62  89 77 06 81   .w......7..b.w..
003770  02 04 00 FD  36 7A 01 6A  01 5E 07 D5  01 9E 8A 80   ....6z.j.^......
003780  06 D5 01 05  00 D5 01 90  8A 80 06 2D  21 D5 01 0F   ...........-!...
003790  00 D5 01 64  89 80 06 46  07 D5 01 97  8A 80 06 D5   ...d...F........
0037A0  01 0A 00 D5  01 8E 8A 80  06 D5 01 0A  00 D5 01 8F   ................
0037B0  8A 80 06 7A  01 6A 01 46  07 D5 01 63  89 80 06 46   ...z.j.F...c...F
0037C0  07 D5 01 62  89 80 06 46  07 79 36 43  3B 46 07 7D   ...b...F.y6C;F.}
0037D0  36 43 3B 46  07 81 36 43  3B D5 01 90  8A 77 06 BD   6C;F..6C;....w..
0037E0  36 43 3B D5  01 97 8A 77  06 E1 36 43  3B D5 01 8E   6C;....w..6C;...
```

```
0037F0  8A 77 06 C1  36 43 3B D5  01 8F 8A 77  06 C5 36 43   .w..6C;....w..6C
003800  3B 7A 01 6A  01 F1 35 8E  02 0C 00 D5  01 08 00 46   ;z.j..5........F
003810  07 73 02 38  00 F5 35 8E  02 0A 00 4E  07 4E 07 73   .s.8..5....N.N.s
003820  02 2A 00 F9  35 8E 02 0A  00 56 07 56  07 73 02 1C   .*..5....V.V.s..
003830  00 FD 35 8E  02 0E 00 D5  01 04 00 73  01 04 00 73   ..5........s...s
003840  02 0A 00 4E  07 4E 07 1B  06 F3 05 7A  01 6A 01 08   ...N.N.....z.j..
003850  06 D5 01 98  8A 80 06 D5  01 99 8A 08  06 77 06 1B   .............w..
003860  06 F8 18 B1  18 7A 01 6A  01 D5 01 98  8A 77 06 D5   .....z.j.....w..
003870  01 99 8A 08  06 77 06 1B  06 0A 19 B1  18 7A 01 6A   .....w.......z.j
003880  01 D5 01 82  80 8D 05 46  07 AD 05 80  06 D5 01 07   .......F........
003890  00 AD 05 42  04 80 06 D5  01 84 00 AD  05 56 07 30   ...B.........V.0
0038A0  04 80 06 46  07 AD 05 5E  07 30 04 80  06 46 07 AD   ...F...^.0...F..
0038B0  05 D5 01 04  00 30 04 80  06 08 06 AD  05 D5 01 05   .....0..........
0038C0  00 30 04 80  06 4E 07 AD  05 D5 01 06  00 30 04 80   .0...N.......0..
0038D0  06 08 06 D5  01 8C 00 30  04 D5 01 FF  00 8D 04 9D   .......0........
0038E0  05 D5 01 07  00 30 04 80  06 D5 01 02  81 08 06 D5   .....0..........
0038F0  01 80 00 83  07 8D 05 46  07 D5 01 60  82 80 06 46   .......F...`...F
003900  07 D5 01 85  81 80 06 D5  01 08 00 D5  01 82 81 80   ................
003910  06 D5 01 08  00 D5 01 84  81 80 06 D5  01 A0 00 D5   ................
003920  01 90 81 80  06 AD 05 49  04 77 06 D5  01 85 00 C1   .......I.w......
003930  04 D5 01 82  81 77 06 30  05 8D 04 81  02 26 00 D5   .....w.0.....&..
003940  01 04 00 D5  01 90 81 80  06 AD 05 D5  01 06 00 30   ...............0
003950  04 77 06 9D  05 D5 01 05  00 30 04 77  06 1B 06 C1   .w.......0.w....
003960  04 EE 07 D5  01 90 81 77  06 30 05 81  02 B8 FF 4E   .......w.0.....N
003970  07 1F 18 F3  05 67 38 46  07 7A 01 6A  01 08 06 8D   .....g8F.z.j....
003980  05 D5 01 90  81 77 06 30  05 D5 01 83  81 77 06 30   .....w.0.....w.0
003990  05 8D 04 81  02 EC FF 7F  38 00 06 9D  05 ED 35 42   ........8.....5B
0039A0  04 1F 07 D5  01 10 8A 30  04 80 06 4E  07 D5 01 83   .......0...N....
0039B0  81 80 06 7A  01 6A 01 D5  01 82 80 8D  05 46 07 AD   ...z.j.......F..
0039C0  05 80 06 D5  01 08 00 AD  05 42 04 80  06 D5 01 86   .........B......
0039D0  00 AD 05 56  07 30 04 80  06 46 07 AD  05 5E 07 30   ...V.0...F...^.0
0039E0  04 80 06 46  07 AD 05 D5  01 04 00 30  04 80 06 08   ...F.......0....
0039F0  06 AD 05 D5  01 05 00 30  04 80 06 4E  07 AD 05 D5   .......0...N....
003A00  01 06 00 30  04 80 06 00  06 AD 05 D5  01 07 00 30   ...0...........0
003A10  04 80 06 30  04 D5 01 8F  00 30 04 D5  01 FF 00 8D   ...0.....0......
003A20  04 9D 05 D5  01 08 00 30  04 80 06 D5  01 02 81 08   .......0........
003A30  06 D5 01 80  00 83 07 8D  05 46 07 D5  01 60 82 80   .........F...`..
003A40  06 4E 07 D5  01 89 81 80  06 46 07 D5  01 85 81 80   .N.......F......
003A50  06 D5 01 04  00 D5 01 82  81 80 06 D5  01 09 00 D5   ................
003A60  01 84 81 80  06 D5 01 89  8A 77 06 D5  01 90 81 80   .........w......
003A70  06 AD 05 49  04 77 06 D5  01 20 00 C1  04 D5 01 82   ...I.w... ......
003A80  81 77 06 30  05 8D 04 81  02 24 00 9D  05 F3 05 66   .w.0.....$.....f
003A90  07 D5 01 9A  8A 08 06 77  06 D5 01 89  8A 77 06 D5   .......w.....w..
003AA0  01 90 81 77  06 38 04 F8  06 B1 18 EE  07 D5 01 90   ...w.8..........
003AB0  81 77 06 30  05 81 02 8A  FF 4E 07 1F  18 F3 05 67   .w.0.....N.....g
003AC0  38 46 07 7A  01 6A 01 D5  01 69 87 77  06 81 02 08   8F.z.j...i.w....
003AD0  00 46 06 66  07 EE 07 D5  01 90 81 77  06 30 05 D5   .F.f.......w.0..
003AE0  01 83 81 77  06 30 05 8D  04 81 02 EC  FF B5 39 4E   ...w.0........9N
003AF0  07 D5 01 83  81 80 06 7A  01 6A 01 D5  01 9B 8A 77   .......z.j.....w
003B00  06 46 07 1D  02 3F 3B 2F  06 D5 01 9C  8A 08 06 77   .F...?;/.......w
003B10  06 B9 05 F8  06 B1 18 C5  3A 81 02 04  33 02 2D5      ........:...3.-
003B20  01 FE 00 D5  01 90 81 80  06 D5 01 88  8A 08 06 77   ...............w
003B30  06 42 04 D5  01 FE 00 1F  07 B1 18 43  02 CA FF 46   .B.........C...F
003B40  06 7A 01 6A  01 F9 3A 7A  01 6A 01 46  07 4D 38 46   .z.j..:z.j.F.M8F
003B50  07 79 36 F9  3A 4E 07 4D  38 46 07 7D  36 F9 3A 7A   .y6.:N.M8F.}6.:z
003B60  01 6A 01 79  36 7B 39 F3  05 E9 35 C1  04 7D 36 7B   .j.y6{9...5..}6{
003B70  39 F3 05 E9  35 C1 04 9A  04 B4 04 7A  01 6A 01 F5   9...5......z.j..
003B80  35 C1 04 D1  36 7B 39 F3  05 D5 01 FF  00 B2 09 8D   5...6{9.........
003B90  04 B4 04 81  02 04 00 2F  22 46 07 D5  01 57 8A 80   ......./"F...W..
003BA0  06 46 07 D5  01 88 8A 80  06 F9 3C B4  04 81 02 04   .F........<.....
003BB0  00 49 3B 6B  3C 27 52 7A  01 6A 01 03  38 75 36 56   .I;k<'Rz.j..8u6V
003BC0  07 4D 38 F9  3A 61 3B 81  02 0E 00 71  36 5E 07 4D   .M8.:a;....q6^.M
003BD0  38 F9 3A 73  02 04 00 F3  05 D5 01 07  00 4D 38 M8    8.:s.........M8
003BE0  01 8A 8A 77  06 D5 01 69  87 99 15 46  07 D5 01 89   ...w...i...F....
003BF0  81 80 06 7A  01 6A 01 08  06 7D 3B B9  3B 7A 01 40   ...z.j...};.;z.@
003C00  01 01 00 40  01 02 00 40  01 15 00 6A  01 F3 05 08   ...@...@...j....
003C10  06 D5 01 54  8A 6D 06 D5  01 AB 89 6D  06 D5 01 59   ...T.m.....m...Y
003C20  8A 08 06 63  06 D5 01 5B  8A 6D 06 6D  06 D5 01 6E   ...c...[.m.m...n
003C30  8A 77 06 D5  01 8C 8A 80  06 46 07 D5  01 8D 8A 80   .w.......F......
003C40  06 46 07 D5  01 8B 8A 80  06 4E 07 D5  01 7E 8A 80   .F.......N...~..
003C50  06 56 07 D5  01 59 87 99  15 7A 01 40  01 3C 00 40   .V...Y...z.@.<.@
003C60  01 00 00 40  01 01 00 40  01 02 00 6A  01 46 07 D5   ...@...@...j.F..
003C70  01 66 8A 80  06 46 07 D5  01 5E 8A 80  06 D5 01 67   .f...F...^.....g
003C80  8A 5F 41 D5  01 5F 8A 5F  41 7A 01 6A  01 00 06 7B   ._A.._._Az.j...{
003C90  39 81 02 4C  00 E9 35 C1  04 81 02 3A  00 08 06 77   9..L..5....:...w
```

```
003CA0  06 46 07 8E  02 0E 00 D5  01 64 89 77  06 B1 18 73   .F.......d.w...s
003CB0  02 1E 00 4E  07 8E 02 14  00 46 07 B1  18 46 07 00   ...N.....F...F..
003CC0  06 43 3B 46  07 07 4F 73  02 06 00 F3  05 F3 05 F3   .C;F..Os........
003CD0  05 73 02 08  00 46 07 B1  18 F3 05 73  02 06 00 F3   .s...F.....s....
003CE0  05 46 06 7A  01 6A 01 7D  36 D5 01 63  89 8B 3C 79   .F.z.j.}6..c..<y
003CF0  36 D5 01 62  89 8B 3C 7A  01 6A 01 D5  01 63 89 77   6..b..<z.j...c.w
003D00  06 D5 01 62  89 77 06 30  04 CA 09 7A  01 6A 01 08   ...b.w.0...z.j..
003D10  06 D5 01 74  8A 6D 06 08  06 E3 06 D5  01 54 8A 63   ...t.m.......T.c
003D20  06 D5 01 85  8A 77 06 E8  04 B4 04 81  02 06 00 66   .....w.........f
003D30  07 EE 07 00  06 D5 01 0F  00 E8 04 81  02 06 00 46   ...............F
003D40  07 EE 07 00  06 D5 01 FB  FF D1 04 81  02 08 00 46   ...............F
003D50  07 73 02 04  00 66 07 7A  01 6A 01 F3  05 81 02 08   .s...f.z.j......
003D60  00 4E 07 73  02 04 00 66  07 D5 01 A4  8A F9 05 00   .N.s...f........
003D70  06 77 06 30  04 46 07 F8  06 D5 01 0F  00 1F 07 B1   .w.0.F..........
003D80  18 7A 01 6A  01 0D 3D 81  02 06 00 46  06 EE 07 D5   .z.j..=....F....
003D90  01 57 8A 77  06 81 02 06  00 59 3D EE  07 D5 01 7C   .W.w.....Y=....|
003DA0  8A 77 06 4E  07 F8 06 1A  04 56 07 1A  04 F9 05 21   .w.N.....V.....!
003DB0  05 81 02 04  00 C1 06 0F  06 81 02 62  00 D5 01 76   ...........b...v
003DC0  8A 77 06 D5  01 77 8A 77  06 38 04 30  04 D5 01 64   .w...w.w.8.0...d
003DD0  00 31 03 D5  01 7A 8A 77  06 1A 04 D5  01 83 8A 77   .1...z.w.......w
003DE0  06 1F 07 46  07 F8 06 08  06 D5 01 7B  8A 77 06 63   ...F.......{.w.c
003DF0  3C C1 04 81  02 0A 00 D5  01 70 8A 73  02 06 00 D5   <........p.s....
003E00  01 6F 8A 08  06 8D 05 77  06 38 04 E3  06 D5 01 71   .o.....w.8.....q
003E10  8A 80 06 D5  01 FF 00 1F  07 9D 05 80  06 7A 01 6A   .............z.j
003E20  01 D5 01 83  3D 66 07 D5  01 0E 00 C1  17 7A 01 6A   ....=f.......z.j
003E30  01 08 06 CA  09 D5 01 8D  8A 77 06 30  05 8D 04 81   .........w.0....
003E40  02 28 00 D3  18 C1 04 81  02 18 00 C1  06 1F 3E 46   .(............>F
003E50  07 D5 01 7E  8A 80 06 D5  01 7D 8A 77  06 73 02 06   ...~.....}.w.s..
003E60  00 F3 05 56  07 73 02 52  00 D5 01 8D  8A 77 06 81   ...V.s.R.....w..
003E70  02 24 00 CA  09 8D 05 B2  09 9D 05 8D  04 81 02 04   .$..............
003E80  00 EE 07 D5  01 8B 8A 77  06 46 07 D5  01 8D 8A 80   .......w.F......
003E90  06 73 02 16  00 F3 05 38  04 E3 06 D5  01 76 8A 77   .s.....8.....v.w
003EA0  06 31 03 D5  01 0A 00 F8  06 1F 3E 46  07 D5 01 7E   .1........>F...~
003EB0  8A 80 06 D5  01 7D 8A 77  06 D5 01 59  87 99 15 7A   .....}.w...Y...z
003EC0  01 6A 01 D5  01 7B 8A 77  06 63 3C C1  04 81 02 08   .j...{.w.c<.....
003ED0  00 61 36 73  02 04 00 65  36 7B 39 30  05 81 02 06   .a6s...e6{90....
003EE0  00 F3 05 EE  07 D5 01 58  8A 77 06 08  06 1B 06 B2   .......X.w......
003EF0  09 81 02 0A  00 46 07 D5  01 7E 8A 80  06 D5 01 6E   .....F...~.....n
003F00  8A 77 06 D5  01 AB 89 63  06 2F 3E 7A  01 6A 01 D5   .w.....c./>z.j..
003F10  01 C1 3E 46  07 D5 01 0D  00 C1 17 7A  01 6A 01 D5   ..>F.......z.j..
003F20  01 6E 8A 77  06 D5 01 7F  8A 77 06 2F  06 38 04 46   .n.w.....w./.8.F
003F30  07 F8 06 0F  06 81 02 10  00 67 3C 38  06 D5 01 58   .........g<8...X
003F40  8A 80 06 F3  05 EE 07 F3  05 D5 01 80  8A 77 06 F9   .............w..
003F50  05 2F 06 38  04 46 07 F8  06 0F 06 81  02 10 00 63   ./.8.F.........c
003F60  3C 38 06 F3  05 D5 01 58  8A 80 06 EE  07 D5 01 58   <8.....X.......X
003F70  8A 80 06 F3  05 46 07 5F  3C 7A 01 6A  01 D5 01 1D   .....F._<z.j....
003F80  3F 56 07 D5  01 0C 00 C1  17 7A 01 6A  01 D5 01 7C   ?V.......z.j...|
003F90  8A 77 06 D5  01 04 00 38  04 46 07 F8  06 D5 01 73   .w.....8.F.....s
003FA0  8A 77 06 31  03 D5 01 7A  8A 77 06 31  03 D5 01 7A   .w.1...z.w.1...z
003FB0  00 1A 04 08  06 D5 01 72  8A 80 06 30  04 7A 01 6A   .......r...0.z.j
003FC0  01 7B 3F 2F  06 D5 01 7B  8A 80 06 D5  01 7C 8A 80   .{?/...{.....|..
003FD0  06 67 3C 8E  02 12 00 D5  01 5F 8A 77  06 D5 01 6F   .g<......_.w...o
003FE0  8A 77 06 73  02 20 00 63  3C 8E 02 12  00 D5 01 67   .w.s. .c<......g
003FF0  8A 77 06 D5  01 70 8A 77  06 73 02 0A  00 46 07 46   .w...p.w.s...F.F
004000  07 1B 06 F3  05 00 06 D5  01 7A 8A 80  06 31 03 D5   .........z...1..
004010  01 64 00 09  04 F9 05 D5  01 1E 00 E8  04 81 02 04   .d..............
004020  00 42 04 D5  01 77 8A 77  06 30 04 08  06 D5 01 76   .B...w.w.0.....v
004030  8A 80 06 31  03 8B 3F D5  01 85 8A 77  06 F8 06 7A   ...1..?....w...z
004040  01 6A 01 D5  01 BF 3F 4E  07 D5 01 0B  00 C1 17 7A   .j....?N.......z
004050  01 6A 01 D5  01 59 87 77  06 CA 09 81  02 04 00 EE   .j...Y.w........
004060  07 5D 36 7B  39 81 02 0C  00 D5 01 6E  8A 80 06 73   .]6{9......n...s
004070  02 06 00 F3  05 EE 07 D5  01 7E 8A 77  06 81 02 06   .........~.w....
004080  00 0D 3F EE  07 D5 01 53  8A 77 06 51  04 D5 01 04   ..?....S.w.Q....
004090  00 F0 09 D5  01 04 00 31  03 85 36 30  04 08 06 7B   .......1..60...{
0040A0  39 81 02 0C  00 D5 01 80  8A 80 06 73  02 06 00 46   9..........s...F
0040B0  06 EE 07 42  04 7B 39 81  02 0C 00 D5  01 7F 8A 80   ...B.{9.........
0040C0  06 73 02 06  00 F3 05 EE  07 41 40 D5  01 84 8A 77   .s.......A@....w
0040D0  06 1F 07 D5  01 51 8A 6D  06 56 07 D5  01 59 87 99   .....Q.m.V...Y..
0040E0  15 7A 01 6A  01 D5 01 51  40 46 07 D5  01 14 00 C1   .z.j...Q@F......
0040F0  17 7A 01 6A  01 08 06 4E  07 C1 04 81  02 08 00 56   .z.j...N.......V
004100  07 73 02 04  00 5E 07 8D  05 8D 05 08  06 8D 05 42   .s...^.........B
004110  04 08 06 42  04 D5 01 05  00 A8 07 08  06 AD 05 42   ...B...........B
004120  04 80 06 08  06 30 04 AD  05 49 04 77  06 30 04 AD   .....0...I.w.0..
004130  05 42 04 08  06 9D 05 AD  05 F9 05 8D  05 30 04 F9   .B...........0..
004140  05 1D 02 4F  41 B9 05 77  06 30 04 43  02 F8 FF 9D   ...OA..w.0.C....
```

```
004150  05 F9 05 9D  05 9D 05 30  04 1A 04 B1  18 7A 01 6A   .......0.....z.j
004160  01 D5 01 07  00 83 07 7A  01 6A 01 63  3C C1 04 81   .......z.j.c<...
004170  02 0A 00 D5  01 70 8A 73  02 06 00 D5  01 6F 8A 77   .....p.s.....o.w
004180  06 4E 07 F8  06 47 15 D5  01 A0 8A 63  06 38 04 D5   .N...G.....c.8..
004190  01 A2 8A 77  06 4E 07 F8  06 1A 04 D5  01 A4 8A 77   ...w.N.........w
0041A0  06 D5 01 05  00 38 04 30  04 4E 07 F8  06 D5 01 64   .....8.0.N.....d
0041B0  00 31 03 F9  05 1A 04 D5  01 64 00 1F  07 4E 07 F8   .1.......d...N..
0041C0  06 7A 01 6A  01 F9 05 F3  05 D5 01 64  00 31 03 D5   .z.j.......d.1..
0041D0  01 FF 00 1A  04 7A 01 6A  01 69 41 D3  18 4E 07 B1   .....z.j.iA..N..
0041E0  18 08 06 5F  41 2F 06 80  06 42 04 80  06 46 07 53   ..._A/...B...F.S
0041F0  50 B9 3B D5  01 05 00 D5  01 59 87 7F  15 7A 01 6A   P.;......Y...z.j
004200  01 08 06 8D  05 63 3C C1  04 81 02 0E  00 D5 01 67   .....c<........g
004210  8A D5 01 66  8A 73 02 0A  00 D5 01 5F  8A D5 01 5E   ...f.s....._...^
004220  8A D5 01 57  8A 77 06 81  02 0E 00 38  06 46 06 4E   ...W.w.....8.F.N
004230  07 1F 18 D7  41 EE 07 9D  05 F3 05 08  06 77 06 42   ....A........w.B
004240  04 4E 07 D5  01 06 00 83  19 F9 05 08  06 8D 05 80   .N..............
004250  06 8D 05 F9  05 C3 41 9D  05 9D 05 77  06 F3 40 7A   ......A....w..@z
004260  01 6A 01 D5  01 FF 41 D5  01 FD FF D5  01 09 00 C1   .j....A.........
004270  17 7A 01 6A  01 D5 01 57  8A 77 06 81  02 3E 00 DB   .z.j...W.w...>..
004280  18 47 15 D5  01 A0 8A 63  06 38 04 4E  07 F8 06 D5   .G.....c.8.N....
004290  01 A3 8A 77  06 E8 04 5D  36 7B 39 F9  05 D5 01 9F   ...w...]6{9.....
0042A0  8A 77 06 38  04 E3 06 08  06 D5 01 A2  8A 80 06 4E   .w.8...........N
0042B0  07 E8 04 8D  04 9A 04 73  02 14 00 D5  01 FA 00 E8   .......s........
0042C0  04 D3 18 30  04 D5 01 19  00 D1 04 9A  04 7A 01 6A   ...0.........z.j
0042D0  01 8D 05 2F  06 AD 05 73  42 81 02 66  00 D5 01 78   .../...sB..f...x
0042E0  8A 77 06 08  06 8D 05 63  3C C1 04 81  02 04 00 F9   .w.....c<.......
0042F0  05 F3 05 D5  01 19 00 F8  06 D5 01 79  8A 77 06 D5   ...........y.w..
004300  01 19 00 F8  06 30 04 56  07 1A 04 08  06 D5 01 81   .....0.V........
004310  8A 80 06 9D  05 9D 05 D5  01 14 00 38  04 D5 01 14   ...........8....
004320  00 F8 06 D5  01 FA 00 1F  07 08 06 D5  01 82 8A 80   ................
004330  06 F9 05 61  42 5F 3C D5  01 78 8A 80  06 73 02 08   ...aB_<..x...s..
004340  00 4E 07 1F  18 DB 18 7A  01 6A 01 D5  01 CF 42 D5   .N.....z.j....B.
004350  01 FD FF D5  01 0A 00 C1  17 7A 01 6A  01 D5 01 57   .........z.j...W
004360  8A 77 06 CA  09 81 02 0C  00 46 07 D5  01 56 8A 80   .w.......F...V..
004370  06 EE 07 79  36 7B 39 B4  04 9A 04 7D  36 7B 39 B4   ...y6{9....}6{9.
004380  04 9A 04 9A  04 46 07 ED  1B D3 18 F5  35 B2 09 F9   .....F......5...
004390  05 47 15 08  06 D5 01 A0  8A 6D 06 D5  01 78 00 30   .G.......m...x.0
0043A0  04 D1 04 B4  04 9A 04 9A  04 9A 04 81  02 04 00 EE   ................
0043B0  07 7B 3F 5F  3C C1 04 F9  05 5E 07 D1  04 9A 04 81   .{?_<....^......
0043C0  02 04 00 EE  07 5D 36 7B  39 81 02 0C  00 D5 01 9F   .....]6{9.......
0043D0  8A 80 06 73  02 06 00 F3  05 EE 07 4B  07 D5 01 57   ...s.......N...W
0043E0  8A D5 06 F5  35 B9 3B D5  01 A3 8A 77  06 08 06 D5   ....5.;....w....
0043F0  01 05 00 30  04 D5 01 79  87 99 15 56  07 30 04 D5   ...0...y...V.0..
004400  01 59 87 99  15 46 07 D5  01 56 8A 80  06 7A 01 6A   .Y...F...V...z.j
004410  01 D5 01 5B  43 46 07 D5  01 17 00 C1  17 7A 01 6A   ...[CF.......z.j
004420  01 8D 05 2F  06 30 04 D5  01 19 00 E8  04 9D 05 D5   .../.0..........
004430  01 14 00 D1  04 8D 04 81  02 0C 00 08  06 81 02 0C   ................
004440  00 63 3C 1B  06 F3 05 73  02 06 00 F3  05 67 3C D5   .c<....s.....g<.
004450  01 78 8A 80  06 D5 01 79  8A 80 06 46  07 D5 01 56   .x.....y...F...V
004460  8A 80 06 73  02 1E 00 46  06 D5 01 56  8A 08 06 77   ...s...F...V...w
004470  06 42 04 08  06 1B 06 80  06 5B 3C E8  04 81 02 04   .B.......[<.....
004480  00 0F 44 7A  01 6A 01 D5  01 1F 44 D5  01 FD FF D5   ..Dz.j....D.....
004490  01 08 00 C1  17 7A 01 6A  01 D5 01 78  8A 77 06 81   .....z.j...x.w..
0044A0  02 08 00 49  43 73 02 04  00 85 44 7A  01 6A 01 D5   ...ICs....Dz.j..
0044B0  01 49 87 77  06 CA 09 81  02 04 00 EE  07 E5 3C 69   .I.w..........<i
0044C0  36 7B 39 30  05 81 02 06  00 F3 05 EE  07 6D 36 7B   6{90.........m6{
0044D0  39 30 05 81  02 06 00 46  06 EE 07 ED  36 7B 39 30   90.....F....6{90
0044E0  05 81 02 08  00 F3 05 46  06 EE 07 F1  36 7B 39 30   .......F....6{90
0044F0  05 81 02 08  00 46 06 46  06 EE 07 F8  06 97 44 D5   .....F.F......D.
004500  01 14 00 D5  01 49 87 7F  15 7A 01 6A  01 D5 01 AD   .....I...z.j....
004510  44 46 07 D5  01 15 00 C1  17 7A 01 6A  01 D5 01 7C   DF.......z.j...|
004520  83 77 06 30  05 D5 01 55  80 77 06 30  05 9A 04 81   .w.0...U.w.0....
004530  02 04 00 EE  07 0B 45 E3  40 9B 23 7A  01 40 01 00   ......E.@.#z.@..
004540  00 40 01 01  00 40 01 02  00 40 01 03  00 6A 01 46   .@...@...@...j.F
004550  07 F9 05 46  07 F2 01 87  45 00 06 B9  05 32 19 81   ...F....E....2..
004560  02 14 00 B9  05 60 04 42  04 0A 19 B9  05 60 04 F8   .....`.B.....`..
004570  18 73 02 10  00 B9 05 60  04 42 04 F8  18 B9 05 60   .s.....`.B.....`
004580  04 0A 19 43  02 D4 FF CB  18 7A 01 6A  01 D5 01 6B   ...C.....z.j...k
004590  83 77 06 7A  01 6A 01 4E  07 8E 02 0A  00 D5 01 06   .w.z.j.N........
0045A0  00 73 02 EE  00 56 07 8E  02 0A 00 D5  01 0E 00 73   .s...V.........s
0045B0  02 E0 00 5E  07 8E 02 08  00 56 07 73  02 D4 00 D5   ...^.....V.s....
0045C0  01 04 00 8E  02 0A 00 D5  01 0A 00 73  02 C4 00 D5   ...........s....
0045D0  01 05 00 8E  02 08 00 4E  07 73 02 B6  00 D5 01 06   .......N.s......
0045E0  00 8E 02 0A  00 D5 01 09  00 73 02 A6  00 D5 01 07   .........s......
0045F0  00 8E 02 0A  00 D5 01 05  00 73 02 96  00 D5 01 08   .........s......
```

```
004600  00 8E 02 0A  00 D5 01 0D  00 73 02 86  00 D5 01 09   .........s......
004610  00 8E 02 0A  00 D5 01 07  00 73 02 76  00 D5 01 0A   .........s.v....
004620  00 8E 02 0A  00 D5 01 0F  00 73 02 66  00 D5 01 0B   .........s.f....
004630  00 8E 02 08  00 5E 07 73  02 58 00 D5  01 0C 00 8E   .....^.s.X......
004640  02 0A 00 D5  01 0B 00 73  02 48 00 D5  01 0D 00 8E   .......s.H......
004650  02 08 00 46  07 73 02 3A  00 D5 01 0E  00 8E 02 0A   ...F.s.:........
004660  00 D5 01 08  00 73 02 2A  00 D5 01 0F  00 8E 02 0A   .....s.*........
004670  00 D5 01 04  00 73 02 1A  00 D5 01 10  00 8E 02 0A   .....s..........
004680  00 D5 01 0C  00 73 02 0A  00 D5 01 07  00 F9 05 F3   .....s..........
004690  05 7A 01 6A  01 D5 01 06  00 8E 02 08  00 4E 07 73   .z.j.........N.s
0046A0  02 EE 00 D5  01 0E 00 8E  02 08 00 56  07 73 02 E0   ...........V.s..
0046B0  00 56 07 8E  02 08 00 5E  07 73 02 D4  00 D5 01 0A   .V.....^.s......
0046C0  00 8E 02 0A  00 D5 01 04  00 73 02 C4  00 4E 07 8E   .........s...N..
0046D0  02 0A 00 D5  01 05 00 73  02 B6 00 D5  01 09 00 8E   .......s........
0046E0  02 0A 00 D5  01 06 00 73  02 A6 00 D5  01 05 00 8E   .......s........
0046F0  02 0A 00 D5  01 07 00 73  02 96 00 D5  01 0D 00 8E   .......s........
004700  02 0A 00 D5  01 08 00 73  02 86 00 D5  01 07 00 8E   .......s........
004710  02 0A 00 D5  01 09 00 73  02 76 00 D5  01 0F 00 8E   .......s.v......
004720  02 0A 00 D5  01 0A 00 73  02 66 00 5E  07 8E 02 0A   .......s.f.^....
004730  00 D5 01 0B  00 73 02 58  00 D5 01 0B  00 8E 02 0A   .....s.X........
004740  00 D5 01 0C  00 73 02 48  00 46 07 8E  02 0A 00 D5   .....s.H.F......
004750  01 0D 00 73  02 3A 00 D5  01 08 00 8E  02 0A 00 D5   ...s.:..........
004760  01 0E 00 73  02 2A 00 D5  01 04 00 8E  02 0A 00 D5   ...s.*..........
004770  01 0F 00 73  02 1A 00 D5  01 0C 00 8E  02 0A 00 D5   ...s............
004780  01 10 00 73  02 0A 00 D5  01 09 00 F9  05 F3 05 7A   ...s...........z
004790  01 6A 01 5E  07 D5 01 B9  87 99 15 95  45 D5 01 6B   .j.^........E..k
0047A0  83 80 06 7A  01 6A 01 95  45 4E 07 CB  07 7A 01 40   ...z.j..EN...z.@
0047B0  01 FF 00 40  01 01 00 40  01 03 00 40  01 05 00 40   ...@...@...@...@
0047C0  01 07 00 40  01 09 00 40  01 0B 00 40  01 0D 00 40   ...@...@...@...@
0047D0  01 11 00 40  01 13 00 6A  01 D5 01 38  82 D5 01 34   ...@...j...8...4
0047E0  82 08 06 77  06 08 06 42  04 D5 01 0F  00 8D 04 1B   ...w...B........
0047F0  06 80 06 60  04 30 04 08  06 D5 01 01  00 30 04 77   ...`.0.......0.w
004800  06 F9 05 D5  01 00 00 30  04 77 06 7A  01 6A 01 D5   .......0.w.z.j..
004810  01 2D 82 8D  05 D5 01 0E  00 D5 01 08  00 CB 07 8B   .-..............
004820  45 D5 01 04  00 4D 45 9A  04 D5 01 04  00 CB 07 12   E....ME.........
004830  0C AD 05 80  06 D5 01 08  00 CB 07 00  06 D5 01 05   ................
004840  00 4D 45 56  07 CB 07 9A  04 12 0C AD  05 42 04 80   .MEV.........B..
004850  06 56 07 CB  07 D5 01 0E  00 9A 04 D5  01 06 00 CB   .V..............
004860  07 12 0C AD  05 49 04 80  06 D5 01 08  00 CB 07 8B   .....I..........
004870  45 D5 01 04  00 4D 45 9A  04 D5 01 06  00 CB 07 8B   E....ME.........
004880  0C AD 05 5E  07 30 04 80  06 D5 01 08  00 CB 07 F9   ...^.0..........
004890  05 D5 01 05  00 4D 45 D5  01 04 00 CB  07 9A 04 12   .....ME.........
0048A0  0C AD 05 D5  01 04 00 30  04 80 06 9D  05 D5 01 05   .......0........
0048B0  00 30 04 80  06 7A 01 6A  01 5E 07 D5  01 90 81 80   .0...z.j.^......
0048C0  06 D5 01 90  81 77 06 30  05 81 02 F6  FF 0D 48 D5   .....w.0......H.
0048D0  01 06 00 D5  01 2B 82 80  06 7A 01 6A  01 D5 01 2B   .....+...z.j...+
0048E0  82 77 06 30  05 D5 01 2C  82 77 06 30  05 8D 04 D5   .w.0...,.w.0....
0048F0  01 35 82 77  06 08 06 D5  01 07 00 32  19 F9 05 D5   .5.w.......2....
004900  01 01 00 32  19 B4 04 9A  04 8D 04 7A  01 6A 01 DB   ...2.......z.j..
004910  48 B4 04 7A  01 6A 01 08  06 77 06 08  06 42 04 2B   H..z.j...w...B.+
004920  11 F0 09 1B  06 80 06 D5  01 37 85 30  04 7A 01 6A   .........7.0.z.j
004930  01 D5 01 58  85 15 49 80  06 7A 01 6A  01 D5 01 57   ...X..I..z.j...W
004940  85 15 49 77  06 7A 01 6A  01 D5 01 57  85 77 06 D5   ..Iw.z.j...W.w..
004950  01 58 85 77  06 B2 09 7A  01 6A 01 47  49 D5 01 5B   .X.w...z.j.GI..[
004960  85 77 06 CA  09 9A 04 7A  01 6A 01 47  49 81 02 16   .w.....z.j.GI...
004970  00 3B 49 D5  01 5C 85 80  06 D5 01 59  85 77 06 D5   .;I..\.....Y.w..
004980  01 5B 85 80  06 7A 01 6A  01 D5 00 51  4C 42         .[...z.j...QLB
004990  04 D5 01 A9  87 7F 15 7A  01 6A 01 09  4B 71 17 59   .......z.j..Kq.Y
0049A0  49 B4 04 81  02 F6 FF 7A  01 6A 01 8B  45 D5 01 60   I......z.j..E..`
0049B0  85 77 06 B2  09 81 02 04  00 EE 07 D5  01 61 85 77   .w...........a.w
0049C0  06 D3 47 8E  02 0E 00 4E  07 D5 01 63  85 80 06 73   ..G....N...c...s
0049D0  02 1A 00 CF  47 8E 02 12  00 46 07 D5  01 63 85 80   ....G....F...c..
0049E0  06 D3 47 2F  49 73 02 04  00 F3 05 7A  01 6A 01 D7   ..G/Is.....z.j..
0049F0  47 2F 06 D5  01 60 85 80  06 D5 01 61  85 80 06 8B   G/...`.....a....
004A00  45 C1 04 F9  05 D5 01 5C  85 77 06 C1  04 8D 04 08   E......\.w......
004A10  06 D5 01 5D  85 80 06 D5  01 5A 85 77  06 CA 09 8D   ...].....Z.w....
004A20  04 81 02 16  00 46 07 D5  01 5B 85 80  06 46 07 D5   .....F...[...F..
004A30  01 5A 85 80  06 73 02 04  00 A9 49 7A  01 6A 01 0D   .Z...s....Iz.j..
004A40  49 81 02 04  00 EE 07 D5  01 5B 85 77  06 30 05 81   I........[.w.0..
004A50  02 08 00 69  49 73 02 24  00 D5 01 5B  85 08 06 77   ...iIs.$...[...w
004A60  06 51 04 46  07 F8 06 B1  18 D5 01 5C  85 77 06 B7   .Q.F.......\.w..
004A70  48 D5 01 32  00 D5 01 5A  85 80 06 7A  01 6A 01 D5   H..2...Z...z.j..
004A80  01 55 80 77  06 CA 09 D5  01 A3 81 77  06 9A 04 D5   .U.w.......w....
004A90  01 A9 87 77  06 CA 09 9A  04 81 02 04  00 EE 07 D5   ...w............
004AA0  01 90 81 77  06 CA 09 81  02 04 00 EE  07 D5 01 5B   ...w...........[
```

```
004AB0  82 77 06 81  02 16 00 46  07 D5 01 5A  85 80 06 46   .w.....F...Z...F
004AC0  07 D5 01 5B  82 80 06 87  49 EE 07 D5  01 33 82 77   ...[....I....3.w
004AD0  06 D5 01 34  82 77 06 B2  09 81 02 04  00 ED 49 D5   ...4.w........I.
004AE0  01 35 82 77  06 81 02 04  00 EE 07 D5  01 5A 85 08   .5.w.........Z..
004AF0  06 77 06 08  06 51 04 46  07 F8 06 18  06 80 06 30   .w...Q.F.......0
004B00  05 81 02 04  00 3D 4A 7A  01 6A 01 D5  01 7D 4A 46   .....=Jz.j...}JF
004B10  07 D5 01 04  00 C1 17 7A  01 6A 01 08  06 AF 47 C1   .......z.j....G.
004B20  04 81 02 08  00 F3 05 73  02 06 00 A5  47 2F 49 2F   .......s....G/I/
004B30  49 7A 01 6A  01 D5 01 19  4B D5 01 FE  FF D5 01 05   Iz.j....K.......
004B40  00 C1 17 7A  01 6A 01 8D  05 08 06 1D  4F BF 47 00   ...z.j......O.G.
004B50  06 33 4B BB  47 00 06 33  4B C3 47 F9  05 9D 05 00   .3K.G..3K.G.....
004B60  06 30 04 77  06 D5 01 14  00 1F 07 4E  07 F8 06 46   .0.w.......N...F
004B70  07 F2 01 7D  4B 2F 06 33  4B 43 02 FA  FF 46 06 7A   ...}K/.3KC...F.z
004B80  01 6A 01 09  4B 71 17 59  49 B4 04 81  02 F6 FF 46   .j..Kq.YI......F
004B90  07 D5 01 63  85 80 06 CF  47 AF 47 33  4B 46 07 D5   ...c....G.G3KF..
004BA0  01 A9 87 80  06 71 17 D5  01 0A 00 D5  01 49 87 7F   .....q.......I..
004BB0  15 09 4B 71  17 D5 01 63  85 77 06 81  02 06 00 46   ..Kq...c.w.....F
004BC0  07 EE 07 D5  01 49 87 77  06 30 05 81  02 E4 FF 66   .....I.w.0.....f
004BD0  07 7A 01 6A  01 D5 01 62  85 77 06 81  02 04 00 EE   .z.j...b.w......
004BE0  07 4E 07 D5  01 62 85 80  06 D5 01 55  80 77 06 CA   .N...b.....U.w..
004BF0  09 81 02 04  00 EE 07 99  49 4E 07 D5  01 10 00 F2   ........IN......
004C00  01 23 4C B9  05 D5 01 08  00 38 04 D5  01 10 00 F0   .#L......8......
004C10  09 42 04 91  47 81 4B 81  02 04 00 33  02 66 07 5B   .B..G.K....3.f.[
004C20  02 E2 FF D5  01 1E 00 D5  01 A9 87 7F  15 7A 01 6A   .............z.j
004C30  01 D5 01 E7  86 63 06 D5  01 03 01 31  03 5E 07 30   .....c.....1.^.0
004C40  04 D5 01 FF  7F 8D 04 08  06 D5 01 E7  86 6D 06 7A   .............m.z
004C50  01 6A 01 2F  4C 04 0A D5  01 00 80 9E  03 CB 18 7A   .j./L..........z
004C60  01 6A 01 D5  01 19 87 77  06 CA 09 81  02 04 00 EE   .j.....w........
004C70  07 D5 01 09  87 77 06 CA  09 81 02 0A  00 46 07 66   .....w.......F.f
004C80  07 2B 50 EE  07 D5 01 F9  86 77 06 CA  09 81 02 0A   .+P......w......
004C90  00 46 07 46  07 2B 50 EE  07 D5 01 F4  86 08 06 77   .F.F.+P........w
004CA0  06 08 06 30  05 81 02 0E  00 46 06 46  07 46 07 2B   ...0.....F.F.F.+
004CB0  50 73 02 38  00 51 04 46  07 F8 06 B1  18 D5 01 F2   Ps.8.Q.F........
004CC0  86 77 06 08  06 D5 01 F3  86 77 06 31  03 D5 01 64   .w.......w.1...d
004CD0  00 1A 04 08  06 08 06 8D  05 D5 01 09  87 99 15 38   ...............8
004CE0  04 9D 05 30  04 D5 01 F9  86 99 15 7A  01 6A 01 D5   ...0.......z.j..
004CF0  01 61 4C 46  07 D5 01 13  00 C1 17 7A  01 40 01 01   .aLF.......z.@..
004D00  00 40 01 00  00 40 01 01  00 40 01 02  00 40 01 03   .@...@...@...@..
004D10  00 6A 01 D5  01 5A 80 08  06 77 06 5C  0C 9A 04 B1   .j...Z...w.\....
004D20  18 7A 01 6A  01 D5 01 5A  80 08 06 77  06 5C 0C B4   .z.j...Z...w.\..
004D30  04 8D 04 B1  18 7A 01 6A  01 33 4B 09  4B 71 17 59   .....z.j.3K.Kq.Y
004D40  49 B4 04 81  02 F6 FF 7A  01 6A 01 46  07 F2 01 5F   I......z.j.F..._
004D50  4D 2F 06 37  4D D5 01 FA  00 39 18 43  02 F4 FF 46   M/.7M....9.C...F
004D60  06 7A 01 6A  01 11 55 D5  01 FA 00 39  18 23 4D FF   .z.j..U....9.#M.
004D70  54 D5 01 FA  00 39 18 11  4D 11 55 D5  01 FA 00 39   T....9..M.U....9
004D80  18 23 4D FF  54 D5 01 FA  00 39 18 11  4D 11 55 D5   .#M.T....9..M.U.
004D90  01 A9 87 77  06 81 02 04  00 EE 07 D5  01 11 00 4E   ...w...........N
004DA0  07 F2 01 B9  4D BF 47 B9  05 4E 07 49  4D BF 47 B9   ....M.G.N.IM.G.
004DB0  05 4E 07 49  4D 43 02 EE  FF CB 47 AF  47 4E 07 49   .N.IM.C...G.GN.I
004DC0  4D D5 01 FA  00 39 18 D5  01 FA 00 39  18 B7 47 AF   M....9.....9..G.
004DD0  47 4E 07 49  4D D5 01 FA  00 39 18 D5  01 FA 00 39   GN.IM....9.....9
004DE0  18 7A 01 6A  01 D5 01 6B  83 77 06 93  46 D5 01 10   .z.j...k.w..F...
004DF0  00 F0 09 42  04 91 47 46  07 D5 01 64  85 80 06 7A   ...B..GF...d...z
004E00  01 6A 01 D5  01 83 82 77  06 54 0C 8E  02 Q8 00 E3   .j.....w.T......
004E10  4D 73 02 22  00 50 0C 8E  02 0E 00 4E  07 D5 01 68   Ms.".P.....N...h
004E20  85 80 06 73  02 10 00 4C  0C 8E 02 08  00 63 4D 73   ...s...L.....cMs
004E30  02 04 00 F3  05 7A 01 6A  01 D5 01 05  00 D5 01 9B   .....z.j........
004E40  8A 80 06 D5  01 83 82 77  06 54 0C 8E  02 0C 00 F9   .......w.T......
004E50  35 F5 3B 80  36 73 02 30  00 50 0C 8E  02 14 00 F5   5.;.6s.0.P......
004E60  35 F5 3B 85  36 4E 07 D5  01 68 85 80  06 73 02 18   5.;.6N...h...s..
004E70  00 4C 0C 8E  02 0C 00 FD  35 F5 3B 95  36 73 02 08   .L......5.;.6s..
004E80  00 85 36 F9  05 F3 05 7B  39 F3 05 D5  01 6D 83 80   ..6....{9....m..
004E90  06 46 07 D5  01 89 81 80  06 7A 01 6A  01 D5 01 BA   .F.......z.j....
004EA0  83 08 06 77  06 42 04 D5  01 05 00 F0  09 B1 18 D5   ...w.B..........
004EB0  01 55 80 77  06 81 02 08  00 37 4E 73  02 04 00 01   .U.w.....7Ns....
004EC0  4E 7A 01 6A  01 1F 11 31  03 D5 01 81  86 30 04 7A   Nz.j...1.....0.z
004ED0  01 6A 01 7A  01 6A 01 42  04 7A 01 6A  01 49 04 7A   .j.z.j.B.z.j.I.z
004EE0  01 6A 01 D5  01 04 00 CB  07 F9 05 D5  01 30 00 B4   .j...........0..
004EF0  04 8D 04 9A  04 7A 01 6A  01 D5 01 30  00 8D 04 D5   .....z.j...0....
004F00  01 FC FF CB  07 7A 01 6A  01 C3 4E D5  4E 08 06 77   .....z.j..N.N..w
004F10  06 D5 01 0F  00 B4 04 8D  04 B1 18 7A  01 6A 01 C3   ...........z.j..
004F20  4E D5 4E 08  06 77 06 D5  01 0F 00 9A  04 B1 18 7A   N.N..w.........z
004F30  01 6A 01 46  07 F8 06 08  06 23 11 51  04 E8 04 81   .j.F.....#.Q....
004F40  02 06 00 DB  18 EE 07 08  06 30 05 D5  01 55 80 77   .........0...U.w
004F50  06 CA 09 8D  04 81 02 30  00 49 3B 00  06 D5 01 34   .......0.I;....4
```

```
004F60   17 D1 04 B4   04 5E 07 23   06 56 07 D1   04 8D 04 81   .....^.#.V......
004F70   02 16 00 56   07 23 06 81   02 08 00 FD   36 73 02 04   ...V.#......6s..
004F80   00 07 37 DB   18 EE 07 08   06 07 4F C3   4E 8D 05 08   ..7.......O.N...
004F90   06 AD 05 DB   4E 6D 06 81   02 0C 00 9D   05 D1 4E 80   ....Nm........N.
004FA0   06 73 02 08   00 4E 07 1F   18 46 06 7A   01 6A 01 08   .s...N...F.z.j..
004FB0   06 23 11 C1   04 81 02 2C   00 F3 05 08   06 30 05 81   .#.........,.0..
004FC0   02 0A 00 46   07 D5 01 B9   83 80 06 23   11 46 07 F2   ...F.......#.F..
004FD0   01 DD 4F 2F   06 B9 05 31   4F 43 02 F8   FF 46 06 73   ..O/...1OC...F.s
004FE0   02 24 00 D5   01 14 00 38   04 08 06 46   07 D1 04 B4   .$.....8...F....
004FF0   04 00 06 57   11 D1 04 8D   04 81 02 08   00 E3 20 73   ...W...........s
005000   02 04 00 DB   18 7A 01 6A   01 08 06 23   11 D1 04 B4   .....z.j...#....
005010   04 81 02 08   00 AD 4F 73   02 04 00 31   4F 7A 01 6A   ......Os...1Oz.j
005020   01 46 07 46   07 23 11 07   50 7A 01 6A   01 F9 05 C3   .F.F.#..Pz.j....
005030   4E D5 4E 08   06 77 06 1B   06 81 02 0C   00 D5 01 40   N.N..w.........@
005040   00 9A 04 73   02 0A 00 D5   01 40 00 B4   04 8D 04 B1   ...s.....@......
005050   18 7A 01 6A   01 08 06 8D   05 C3 4E 08   06 D5 4E 77   .z.j......N...Nw
005060   06 D5 01 40   00 8D 04 81   02 0C 00 4E   07 1F 18 46   ...@.......N...F
005070   06 46 07 EE   07 08 06 DB   4E 63 06 CA   09 81 02 0E   .F......Nc......
005080   00 4E 07 1F   18 F3 05 D1   4E 77 06 EE   07 F3 05 9D   .N......Nw......
005090   05 2B 1F 7A   01 6A 01 D5   01 5A 80 08   06 77 06 5C   .+.z.j...Z...w.\
0050A0   0C B4 04 8D   04 B1 18 7A   01 6A 01 D5   01 5A 80 08   .......z.j...Z..
0050B0   06 77 06 5C   0C 9A 04 B1   18 7A 01 6A   01 D5 01 55   .w.\.....z.j...U
0050C0   80 77 06 CA   09 81 02 08   00 F5 3B 73   02 0E 00 81   .w........;s....
0050D0   02 08 00 A9   50 73 02 04   00 95 50 7A   01 6A 01 08   ....Ps....Pz.j..
0050E0   06 1D 4F D5   01 7F 86 77   06 4E 07 F8   06 46 07 2F   ..O....w.N...F./
0050F0   06 8D 05 8D   05 F2 01 03   51 BF 47 00   06 33 4B 43   ........Q.G..3KC
005100   02 F8 FF 9D   05 9D 05 F2   01 15 51 BB   47 00 06 33   ..........Q.G..3
005110   4B 43 02 F8   FF F3 05 7A   01 6A 01 F9   05 41 45 8E   KC.....z.j...AE.
005120   02 08 00 DD   50 73 02 36   00 3D 45 8E   02 0C 00 BF   ....Ps.6.=E.....
005130   47 F9 05 33   4B 73 02 26   00 45 45 8E   02 0C 00 D5   G..3Ks.&.EE.....
005140   01 15 85 45   4B 73 02 16   00 49 45 8E   02 0C 00 D5   ...EKs...IE.....
005150   01 26 85 45   4B 73 02 06   00 F3 05 F3   05 7A 01 6A   .&.EKs.......z.j
005160   01 08 06 30   05 81 02 0A   00 F3 05 BB   50 73 02 04   ...0........Ps..
005170   00 19 51 7A   01 6A 01 F9   05 8D 05 C3   4E D5 4E 08   ..Qz.j......N.N.
005180   06 77 06 08   06 F7 4E AD   05 B2 09 81   02 0A 00 D5   .w....N.........
005190   01 0F 00 B4   04 8D 04 9D   05 E1 4E 08   06 D5 01 0F   ..........N.....
0051A0   00 8D 04 42   04 D5 01 0F   00 8D 04 F9   05 D5 01 0F   ...B............
0051B0   00 B4 04 8D   04 9A 04 B1   18 7A 01 6A   01 2F 06 C3   .........z.j./..
0051C0   4E D5 4E 77   06 08 06 F7   4E 1B 06 B2   09 F9 05 D5   N.Nw....N.......
0051D0   01 0F 00 8D   04 D5 01 7F   86 77 06 D1   04 9A 04 81   .........w......
0051E0   02 0C 00 2F   06 75 51 5F   51 73 02 04   00 46 06 7A   .../.uQ_Qs...F.z
0051F0   01 6A 01 7C   83 77 06 30   05 50 0C D5   01 83         .j.|.w.0.P......
005200   82 77 06 C1   04 8D 04 D5   01 CE 81 77   06 30 05 8D   .w.........w.0..
005210   04 81 02 12   00 FF 54 D5   01 0A 00 39   18 11 55 D5   ......T....9..U.
005220   01 05 00 39   18 7A 01 6A   01 D5 01 55   80 77 06 81   ...9.z.j...U.w..
005230   02 1E 00 5E   07 D5 01 49   87 99 15 D5   01 0A 00 D5   ...^...I........
005240   01 59 87 99   15 D5 01 14   00 F3 05 7A   87 99 15 7A   .Y.........z...z
005250   01 6A 01 D5   01 83 83 77   06 81 02 04   00 EE 07 D5   .j.....w........
005260   01 76 83 63   06 0F 06 30   05 81 02 04   00 EE 07 D5   .v.c...0........
005270   01 A2 83 08   06 3B 11 60   04 30 04 F9   05 F2 01 A5   .....;.`.0......
005280   52 08 06 B9   05 63 06 C1   04 81 02 14   00 4E 07 D5   R....c.......N..
005290   01 83 83 80   06 46 07 80   01 7D 83 80   06 33 02 56   .....F...}...3.V
0052A0   07 5B 02 DE   FF F3 05 7A   01 6A 01 CF   16 D5 01 79   .[.....z.j.....y
0052B0   83 77 06 B2   09 81 02 0A   00 46 07 D5   01 7D 83 80   .w.......F...}..
0052C0   06 D5 01 7C   83 77 06 30   05 81 02 04   00 EE 07 D5   ...|.w.0........
0052D0   01 7E 83 77   06 30 05 81   02 0E 00 46   07 D5 01 7D   .~.w.0.....F...}
0052E0   83 80 06 27   52 EE 07 D5   01 7D 83 77   06 81 02 04   ...'R....}.w....
0052F0   00 EE 07 27   52 51 52 CF   16 D5 01 79   83 80 06 09   ...'RQR....y....
005300   1B 46 07 F2   01 13 53 B9   05 A9 1E B9   05 5D 20 43   .F....S......] C
005310   02 F6 FF 46   07 D5 01 6F   85 80 06 4E   07 D5 01 7D   ...F...o...N...}
005320   83 80 06 7A   01 6A 01 D5   01 A9 87 77   06 81 02 04   ...z.j.....w....
005330   00 EE 07 D5   01 69 87 77   06 CA 09 D5   01 55 80 77   .....i.w.....U.w
005340   06 CA 09 8D   04 81 02 04   00 EE 07 59   49 81 02 06   ...........YI...
005350   00 09 4B EE   07 D5 01 CE   81 77 06 30   05 D5 01 85   ..K......w.0....
005360   82 77 06 CA   09 8D 04 81   02 28 00 D5   01 D3 4B 46   .w.......(....KF
005370   07 D5 01 0F   00 C1 17 A9   52 D5 01 80   86 08 06 77   ........R......w
005380   06 08 06 53   50 00 06 BB   51 42 04 09   1B F0 09 B1   ...SP...QB......
005390   18 09 4B 7A   01 6A 01 D5   01 25 53 46   07 46 07 C1   ..Kz.j...%SF.F..
0053A0   17 7A 01 40   01 0A 00 40   01 0B 00 40   01 0C 00 40   .z.@...@...@...@
0053B0   01 57 04 40   01 F5 0D 40   01 30 75 40   01 00 00 40   .W.@...@.0u@...@
0053C0   01 01 00 40   01 02 00 40   01 03 00 40   01 04 00 40   ...@...@...@...@
0053D0   01 05 00 40   01 06 00 40   01 14 00 40   01 3C 00 40   ...@...@...@.<.@
0053E0   01 F0 00 40   01 19 00 40   01 08 00 40   01 1E 00 40   ...@...@...@...@
0053F0   01 07 00 6A   01 D5 01 72   80 D5 01 71   80 08 06 8D   ...j...r...q....
005400   05 77 06 08   06 8D 05 30   04 77 06 9D   05 42 04 D5   .w.....0.w...B..
```

```
005410  01 0F 00 8D  04 9D 05 80  06 7A 01 6A  01 D5 01 71    .........z.j...q
005420  80 77 06 D5  01 70 80 77  06 B2 09 7A  01 6A 01 D5    .w...p.w...z.j..
005430  01 70 80 77  06 D5 01 71  80 80 06 7A  01 6A 01 D5    .p.w...q...z.j..
005440  01 D9 86 80  06 D5 01 D8  86 80 06 D5  01 DA 86 80    ................
005450  06 7A 01 6A  01 D5 01 50  00 D5 01 1E  00 D5 01 96    .z.j...P........
005460  00 3D 54 7A  01 6A 01 D5  01 C6 86 77  06 D5 01 67    .=Tz.j.....w...g
005470  83 77 06 C2  09 7A 01 6A  01 46 07 D5  01 DB 86 80    .w...z.j.F......
005480  06 46 07 D5  01 AE 89 80  06 D5 01 5A  80 08 06 77    .F.........Z...w
005490  06 60 0C 9A  04 B1 18 7A  01 6A 01 53  54 D5 01 5A    .`.....z.j.ST..Z
0054A0  80 08 06 77  06 60 0C B4  04 8D 04 B1  18 7A 01 6A    ...w.`.......z.j
0054B0  01 D5 01 5A  80 77 06 60  0C 8D 04 7A  01 6A 01 6C    ...Z.w.`...z.j.l
0054C0  0C 42 19 70  0C 8D 04 30  05 7A 01 6A  01 6C 0C 42    .B.p...0.z.j.l.B
0054D0  19 78 0C 8D  04 30 05 7A  01 6A 01 D5  01 5A 80 08    .x...0.z.j...Z..
0054E0  06 77 06 64  0C 9A 04 B1  18 7A 01 6A  01 D5 01 5A    .w.d.....z.j...Z
0054F0  80 08 06 77  06 64 0C B4  04 8D 04 B1  18 7A 01 6A    ...w.d.......z.j
005500  01 D5 01 5A  80 08 06 77  06 68 0C 9A  04 B1 18 7A    ...Z.w.h.......z
005510  01 6A 01 D5  01 5A 80 08  06 77 06 68  0C B4 04 8D    .j...Z...w.h....
005520  04 B1 18 7A  01 6A 01 D5  01 5A 80 77  06 68 0C 8D    ...z.j...Z.w.h..
005530  04 30 05 7A  01 6A 01 D5  01 91 81 77  06 30 05 81    .0.z.j.....w.0..
005540  02 F6 FF 7A  01 6A 01 35  55 08 06 D5  01 91 81 80    ...z.j.5U.......
005550  06 EB 54 08  06 D5 01 1E  00 E8 04 81  02 08 00 5D    ..T............]
005560  56 73 02 04  00 39 18 7A  01 6A 01 35  55 08 06 D5    Vs...9.z.j.5U...
005570  01 91 81 80  06 08 06 D5  01 1E 00 E8  04 81 02 08    ................
005580  00 5D 56 73  02 04 00 39  18 7A 01 6A  01 5D 5B D5    .]Vs...9.z.j.][.
005590  01 8F 81 77  06 30 05 7A  01 6A 01 CB  54 B4 04 81    ...w.0.z.j..T...
0055A0  02 06 00 46  07 EE 07 D5  01 32 00 CB  55 CB 54 B4    ...F.....2..U.T.
0055B0  04 81 02 06  00 46 07 EE  07 56 07 D5  01 71 83 77    .....F...f...q.w
0055C0  06 81 02 04  00 EE 07 9B  4E 7A 01 6A  01 D5 01 8F    ........Nz.j....
0055D0  81 C5 18 D5  01 6F 83 77  06 B8 7A 8B  55 81 02 04    .....o.w..z.U...
0055E0  00 EE 07 08  06 D5 01 08  00 8D 04 81  02 06 00 8A    ................
0055F0  79 95 53 8B  55 81 02 04  00 EE 07 08  06 D5 01 10    y.S.U...........
005600  00 8D 04 81  02 06 00 8A  79 18 45 8B  55 81 02 04    ........y.E.U...
005610  00 EE 07 08  06 4E 07 8D  04 81 02 06  00 8A 79 65    .....N........ye
005620  2A 8B 55 81  02 04 00 EE  07 08 06 56  07 8D 04 81    *.U........V....
005630  02 06 00 8A  79 D9 35 8B  55 81 02 04  00 EE 07 08    ....y.5.U.......
005640  06 D5 01 20  00 8D 04 81  02 06 00 8A  79 ED 4C 8B    ... ........y.L.
005650  55 81 02 04  00 EE 07 73  02 80 FF 7A  01 6A 01 D5    U......s...z.j..
005660  01 89 87 77  06 30 05 81  02 06 00 99  55 F3 05 CB    ...w.0......U...
005670  55 F3 05 7A  01 6A 01 D5  01 0A 00 69  55 D5 01 0A    U..z.j.....iU...
005680  00 45 55 D5  01 0A 00 69  55 7A 01 6A  01 D5 01 50    .EU....iU.j...P
005690  00 45 55 D5  01 28 00 69  55 D5 01 50  00 45 55 7A    .EU..(.iU..P.EUz
0056A0  01 6A 01 D5  01 50 00 45  55 D5 01 28  00 69 55 D5    .j...P.EU..(.iU.
0056B0  01 0A 00 45  55 D5 01 28  00 69 55 D5  01 0A 00 45    ...EU..(.iU....E
0056C0  55 D5 01 28  00 69 55 D5  01 0A 00 45  55 7A 01 6A    U..(.iU....EUz.j
0056D0  01 D5 01 29  87 B5 14 08  06 D5 01 19  00 E8 04 81    ...)............
0056E0  02 0A 00 F3  05 D5 01 08  00 EE 07 D5  01 0A 00 E8    ................
0056F0  04 81 02 0A  00 D5 01 04  00 73 02 04  00 56 07 7A    .........s...V.z
005700  01 6A 01 D5  01 0A 00 45  55 75 56 7A  01 6A 01 D5    .j.....EUuVz.j..
005710  01 DB 86 77  06 81 02 04  00 EE 07 D5  01 89 87 77    ...w...........w
005720  06 81 02 04  00 EE 07 CF  56 D5 01 89  87 7F 15 D9    ........V.......
005730  54 01 57 7A  01 6A 01 D5  01 C8 00 45  55 56 07 69    T.Wz.j.....EUV.i
005740  55 2D 54 7A  01 6A 01 8B  56 D5 01 50  00 69 55 8B    U-Tz.j..V..P.iU.
005750  56 4E 07 69  55 7A 01 6A  01 A1 56 D5  01 50 00 69    VN.iUz.j..V..P.i
005760  55 A1 56 D5  01 0A 00 69  55 7A 01 6A  01 D5 01 14    U.V....iUz.j....
005770  00 45 55 75  56 D5 01 14  00 45 55 75  56 D5 01 14    .EUuV....EUuV...
005780  00 45 55 75  56 D5 01 14  00 45 55 75  56 7A 01 6A    .EUuV....EUuV.j
005790  01 69 55 7A  01 6A 01 D5  01 14 00 69  55 D5 01 28    .iUz.j.....iU..(
0057A0  00 45 55 75  56 D5 01 0A  00 45 55 D9  54 7A 01 6A    .EUuV....EU.Tz.j
0057B0  01 D5 01 55  80 77 06 81  02 08 00 D5  01 FA 00 69    ...U.w.........i
0057C0  55 95 57 7A  01 6A 01 D5  01 64 00 45  55 75 56 D5    U.Wz.j...d.EUuV.
0057D0  01 32 00 45  55 D5 01 0A  00 69 55 7A  01 6A 01 D5    .2.EU....iUz.j..
0057E0  01 0A 00 45  55 75 56 D5  01 0A 00 45  55 75 56 D5    .EUuV....EUuV.
0057F0  01 0A 00 45  55 75 56 7A  01 6A 01 BB  53 D5 01 C5    ...EUuVz.j..S...
005800  86 80 06 D7  53 D5 01 8F  81 C5 18 7A  01 6A 01 D5    ....S......z.j..
005810  01 D9 86 77  06 45 55 D5  01 DA 86 77  06 69 55 7A    ...w.EU....w.iUz
005820  01 6A 01 D5  01 D8 86 77  06 45 55 D5  01 DA 86 77    .j.....w.EU....w
005830  06 69 55 7A  01 6A 01 CB  54 81 02 0C  00 D7 53 D5    .iUz.j..T.....S.
005840  01 8F 81 C5  18 EE 07 D5  01 64 00 5D  56 CB 54 81    .........d.]V.T.
005850  02 0C 00 D7  53 D5 01 8F  81 C5 18 EE  07 D5 01 39    ....S..........9
005860  87 B5 14 08  06 D5 01 14  00 E8 04 81  02 0C 00 F3    ................
005870  05 9B 4E 1F  50 F9 57 EE  07 81 02 36  00 D5 01 83    ..N.P.W....6....
005880  82 77 06 64  0C C1 04 81  02 0A 00 4E  07 91 47 73    .w.d.......N..Gs
005890  02 1C 00 AF  53 D5 01 CC  86 6D 06 D5  01 09 00 D5    ....S....m......
0058A0  01 67 83 80  06 46 07 D5  01 6A 83 80  06 73 02 04    .g...F...j...s..
0058B0  00 DB 6C F9  57 7A 01 6A  01 25 55 81  02 08 00 FF    ..l.Wz.j.%U.....
```

| | | | | | |
|---|---|---|---|---|---|
| 0058C0 | 54 73 02 04 | 00 11 55 D5 | 01 4B 00 D5 | 01 8D 81 80 | Ts....U..K...... |
| 0058D0 | 06 7A 01 6A | 01 25 55 81 | 02 0C 00 FF | 54 D5 01 19 | .z.j.%U.....T... |
| 0058E0 | 00 73 02 28 | 00 D5 01 DE | 86 08 06 77 | 06 5E 07 F0 | .s.(.......w.^.. |
| 0058F0 | 09 08 06 42 | 04 1B 06 80 | 06 81 02 0C | 00 11 55 D5 | ...B..........U. |
| 005900 | 01 19 00 73 | 02 06 00 D5 | 01 7D 00 D5 | 01 8D 81 80 | ...s.....}...... |
| 005910 | 06 7A 01 6A | 01 D5 01 BB | 83 08 06 77 | 06 D5 01 05 | .z.j.......w.... |
| 005920 | 00 F0 09 08 | 06 42 04 1B | 06 80 06 81 | 02 10 00 46 | .....B.........F |
| 005930 | 07 EF 59 FF | 54 D5 01 C8 | 00 73 02 08 | 00 11 55 D5 | ..Y.T....s....U. |
| 005940 | 01 0F 00 D5 | 01 8D 81 80 | 06 7A 01 6A | 01 46 07 C3 | .........z.j.F.. |
| 005950 | 4E D5 4E 77 | 06 D5 01 40 | 00 2D 04 81 | 02 06 00 4E | N.Nw...@.-.....N |
| 005960 | 07 EE 07 D5 | 01 B9 83 77 | 06 F9 3C 9A | 04 81 02 06 | .......w..<..... |
| 005970 | 00 56 07 EE | 07 D5 01 99 | 87 77 06 30 | 05 81 02 06 | .V.......w.0.... |
| 005980 | 00 5E 07 EE | 07 46 07 53 | 50 81 02 08 | 00 46 07 73 | .^...F.SP....F.s |
| 005990 | 02 06 00 D5 | 01 04 00 7A | 01 6A 01 D5 | 01 89 81 77 | .......z.j.....w |
| 0059A0 | 06 81 02 08 | 00 11 55 D5 | 02 04 00 FF | 54 7A 01 6A | ......Us....Tz.j |
| 0059B0 | 01 D5 01 89 | 81 77 06 8D | 05 61 36 7B | 39 81 02 1A | .....w...a6{9... |
| 0059C0 | 00 D5 01 6D | 83 77 06 82 | 09 81 02 08 | 00 FF 54 73 | ...m.w........Ts |
| 0059D0 | 02 04 00 11 | 55 73 02 04 | 00 F3 05 9D | 05 D5 01 89 | ....Us.......... |
| 0059E0 | 81 80 06 D5 | 01 C8 00 D5 | 01 8D 81 80 | 06 7A 01 6A | .............z.j |
| 0059F0 | 01 D5 01 A3 | 81 77 06 30 | 05 81 02 06 | 00 F3 05 EE | .....w.0........ |
| 005A00 | 07 81 02 08 | 00 FF 54 73 | 02 04 00 11 | 55 D5 01 05 | ......Ts....U... |
| 005A10 | 00 39 18 7A | 01 6A 01 D5 | 01 64 85 77 | 06 0F 06 81 | .9.z.j...d.w.... |
| 005A20 | 02 2E 00 56 | 07 F0 09 81 | 02 0C 00 FF | 54 D5 01 32 | ...V........T..2 |
| 005A30 | 00 73 02 08 | 00 11 55 D5 | 01 64 00 D5 | 01 64 85 08 | .s....U..d...d.. |
| 005A40 | 06 77 06 51 | 04 46 07 F8 | 06 B1 18 73 | 02 3C 00 FF | .w.Q.F.....s.<.. |
| 005A50 | 54 D5 01 BB | 83 08 06 77 | 06 0F 06 81 | 02 12 00 51 | T......w.......Q |
| 005A60 | 04 46 07 F8 | 06 B1 18 D5 | 01 C8 00 73 | 02 1C 00 56 | .F.........s...V |
| 005A70 | 07 B1 18 D5 | 01 6B 83 77 | 06 93 46 56 | 07 31 03 D5 | .....k.w..FV.1.. |
| 005A80 | 01 64 85 80 | 06 D5 01 64 | 00 D5 01 8D | 81 80 06 7A | .d.....d.......z |
| 005A90 | 01 6A 01 46 | 07 8E 02 16 | 00 4E 07 EF | 59 11 55 D5 | .j.F.....N..Y.U. |
| 005AA0 | 01 C8 00 D5 | 01 8D 81 80 | 06 73 02 4C | 00 4E 07 8E | .........s.L.N.. |
| 005AB0 | 02 08 00 D3 | 58 73 02 40 | 00 56 07 8E | 02 08 00 B7 | ....Xs.@.V...... |
| 005AC0 | 58 73 02 34 | 00 5E 07 8E | 02 12 00 FF | 54 D5 01 C8 | Xs.4.^......T... |
| 005AD0 | 00 D5 01 8D | 81 80 06 73 | 02 1E 00 D5 | 01 04 00 8E | .......s........ |
| 005AE0 | 02 08 00 13 | 59 73 02 10 | 00 FF 54 D5 | 01 C8 00 D5 | ....Ys....T..... |
| 005AF0 | 01 8D 81 80 | 06 F3 05 7A | 01 6A 01 D5 | 01 B9 87 77 | .......z.j.....w |
| 005B00 | 06 81 02 06 | 00 15 5A EE | 07 4B 59 91 | 5A 7A 01 6A | ......Z..KY.Zz.j |
| 005B10 | 01 D5 01 55 | 80 77 06 81 | 02 08 00 AF | 59 73 02 04 | ...U.w......Ys.. |
| 005B20 | 00 15 5A 7A | 01 6A 01 D5 | 01 7C 83 77 | 06 CA 09 81 | ..Zz.j...|.w.... |
| 005B30 | 02 0C 00 F9 | 5A 46 07 D5 | 01 BA 83 80 | 06 7A 01 6A | ....ZF.......z.j |
| 005B40 | 01 D5 01 55 | 80 77 06 81 | 02 08 00 99 | 59 73 02 0C | ...U.w......Ys.. |
| 005B50 | 00 D5 01 C8 | 00 D5 01 8D | 81 80 06 7A | 01 6A 01 D5 | ...........z.j.. |
| 005B60 | 01 8D 81 77 | 06 81 02 04 | 00 EE 07 6C | 0C 42 19 48 | ...w.......l.B.H |
| 005B70 | 0C 8D 04 54 | 0C 8E 02 08 | 00 0F 5B 73 | 02 1C 00 50 | ...T......[s...P |
| 005B80 | 0C 8E 02 08 | 00 25 5B 73 | 02 10 00 4C | 0C 8E 02 08 | .....%[s...L.... |
| 005B90 | 00 3F 5B 73 | 02 04 00 F3 | 05 7A 01 6A | 01 BD 54 81 | .?[s.....z.j..T. |
| 005BA0 | 02 0C 00 BF | 53 D5 01 C5 | 86 80 06 EE | 07 D5 01 68 | ....S..........h |
| 005BB0 | 85 77 06 81 | 02 0E 00 11 | 55 CB 53 D5 | 01 C5 86 80 | .w......U.S..... |
| 005BC0 | 06 EE 07 CB | 54 81 02 14 | 00 EB 53 D5 | 01 39 87 7F | ....T.....S..9.. |
| 005BD0 | 15 CF 53 D5 | 01 C5 86 80 | 06 EE 07 5D | 5B D7 53 D5 | ..S........][.S. |
| 005BE0 | 01 8F 81 C5 | 18 D5 01 86 | 8A 63 06 81 | 02 12 00 46 | .........c.....F |
| 005BF0 | 07 D5 01 86 | 8A 6D 06 46 | 07 D5 01 7D | 83 80 06 7A | .....m.F...}...z |
| 005C00 | 01 6A 01 81 | 02 08 00 45 | 57 73 02 04 | 00 57 57 D5 | .j.....EWs...WW. |
| 005C10 | 01 28 00 8F | 57 7A 01 6A | 01 D5 01 C6 | 86 B9 18 7A | .(..Wz.j.......z |
| 005C20 | 01 6A 01 65 | 54 B4 04 D5 | 01 6A 83 77 | 06 30 05 8D | .j.eT....j.w.0.. |
| 005C30 | 04 81 02 06 | 00 F9 57 EE | 07 99 54 D5 | 01 32 00 5D | ......W...T..2.] |
| 005C40 | 56 2D 54 65 | 54 81 02 0C | 00 C5 57 EF | 53 60 04 73 | V-TeT.....W.S`.s |
| 005C50 | 02 04 00 EF | 53 D5 01 29 | 87 7F 15 1B | 54 81 02 0C | ....S..)...T... |
| 005C60 | 00 C3 53 D5 | 01 C5 86 80 | 06 EE 07 D5 | 01 0A 00 5D | ..S............] |
| 005C70 | 56 D5 01 29 | 87 77 06 30 | 05 81 02 E0 | FF 77 54 F9 | V..).w.0.....wT. |
| 005C80 | 57 7A 01 6A | 01 D5 01 04 | 00 D5 01 29 | 87 7F 15 BD | Wz.j.......).... |
| 005C90 | 54 D5 01 29 | 87 77 06 CA | 09 8D 04 81 | 02 08 00 71 | T..).w.........q |
| 005CA0 | 17 73 02 EC | FF 7A 01 6A | 01 56 07 D5 | 01 29 87 7F | .s...z.j.V...).. |
| 005CB0 | 15 BD 54 81 | 02 06 00 46 | 07 EE 07 71 | 17 D5 01 29 | ..T....F...q...) |
| 005CC0 | 87 77 06 30 | 05 81 02 EA | FF 66 07 7A | 01 6A 01 BD | .w.0.....f.z.j.. |
| 005CD0 | 54 81 02 0A | 00 83 5C A7 | 5C 81 02 FA | FF E7 53 D5 | T.....\.\.....S. |
| 005CE0 | 01 39 87 7F | 15 BD 54 B4 | 04 81 02 1E | 00 D5 01 39 | .9....T........9 |
| 005CF0 | 87 B5 14 D5 | 01 66 83 77 | 06 BA 09 81 | 02 06 00 66 | .....f.w.......f |
| 005D00 | 07 EE 07 71 | 17 73 02 DE | FF D5 01 39 | 87 B5 14 56 | ...q.s.....9...V |
| 005D10 | 07 38 04 4E | 07 F8 06 D5 | 01 66 83 80 | 06 46 07 7A | .8.N.....f...F.z |
| 005D20 | 01 6A 01 46 | 07 D5 01 DB | 86 80 06 46 | 07 D5 01 C6 | .j.F.......F.... |
| 005D30 | 86 80 06 56 | 07 D5 01 64 | 83 80 06 17 | 5C 65 54 81 | ...V...d....\eT. |
| 005D40 | 02 08 00 66 | 07 73 02 04 | 00 CD 5C 81 | 02 EE FF 21 | ...f.s....\....! |
| 005D50 | 5C 7A 01 6A | 01 D5 01 29 | 87 7F 15 5E | 07 D5 01 CE | \z.j...)...^.... |
| 005D60 | 86 80 06 1B | 54 B4 04 81 | 02 1C 00 0D | 57 56 07 5D | ....T.......WV.] |

| | | | | | |
|---|---|---|---|---|---|
| 005D70 | 56 D5 01 29 | 87 77 06 30 | 05 81 02 06 | 00 46 07 EE | V..).w.0.....F. |
| 005D80 | 07 73 02 E0 | FF F3 53 66 | 07 7A 01 6A | 01 DB 53 53 | .s....Sf.z.j..SS |
| 005D90 | 5D 7A 01 6A | 01 08 06 A3 | 53 C1 04 81 | 02 06 00 F3 | ]z.j....S....... |
| 005DA0 | 05 46 07 7A | 01 6A 01 08 | 06 4E 07 D1 | 04 81 02 08 | .F.z.j...N...... |
| 005DB0 | 00 46 06 46 | 07 EE 07 D5 | 01 05 00 1F | 07 46 07 D5 | .F.F.........F.. |
| 005DC0 | 01 D0 86 80 | 06 66 07 D3 | 18 46 07 F9 | 05 46 07 F2 | .....f...F...F.. |
| 005DD0 | 01 19 5E D5 | 01 0A 00 31 | 03 00 06 53 | 5D B4 04 81 | ..^....1...S]... |
| 005DE0 | 02 0C 00 1B | 06 F3 05 46 | 07 D3 18 33 | 02 08 06 D5 | .......F...3.... |
| 005DF0 | 01 D0 86 80 | 06 08 06 A7 | 53 C1 04 00 | 06 AB 53 C1 | ........S.....S. |
| 005E00 | 04 9A 04 81 | 02 0C 00 F3 | 05 D5 01 0A | 00 1A 04 33 | ...............3 |
| 005E10 | 02 93 5D 30 | 04 43 02 BC | FF CB 18 F9 | 05 81 02 0A | ..]0.C.......... |
| 005E20 | 00 66 07 00 | 06 73 02 08 | 00 F3 05 46 | 07 46 07 D5 | .f...s.....F.F.. |
| 005E30 | 01 AF 89 6D | 06 7A 01 6A | 01 A5 5D 08 | 06 D5 01 D0 | ...m.z.j..]..... |
| 005E40 | 86 77 06 A7 | 53 C1 04 8D | 04 81 02 06 | 00 46 06 46 | .w..S........F.F |
| 005E50 | 07 7A 01 6A | 01 2F 06 8D | 05 8D 05 A5 | 5D B4 04 81 | .z.j./......]... |
| 005E60 | 02 0C 00 56 | 07 1F 18 46 | 06 46 07 EE | 07 9D 05 9D | ...V...F.F...... |
| 005E70 | 05 D5 01 D0 | 86 77 06 A7 | 53 C1 04 81 | 02 0A 00 46 | .....w..S......F |
| 005E80 | 06 00 06 F9 | 05 EE 07 A5 | 5D B4 04 81 | 02 08 00 F3 | ........]....... |
| 005E90 | 05 46 07 EE | 07 2F 06 E8 | 04 B4 04 81 | 02 0C 00 2F | .F.../........./ |
| 005EA0 | 06 66 07 D3 | 18 73 02 0A | 00 46 06 46 | 07 46 07 46 | .f...s...F.F.F.F |
| 005EB0 | 07 D5 01 B2 | 89 80 06 D5 | 01 B1 89 80 | 06 7A 01 6A | .............z.j |
| 005EC0 | 01 D5 01 14 | 00 D5 01 04 | 00 37 5E 81 | 02 0E 00 D5 | .........7^..... |
| 005ED0 | 01 64 00 09 | 04 F9 05 73 | 02 06 00 46 | 07 56 07 F9 | .d.....s...F.V.. |
| 005EE0 | 05 D5 01 3C | 00 31 03 30 | 04 1B 06 07 | 50 7A 01 6A | ...<.1.0....Pz.j |
| 005EF0 | 01 01 4D 46 | 07 1B 06 07 | 50 7A 01 6A | 01 46 07 00 | ..MF....Pz.j.F.. |
| 005F00 | 06 51 04 46 | 07 F8 06 0A | 19 D3 18 46 | 07 1D 02 29 | .Q.F.......F...) |
| 005F10 | 5F 2F 06 8D | 04 81 02 08 | 00 CD 58 73 | 02 04 00 21 | _/........Xs...! |
| 005F20 | 58 4E 07 CB | 07 43 02 EA | FF 46 06 7A | 01 6A 01 08 | XN...C...F.z.j.. |
| 005F30 | 06 53 50 56 | 07 FB 5E D5 | 01 32 00 69 | 55 C3 4E DB | .SPV..^..2.iU.N. |
| 005F40 | 4E 63 06 CA | 09 81 02 04 | 00 DD 57 7A | 01 6A 01 56 | Nc........Wz.j.V |
| 005F50 | 07 FB 5E D5 | 01 32 00 5D | 56 D5 01 0A | 00 09 04 56 | ..^..2.]V......V |
| 005F60 | 07 FB 5E D5 | 01 32 00 5D | 56 D5 01 04 | 00 FB 5E D5 | ..^..2.]V.....^. |
| 005F70 | 01 46 00 5D | 56 D5 01 0A | 00 09 04 5E | 07 FB 5E D5 | .F.]V......^..^. |
| 005F80 | 01 3C 00 5D | 56 D5 01 04 | 00 FB 5E D5 | 01 6A 01 D5 | .<.]V.....^..j.. |
| 005F90 | 01 79 83 77 | 06 F9 05 2F | 06 46 07 D7 | 1E 08 06 35 | .y.w.../.F.....5 |
| 005FA0 | 1B C1 04 81 | 02 0A 00 F3 | 05 35 57 73 | 02 04 00 4D | .........5Ws...M |
| 005FB0 | 5F 8B 5D 81 | 02 1E 00 08 | 06 D5 01 08 | 00 E8 04 81 | _.]............. |
| 005FC0 | 02 06 00 DB | 18 EE 07 8D | 05 2F 06 9D | 05 51 04 73 | ........./...Q.s |
| 005FD0 | 02 06 00 46 | 06 EE 07 73 | 02 C2 FF 7A | 01 6A 01 43 | ...F...s...z.j.C |
| 005FE0 | 11 31 03 D5 | 01 94 91 30 | 04 63 06 B7 | 1E 4D 5F 7A | .1.....0.c...M_z |
| 005FF0 | 01 6A 01 D5 | 01 74 83 77 | 06 D5 01 0F | 00 D1 04 7A | .j...t.w.......z |
| 006000 | 01 6A 01 2F | 06 D5 01 76 | 82 80 06 D5 | 01 75 82 80 | .j./...v.....u.. |
| 006010 | 06 A7 53 8E | 02 0C 00 05 | 4D BF 5E AF | 57 73 02 74 | ..S.....M.^.Ws.t |
| 006020 | 00 AB 53 8E | 02 0C 00 01 | 4D BF 5E AF | 57 73 02 64 | ..S.....M.^.Ws.d |
| 006030 | 00 A3 53 8E | 02 0A 00 EF | 5E AF 57 73 | 02 56 00 D5 | ..S.....^.Ws.V.. |
| 006040 | 01 08 00 8E | 02 08 00 2D | 5F 73 02 48 | 00 D5 01 07 | .......-_s.H.... |
| 006050 | 00 8E 02 0C | 00 09 4D BF | 5E AF 57 73 | 02 36 00 D5 | ......M.^.Ws.6.. |
| 006060 | 01 09 00 8E | 02 0C 00 0D | 4D BF 5E AF | 57 73 02 24 | ........M.^.Ws.$ |
| 006070 | 00 4E 07 8E | 02 0A 00 8D | 5F AF 57 73 | 02 16 00 56 | .N......_.Ws...V |
| 006080 | 07 8E 02 0C | 00 DD 5F AF | 57 00 35 57 F3 | | ......_.W.5W. |
| 006090 | 05 F3 05 7A | 01 6A 01 8B | 5D 81 02 3A | 00 08 06 A7 | ...z.j..].:.... |
| 0060A0 | 53 8E 02 0A | 00 F3 05 66 | 07 73 02 26 | 00 AB 53 8E | S......f.s.&..S. |
| 0060B0 | 02 0A 00 F3 | 05 66 07 73 | 02 18 00 A3 | 53 8E 02 0C | .....f.s....S... |
| 0060C0 | 00 F3 05 46 | 07 46 07 73 | 02 08 00 46 | 07 F9 05 F3 | ...F.F.s...F.... |
| 0060D0 | 05 73 02 04 | 00 66 07 7A | 01 6A 01 D5 | 01 0A 00 31 | .s...f.z.j.....1 |
| 0060E0 | 03 95 60 81 | 02 06 00 F3 | 05 EE 07 30 | 04 08 06 D5 | ..`........0.... |
| 0060F0 | 01 FF 00 E8 | 04 81 02 08 | 00 F3 05 35 | 57 EE 07 8B | ...........5W... |
| 006100 | 5D 81 02 08 | 00 01 60 73 | 02 04 00 F3 | 05 7A 01 6A | ].....`s.....z.j |
| 006110 | 01 77 54 F9 | 57 7A 01 6A | 01 08 06 A3 | 53 C1 04 81 | .wT.Wz.j....S... |
| 006120 | 02 06 00 F3 | 05 46 07 08 | 06 56 07 BA | 09 81 02 08 | .....F...V...... |
| 006130 | 00 D9 60 73 | 02 06 00 F3 | 05 35 57 46 | 07 7A 01 6A | ..`s.....5WF.z.j |
| 006140 | 01 08 06 D5 | 01 D0 07 D1 | 04 D5 01 55 | 80 77 06 CA | ...........U.w.. |
| 006150 | 09 8D 04 81 | 02 10 00 D5 | 01 E8 03 38 | 04 7B 39 F3 | ...........8.{9. |
| 006160 | 05 73 02 08 | 00 B7 53 30 | 04 77 06 7A | 01 6A 01 08 | .s....S0.w.z.j.. |
| 006170 | 06 D5 01 D0 | 07 D1 04 D5 | 01 55 80 77 | 06 CA 09 8D | .........U.w.... |
| 006180 | 04 81 02 10 | 00 D5 01 E8 | 03 38 04 C5 | 3A 65 18 73 | .........8..:e.s |
| 006190 | 02 08 00 B7 | 53 30 04 80 | 06 7A 01 6A | 01 08 | ....S0...z.j... |
| 0061A0 | 00 FB 5E 7A | 01 6A 01 D5 | 01 50 00 53 | 5D B4 04 81 | ..^z.j...P.S]... |
| 0061B0 | 02 04 00 EE | 07 08 06 A3 | 53 8E 02 0A | 00 F3 05 EE | ........S....... |
| 0061C0 | 07 73 02 72 | 00 A7 53 8E | 02 18 00 F3 | 05 D5 01 DC | .s.r..S......... |
| 0061D0 | 86 63 06 3F | 61 D5 01 64 | 00 69 55 9B | 61 73 02 56 | .c.?a..d.iU.as.V |
| 0061E0 | 00 AB 53 8E | 02 22 00 F3 | 05 D5 01 DC | 86 63 06 42 | ..S."........c.B |
| 0061F0 | 04 08 06 D5 | 01 DC 86 6D | 06 3F 61 D5 | 01 64 00 69 | .......m.?a..d.i |
| 006200 | 55 9B 61 73 | 02 30 00 D5 | 01 E8 03 31 | 03 D5 01 1E | U.as.0.....1.... |
| 006210 | 00 5E 07 37 | 5E 81 02 1A | 00 30 04 08 | 06 D5 01 DC | .^.7^....0...... |

```
006220  86 6D 06 3F  61 D5 01 64  00 69 55 9B  61 73 02 04   .m.?a..d.iU.as..
006230  00 F3 05 F3  05 73 02 70  FF 7A 01 6A  01 A5 61 8B   .....s.p.z.j..a.
006240  5D B4 04 81  02 04 00 EE  07 A3 53 8E  02 08 00 EE   ].........S.....
006250  07 73 02 26  00 A7 53 8E  02 1C 00 95  57 D5 01 1E   .s.&..S.....W...
006260  00 5E 07 37  5E 81 02 0A  00 D5 01 DC  86 63 06 6D   .^.7^........c.m
006270  61 73 02 06  00 35 05 73  02 C2 FF 7A  01 6A 01 66   as...5W.s...z.j.
006280  01 66 07 F9  05 56 07 8E  02 0A 00 B5  37 EE 07 73   .f...V......7..s
006290  02 44 00 D5  01 06 00 8E  02 18 00 D5  01 68 82 AE   .D...........h..
0062A0  06 D5 01 00  00 D5 01 00  00 61 05 B4  04 73 02 26   .........a...s.&
0062B0  00 D5 01 08  00 8E 02 0A  00 5B 6E 46  07 73 02 16   .........[nF.s..
0062C0  00 D5 01 09  00 8E 02 08  00 0B 6C 73  28 08 00 46   ..........ls(..F
0062D0  07 1B 06 F3  05 F9 05 81  02 08 00 01  5C 73 02 06   ............\s..
0062E0  00 F3 05 35  57 7A 01 6A  01 D5 01 8F  81 C5 18 D5   ...5Wz.j........
0062F0  01 8F 81 77  06 30 05 81  02 F6 FF 7A  01 6A 01 D5   ...w.0.....z.j..
006300  01 6B 85 63  06 D5 01 69  85 63 06 08  06 E7 62 00   .k.c...i.c....b.
006310  06 46 07 F2  01 27 63 EB  54 08 06 E7  62 D9 54 08   .F...'c.T...b.T.
006320  06 E7 62 43  02 F2 FF F9  05 D5 01 04  01 8B 5D 81   ..bC..........].
006330  07 F2 01 3F  63 08 06 60  04 E7 62 43  02 F8 FF F3   ...?c..`..bC....
006340  05 7A 01 6A  01 D5 01 6B  85 63 06 D5  01 69 85 63   .z.j...k.c...i.c
006350  06 08 06 E7  62 00 06 5E  07 31 03 46  07 F2 01 71   ....b..^.1.F...q
006360  63 EB 54 08  06 E7 62 D9  54 08 06 E7  62 43 02 F2   c.T...b.T...bC..
006370  FF F9 05 5E  07 31 03 46  07 F2 01 87  63 08 06 60   ...^.1.F....c..`
006380  04 E7 62 43  02 F8 FF F3  05 7A 01 6A  01 81 02 08   ..bC.....z.j....
006390  00 FD 62 73  02 04 00 43  63 5D 56 1B  54 7A 01 6A   ..bs...Cc]V.Tz.j
0063A0  01 D5 01 64  00 5D 56 2D  54 D5 01 0F  00 46 07 F2   ...d.]V-T....F..
0063B0  01 F3 63 11  55 D5 01 0A  00 66 07 8B  63 81 02 04   ..c.U....f..c...
0063C0  00 33 02 D5  01 0A 00 46  07 8B 63 81  02 04 00 33   .3.....F..c....3
0063D0  02 D5 01 0A  00 46 07 8B  63 81 02 04  00 33 02 FF   .....F..c....3..
0063E0  54 D5 01 1E  00 66 07 8B  63 81 02 04  00 33 02 43   T....f..c....3.C
0063F0  02 C2 FF 7A  01 6A 01 08  06 AB 53 C1  04 81 02 08   ...z.j....S.....
006400  00 F3 05 73  02 58 00 D5  01 C7 86 77  06 30 05 81   ...s.X.....w.0..
006410  02 04 00 EE  07 A7 53 8E  02 0E 00 8B  5D 81 02 04   ......S.....]...
006420  00 7F 62 73  02 38 00 A3  53 8E 02 08  00 3B 62 73   ..bs.8..S....;bs
006430  02 2C 00 4E  07 8E 02 08  00 E9 6C 73  02 20 00 56   .,.N......ls. .V
006440  07 8E 02 08  00 DB 6C 73  02 14 00 D5  01 08 00 8E   ......ls........
006450  02 0A 00 1D  6D 11 37 73  02 04 00 F3  05 7A 01 6A   ....m.7s.....z.j
006460  01 AB 53 8E  02 0E 00 8B  5D 81 02 04  00 F3 05 73   ..S.....]......s
006470  02 2A 00 A7  53 8E 02 08  00 1F 50 73  02 1E 00 A3   .*..S.....Ps....
006480  53 8E 02 0E  00 46 07 D5  01 66 83 80  06 73 02 0C   S....F...f...s..
006490  00 D5 01 67  83 80 06 46  07 F3 05 01  57 7A 01 6A   ...g...F....Wz.j
0064A0  01 8B 5D 81  02 34 00 A7  53 8E 02 08  00 0F 61 73   ..]..4..S.....as
0064B0  02 28 00 AB  53 8E 02 0E  00 8B 5D 81  02 04 00 F5   .(..S.....].....
0064C0  63 73 02 16  00 A3 53 8E  02 0E 00 8B  5D 81 02 04   cs....S.....]...
0064D0  00 5F 64 73  02 04 00 F3  05 7A 01 6A  01 8B 5D 81   ._ds.....z.j..].
0064E0  02 28 00 D5  01 06 00 8E  02 1E 00 C0  79 12 0C F9   .(..........y...
0064F0  05 9B 61 D5  01 64 00 69  55 56 07 FB  5E D5 01 32   ..a..d.iUV..^..2
006500  00 69 55 73  02 04 00 F3  05 7A 01 6A  01 46 07 D5   .iUs.....z.j.F..
006510  01 69 87 80  06 4E 07 D5  01 C7 86 80  06 8B 5D 81   .i...N........].
006520  02 30 00 A7  53 8E 02 08  00 9F 64 73  02 20 00 AB   .0..S.....ds. ..
006530  53 8E 02 08  00 DB 64 73  02 14 00 D5  01 09 00 8E   S.....ds........
006540  02 08 00 35  57 73 02 06  00 17 61 F3  05 73 02 08   ...5Ws....a..s..
006550  00 77 54 F9  57 EE 07 D5  01 0A 00 5D  56 AF 54 81   .wT.W......]V.T.
006560  02 BC FF 7A  01 6A 01 D5  01 CA 86 63  06 B3 53 C1   ...z.j.....c..S.
006570  04 81 02 08  00 D3 53 73  02 04 00 C7  53 7A 01 6A   ......Ss....Sz.j
006580  01 11 55 5E  07 D5 01 0A  00 5D 56 D5  01 14 00 D5   ..U^.....]V.....
006590  01 04 00 37  5E 81 02 3A  00 08 06 D5  01 CA 86 6D   ...7^..:.......m
0065A0  06 08 06 D5  01 CC 86 63  06 C1 04 F9  05 B3 53 C1   .......c......S.
0065B0  04 9A 04 81  02 18 00 F3  05 65 65 D5  01 C5 86 80   .........ee.....
0065C0  06 6B 57 46  07 D5 01 DB  86 80 06 EE  07 73 02 06   .kWF.........s..
0065D0  00 F3 05 4E  07 35 57 4E  07 38 04 46  07 F8 06 08   ...N.5WN.8.F....
0065E0  06 30 05 81  02 A0 FF F3  05 77 54 F9  57 7A 01 6A   .0.......wT.Wz.j
0065F0  01 D5 01 0A  00 F0 09 D5  01 B9 89 80  06 46 07 D5   .............F..
006600  01 B9 89 42  04 7C 0C 51  04 00 06 30  04 D5 01 CF   ...B.|.Q...0....
006610  86 77 06 81  02 0A 00 51  04 08 06 73  02 04 00 46   .w.....Q...s...F
006620  07 8D 05 F9  05 F2 01 49  06 D5 01 06  00 53 5D 30   .......I.....S]0
006630  05 81 02 08  00 F3 05 66  07 33 02 D5  01 0A 00 F0   .......f.3......
006640  09 89 05 80  06 43 02 E2  FF 9D 05 D5  01 CF 86 77   .....C.........w
006650  06 81 02 12  00 D5 01 B9  89 7C 0C 51  04 83 26 B1   .........|.Q..&.
006660  18 73 02 04  00 F3 05 95  57 7A 01 6A  01 D5 01 CF   .s......Wz.j....
006670  86 80 06 D5  01 06 00 53  5D 81 02 46  00 EF 65 81   .......S]..F..e.
006680  02 08 00 35  57 66 07 EE  07 D5 01 7A  82 77 06 CA   ...5Wf.....z.w..
006690  09 81 02 04  00 D9 35 46  07 D5 01 82  82 80 06 D5   ......5F........
0066A0  01 B9 89 ED  26 D5 01 82  82 77 06 30  05 81 02 0A   ....&....w.0....
0066B0  00 D9 35 46  07 73 02 06  00 35 57 66  07 73 02 06   ..5F.s...5Wf.s..
0066C0  00 66 07 35  57 7A 01 6A  01 46 07 D5  01 C7 86 80   .f.5Wz.j.F......
```

| | | | | | |
|---|---|---|---|---|---|
| 0066D0 | 06 DB 53 D5 | 01 29 87 7F | 15 6D 6A 7A | 01 6A 01 D5 | ..S..)...mjz.j.. |
| 0066E0 | 01 C7 66 46 | 07 5E 07 C1 | 17 7A 01 6A | 01 D5 01 64 | ..fF.^...z.j...d |
| 0066F0 | 00 5D 56 1B | 54 81 02 04 | 00 EE 07 D5 | 01 3C 00 46 | .]V.T........<.F |
| 006700 | 07 F2 01 1B | 67 66 07 65 | 18 56 07 53 | 5D 81 02 08 | ....gf.e.V.S]... |
| 006710 | 00 F3 05 9F | 63 33 02 43 | 02 EC FF 7A | 01 6A 01 77 | ....c3.C...z.j.w |
| 006720 | 54 D5 01 C8 | 00 5D 56 99 | 54 D5 01 64 | 00 5D 56 7A | T....]V.T..d.]Vz |
| 006730 | 01 6A 01 D5 | 01 64 00 5D | 56 66 07 D5 | 01 0F 00 46 | .j...d.]Vf.....F |
| 006740 | 07 F2 01 69 | 67 11 55 2D | 54 D5 01 32 | 00 5D 56 1B | ...ig.U-T..2.]V. |
| 006750 | 54 30 05 81 | 02 08 00 F3 | 05 46 07 33 | 02 FF 54 D5 | T0.......F.3..T. |
| 006760 | 01 32 00 5D | 56 43 02 DE | FF 7A 01 6A | 01 D5 01 AE | .2.]VC...z.j.... |
| 006770 | 89 08 06 77 | 06 4E 07 9A | 04 B1 18 7A | 01 6A 01 6B | ...w.N.....z.j.k |
| 006780 | 67 46 07 6B | 66 F3 05 7A | 01 6A 01 D5 | 01 AE 89 08 | gF.kf..z.j...... |
| 006790 | 06 77 06 46 | 07 1B 06 80 | 06 4E 07 C1 | 04 7A 01 6A | .w.F.....N...z.j |
| 0067A0 | 01 D5 01 05 | 00 F9 05 37 | 5E 81 02 08 | 00 C1 04 73 | .......7^......s |
| 0067B0 | 02 06 00 F3 | 05 46 07 7A | 01 6A 01 D5 | 01 55 80 77 | .....F.z.j...U.w |
| 0067C0 | 06 81 02 32 | 00 59 36 7B | 39 81 02 22 | 00 D5 01 3F | ...2.Y6{9..."...? |
| 0067D0 | 00 8D 04 D5 | 01 05 00 5E | 07 37 5E 81 | 02 08 00 C1 | .......^.7^..... |
| 0067E0 | 04 73 02 06 | 00 F3 05 46 | 07 73 02 06 | 00 F3 05 46 | .s.....F.s.....F |
| 0067F0 | 07 73 02 04 | 00 66 07 7A | 01 6A 01 D5 | 01 92 16 D5 | .s...f.z.j...... |
| 006800 | 01 04 00 9F | 67 81 02 12 | 00 6D 6E 46 | 07 D5 01 7D | ....g....mnF...} |
| 006810 | 83 80 06 66 | 07 73 02 04 | 00 46 07 7A | 01 6A 01 D5 | ...f.s...F.z.j.. |
| 006820 | 01 05 00 D5 | 01 04 00 37 | 5E B4 04 81 | 02 04 00 EE | .......7^....... |
| 006830 | 07 D5 01 05 | 00 5E 07 37 | 5E B4 04 81 | 02 06 00 F3 | .....^.7^....... |
| 006840 | 05 EE 07 F9 | 05 6D 61 7A | 01 6A 01 D5 | 01 FF 00 9B | .....maz.j...... |
| 006850 | 61 46 07 9B | 61 D5 01 AA | 00 9B 61 D5 | 01 55 00 9B | aF..a.....a..U.. |
| 006860 | 61 7A 01 6A | 01 D5 01 05 | 00 5E 07 37 | 5E B4 04 81 | az.j.....^.7^... |
| 006870 | 02 04 00 EE | 07 D5 01 05 | 00 5E 07 37 | 5E B4 04 81 | .........^.7^... |
| 006880 | 02 06 00 F3 | 05 EE 07 D5 | 01 05 00 5E | 07 37 5E B4 | ...........^.7^. |
| 006890 | 04 81 02 06 | 00 46 06 EE | 07 3D 54 49 | 68 7A 01 6A | .....F...=TIhz.j |
| 0068A0 | 01 D5 01 05 | 00 53 5D 81 | 02 88 00 4E | 07 8E 02 08 | .....S]....N.... |
| 0068B0 | 00 89 67 73 | 02 76 00 56 | 07 8E 02 0C | 00 C0 79 5E | ..gs.v.V......y^ |
| 0068C0 | 07 9F 67 73 | 02 66 00 5E | 07 8E 02 0C | 00 8D 73 56 | ..gs.f.^......sV |
| 0068D0 | 07 9F 67 73 | 02 56 00 D5 | 01 04 00 8E | 02 0C 00 A0 | ..gs.V.......... |
| 0068E0 | 73 56 07 9F | 67 73 02 44 | 00 D5 01 05 | 00 8E 02 08 | sV..gs.D........ |
| 0068F0 | 00 B9 67 73 | 02 36 00 D5 | 01 06 00 8E | 02 0A 00 1D | ..gs.6.......... |
| 006900 | 68 46 07 73 | 02 26 00 D5 | 01 07 00 8E | 02 08 00 F9 | hF.s.&.......... |
| 006910 | 67 73 02 18 | 00 D5 01 08 | 00 8E 02 0A | 00 63 68 46 | gs...........chF |
| 006920 | 07 73 02 08 | 00 46 07 F9 | 05 F3 05 81 | 02 04 00 9F | .s...F.......... |
| 006930 | 63 7A 01 6A | 01 3F 61 08 | 06 8D 05 D1 | 04 9D 05 1B | cz.j.?a......... |
| 006940 | 06 D1 04 9A | 04 08 06 81 | 02 0C 00 D5 | 01 FF 00 D5 | ................ |
| 006950 | 01 AE 89 80 | 06 7A 01 6A | 01 6B 67 D5 | 01 05 00 D5 | .....z.j.kg..... |
| 006960 | 01 04 00 37 | 5E B4 04 81 | 02 04 00 EE | 07 D5 01 05 | ...7^........... |
| 006970 | 00 D5 01 04 | 00 37 5E B4 | 04 81 02 06 | 00 F3 05 EE | .....7^......... |
| 006980 | 07 D5 01 05 | 00 5E 07 53 | 5E B4 04 81 | 02 06 00 46 | .....^.S^......F |
| 006990 | 06 EE 07 38 | 06 00 06 30 | 04 F9 05 F2 | 01 AF 69 2F | ...8...0......i/ |
| 0069A0 | 06 B9 05 33 | 69 81 02 04 | 00 33 02 43 | 02 F2 FF 46 | ...3i....3.C...F |
| 0069B0 | 06 7A 01 6A | 01 4E 07 8E | 02 0E 00 53 | 54 2D 54 9F | .z.j.N.....ST-T. |
| 0069C0 | 63 46 07 73 | 02 A6 00 56 | 07 8E 02 1A | 00 D5 01 64 | cF.s...V.......d |
| 0069D0 | 00 5D 56 1B | 54 81 02 08 | 00 46 07 73 | 02 04 00 66 | .]V.T....F.s...f |
| 0069E0 | 07 73 02 88 | 00 5E 07 8E | 02 1C 00 46 | 07 D5 01 AE | .s...^.....F.... |
| 0069F0 | 89 80 06 46 | 07 6B 66 B4 | 04 81 02 04 | 00 9F 63 46 | ...F.kf.......cF |
| 006A00 | 07 73 02 68 | 00 D5 01 04 | 00 8E 02 0A | 00 EB 66 46 | .s.h..........fF |
| 006A10 | 07 73 02 58 | 00 D5 01 05 | 00 8E 02 0A | 00 7D 67 46 | .s.X.........}gF |
| 006A20 | 07 73 02 48 | 00 D5 01 06 | 00 8E 02 0A | 00 9F 68 46 | .s.H..........hF |
| 006A30 | 07 73 02 38 | 00 D5 01 07 | 00 8E 02 0A | 00 57 69 46 | .s.8.........WiF |
| 006A40 | 07 73 02 28 | 00 D5 01 08 | 00 8E 02 1A | 00 D5 01 05 | .s.(............ |
| 006A50 | 00 D5 01 04 | 00 37 5E 81 | 02 06 00 3F | 61 9B 61 46 | .....7^....?a.aF |
| 006A60 | 07 73 02 08 | 00 46 07 F9 | 05 F3 05 7A | 01 6A 01 46 | .s...F.....z.j.F |
| 006A70 | 07 D5 01 68 | 85 80 06 4E | 07 D5 01 71 | 83 80 06 4E | ...h...N...q...N |
| 006A80 | 07 D5 01 DB | 86 80 06 2D | 54 99 54 9F | 63 66 07 65 | .......-T.T.cf.e |
| 006A90 | 18 31 67 81 | 02 0A 00 1D | 67 66 07 73 | 02 20 00 FF | .1g.....gf.s. .. |
| 006AA0 | 54 D5 01 19 | 00 5D 56 01 | 57 D5 01 3C | 00 53 5D 81 | T....]V.W..<.S] |
| 006AB0 | 02 08 00 B3 | 69 73 02 06 | 00 1D 67 66 | 07 11 55 81 | ....is....gf..U |
| 006AC0 | 02 D0 FF 46 | 07 D5 01 71 | 83 80 06 46 | 07 D5 01 DB | ...F...q...F... |
| 006AD0 | 86 80 06 77 | 54 F9 57 7A | 01 6A 01 BB | 53 8E 02 0A | ...wT.Wz.j..S.. |
| 006AE0 | 00 9B 5B D9 | 54 73 02 6C | 00 BF 53 8E | 02 08 00 21 | ..[.Ts.l..S....! |
| 006AF0 | 5D 73 02 60 | 00 C3 53 8E | 02 08 00 7F | 65 73 02 54 | ]s.`..S....es.T |
| 006B00 | 00 C7 53 8E | 02 14 00 11 | 55 0B 65 FF | 54 46 07 D5 | ..S.....U.e.TF. |
| 006B10 | 01 29 87 80 | 06 73 02 3C | 00 D3 53 8E | 02 14 00 11 | .)...s.<..S.... |
| 006B20 | 55 DD 66 FF | 54 46 07 D5 | 01 29 87 80 | 06 73 02 24 | U.f.TF...)...s.$ |
| 006B30 | 00 CB 53 8E | 02 08 00 6D | 6A 73 02 18 | 00 CF 53 8E | ..S....mjs....S |
| 006B40 | 02 08 00 35 | 58 73 02 0C | 00 BB 53 D5 | 01 C5 86 80 | ...5Xs....S.... |
| 006B50 | 06 F3 05 7A | 53 D5 01 8F | 81 C5 18 7A | 01 6A 01 D5 | ...zS......z.j.. |
| 006B60 | 01 8F 81 77 | 06 CA 09 81 | 02 04 00 EE | 07 D5 01 C5 | ...w............ |
| 006B70 | 86 77 06 D9 | 6A 7A 01 6A | 01 D5 01 5D | 6B 46 07 D5 | .w..jz.j...]kF. |

```
006B80  01 10 00 C1  17 7A 01 6A  01 D5 01 5D  80 BC 79 83   .....z.j...]..y.
006B90  07 7A 01 40  01 1E 00 40  01 46 00 6A  01 D5 01 55   .z.@...@.F.j...U
006BA0  80 77 06 81  02 0A 00 D5  01 30 00 73  02 06 00 D5   .w.......0.s....
006BB0  01 0C 00 D5  01 5E 82 80  06 7A 01 40  01 55 55 6A   .....^...z.@.UUj
006BC0  01 BB 6B 08  06 D5 01 50  80 6D 06 08  06 D5 01 65   ..k....P.m.....e
006BD0  82 6D 06 08  06 D5 01 6D  80 6D 06 08  06 D5 01 99   .m.....m.m......
006BE0  81 6D 06 08  06 D5 01 C8  8A 6D 06 08  06 D5 01 92   .m.......m......
006BF0  91 6D 06 08  06 D5 01 D9  91 6D 06 08  06 D5 01 C8   .m.......m......
006C00  86 6D 06 D5  01 DE 91 6D  06 7A 01 6A  01 BB 6B 8D   .m.....m.z.j..k.
006C10  05 AD 05 D5  01 50 80 63  06 C1 04 AD  05 D5 01 65   .....P.c.......e
006C20  82 63 06 C1  04 8D 04 AD  05 D5 01 6D  80 63 06 C1   .c.........m.c..
006C30  04 8D 04 AD  05 D5 01 99  81 63 06 C1  04 8D 04 AD   .........c......
006C40  05 D5 01 C8  8A 63 06 C1  04 8D 04 AD  05 D5 01 92   .....c..........
006C50  91 63 06 C1  04 8D 04 AD  05 D5 01 D9  91 63 06 C1   .c...........c..
006C60  04 8D 04 AD  05 D5 01 C8  86 63 06 C1  04 8D 04 9D   .........c......
006C70  05 D5 01 DE  91 63 06 C1  04 8D 04 7A  01 6A 01 46   .....c.....z.j.F
006C80  07 08 06 D5  01 50 80 6D  06 08 06 D5  01 65 82 8D   .....P.m.....e..
006C90  06 08 06 D5  01 6D 80 6D  06 08 06 D5  01 99 81 6D   .....m.m.......m
006CA0  06 08 06 D5  01 C8 8A 6D  06 08 06 D5  01 92 91 6D   .......m.......m
006CB0  06 08 06 D5  01 D9 91 6D  06 08 06 D5  01 C8 86 6D   .......m.......m
006CC0  06 D5 01 DE  91 6D 06 7A  01 CB 6C 3E  D7 D3 03 C7   .....m.z..l>....
006CD0  0A 03 6F 0A  03 67 5E 23  56 EB E9 6A  01 77 54 FF   ..o..g^#V..j.wT.
006CE0  54 35 57 7D  6C CB 6E 7D  01 6A 01 77  54 C9 6C 7A   T5W}l.n}.j.wT.lz
006CF0  01 6A 01 46  07 C3 4E 23  11 1F 11 31  03 83 07 7A   .j.F..N#...1...z
006D00  01 6A 01 F1  6C 7A 01 6A  01 6C 0C 42  19 48 0C 8D   .j..lz.j.l.B.H..
006D10  04 4C 0C C1  04 CB 54 8D  04 CA 09 7A  01 6A 01 56   .L....T....z.j.V
006D20  07 D5 01 73  8A 80 06 D5  01 0F 00 D5  01 85 8A 80   ...s............
006D30  06 D5 01 78  00 D5 01 84  8A 80 06 D5  01 04 00 D5   ...x............
006D40  01 A4 8A 80  06 D5 01 14  00 D5 01 A3  8A 80 06 D5   ................
006D50  01 08 00 D5  01 6F 8A 80  06 D5 01 08  00 D5 01 70   .....o.........p
006D60  8A 80 06 4E  07 D5 01 77  8A 80 06 D5  01 3C 00 D5   ...N...w.....<..
006D70  01 83 8A 80  06 77 37 7A  01 6A 01 6C  0C 42 19 48   .....w7z.j.l.B.H
006D80  0C 8D 04 54  0C C1 04 81  02 04 00 1D  6D 7A 01 6A   ...T........mz.j
006D90  01 46 07 D5  01 61 82 80  06 D5 01 61  82 77 06 81   .F...a.....a.w..
006DA0  02 F8 FF 46  07 D5 01 61  82 80 06 46  07 42 04 D5   ...F...a...F.B..
006DB0  01 00 7F 1F  07 D5 01 61  82 77 06 81  02 F0 FF 08   .......a.w......
006DC0  06 D5 01 57  80 6D 06 7A  01 6A 01 8F  6D 97 6B E8   ...W.m.z.j..m.k.
006DD0  04 81 02 08  00 4E 07 73  02 04 00 46  07 D5 01 A3   .....N.s...F....
006DE0  81 80 06 7A  01 6A 01 8F  6D 93 6B D1  04 81 02 08   ...z.j..m.k.....
006DF0  00 4E 07 73  02 06 00 C9  6D 46 07 D5  01 55 80 80   .N.s....mF...U..
006E00  06 7A 01 6A  01 D5 01 55  80 77 06 81  02 1A 00 38   .z.j...U.w.....8
006E10  0C 08 06 D5  01 5A 80 80  06 3C 0C 08  06 D5 01 59   .....Z...<.....Y
006E20  80 80 06 73  02 16 00 40  0C 08 06 D5  01 5A 80 80   ...s...@.....Z..
006E30  06 44 0C C8  06 D5 01 59  80 80 06 9A  04 7A 01 6A   .D.....Y.....z.j
006E40  01 D5 01 15  85 23 11 D5  01 07 00 6E  07 D5 01 26   .....#.....n...&
006E50  85 23 11 D5  01 0C 00 6E  07 7A 01 6A  01 D5 01 00   .#.....n.z.j....
006E60  00 D5 01 00  00 D5 01 68  82 9F 06 7A  01 6A 01 D5   .......h...z.j..
006E70  01 0A 91 3F  11 4B 11 31  03 7F 11 6E  07 D5 01 CA   ...?.K.1...n....
006E80  8A 53 11 4F  11 31 03 7F  11 6E 07 46  07 D5 01 F6   .S.O.1...n.F....
006E90  82 80 06 46  07 D5 01 F7  82 80 06 D5  01 94 91 3F   ...F...........?
006EA0  11 43 11 31  03 7F 11 6E  07 D5 01 C7  91 D5 01 B6   .C.1...n........
006EB0  91 3F 11 97  07 7A 01 6A  01 D5 01 92  83 37 11 56   .?...z.j.....7.V
006EC0  07 1A 04 D5  01 07 00 6E  07 7A 01 6A  01 07 6D 81   .......n.z.j..m.
006ED0  02 0E 00 46  07 D5 01 8A  82 4E 07 73  02 12 00 D5   ...F.....N.s....
006EE0  01 8A 82 08  06 77 06 4E  07 F8 06 F9  05 46 07 87   .....w.N.....F..
006EF0  6B D5 01 71  82 80 06 80  06 CF 19 F1  6C 46 07 D5   k..q........lF..
006F00  01 66 83 80  06 56 07 D5  01 67 83 80  06 46 07 D5   .f...V...g...F..
006F10  01 7C 83 80  06 6D 6E B7  6E 46 07 D5  01 64 80 80   .|...mn.nF...d..
006F20  06 3F 6E D5  01 3C 00 D5  01 7D 8A 80  06 D5 01 05   .?n..<...}......
006F30  00 D5 01 F6  82 80 06 D5  01 C7 91 3F  11 83 07 4E   ...........?...N
006F40  07 D5 01 C7  91 80 06 D5  01 07 00 D5  01 6B 83 80   .............k..
006F50  06 46 07 D5  01 62 85 80  06 4E 07 D5  01 6A 83 80   .F...b...N...j..
006F60  06 AF 53 D5  01 CC 86 6D  06 1D 6D D5  01 E9 86 D5   ..S....m..m.....
006F70  01 08 00 D5  01 FF 00 6E  07 D5 01 07  00 D5 01 7B   .......n.......{
006F80  83 80 06 D5  01 05 00 D5  01 9B 8A 80  06 46 07 D5   .............F..
006F90  01 9C 8A 80  06 4E 07 D5  01 7F 86 80  06 D5 01 00   .....N..........
006FA0  80 34 0C 83  07 D5 01 4A  80 D5 01 06  00 83 07 BF   .4.....J........
006FB0  6B C9 6C 7A  01 6A 01 46  07 D5 01 70  85 80 06 D5   k.lz.j.F...p....
006FC0  01 00 80 D5  01 77 85 6D  06 D5 01 80  00 D5 01 74   .....w.m.......t
006FD0  85 80 06 46  07 D5 01 75  85 6D 06 46  07 D5 01 79   ...F...u.m.F...y
006FE0  85 80 06 7A  01 6A 01 D5  01 FE 00 D5  01 89 8A 80   ...z.j..........
006FF0  06 46 07 D5  01 9C 8A 80  06 46 07 D5  01 9A 8A 80   .F.......F......
007000  06 D5 01 07  00 D5 01 98  8A 80 06 46  07 D5 01 99   ...........F....
007010  8A 80 06 46  07 D5 01 7D  83 80 06 46  07 D5 01 7E   .F.....}...F...~
007020  83 80 06 46  07 D5 01 69  87 80 06 46  07 D5 01 89   .F...i...F......
```

```
007030  81 80 06 5B  6E D5 01 07  00 D5 01 3C  00 31 03 D5   ...[n.......<.1..
007040  01 10 85 6D  06 D5 01 12  00 D5 01 3C  00 31 03 D5   ...m.......<.1..
007050  01 12 85 6D  06 46 07 D5  01 37 82 80  06 D5 01 0F   ...m.F...7......
007060  00 D5 01 14  85 80 06 7A  01 6A 01 6C  0C 42 19 48   .......z.j.l.B.H
007070  0C 8D 04 4C  0C C1 04 81  02 04 00 EE  07 6B 3C 46   ...L.........k<F
007080  07 D5 01 59  8A 6D 06 46  07 D5 01 AB  89 6D 06 D5   ...Y.m.F.....m..
007090  01 0A 00 D5  01 59 87 99  15 D5 01 3C  00 D5 01 49   .....Y.....<...I
0070A0  87 7F 15 46  07 D5 01 51  8A 6D 06 46  07 D5 01 7E   ...F...Q.m.F...~
0070B0  8A 80 06 46  07 D5 01 8C  8A 80 06 46  07 D5 01 8B   ...F.......F....
0070C0  8A 80 06 46  07 D5 01 8D  8A 80 06 46  07 D5 01 57   ...F.......F...W
0070D0  8A 80 06 46  07 D5 01 54  8A 80 06 46  07 D5 01 6F   ...F...T.m.F...o
0070E0  85 80 06 46  07 D5 01 56  8A 80 06 46  07 D5 01 78   ...F...V...F...x
0070F0  8A 80 06 7A  01 6A 01 46  07 D5 01 65  85 80 06 46   ...z.j.F...e...F
007100  07 D5 01 A9  87 80 06 46  07 D5 01 58  85 80 06 46   .......F...[...F
007110  07 D5 01 57  85 80 06 46  07 D5 01 58  85 80 06 4E   ...W...F...X...N
007120  07 D5 01 59  85 80 06 46  07 D5 01 5A  85 80 06 46   ...Y...F...Z...F
007130  07 D5 01 5D  85 80 06 46  07 D5 01 5E  85 6D 06 46   ...]...F...^.m.F
007140  07 D5 01 64  85 80 06 46  07 D5 01 B9  87 80 06 46   ...d...F.......F
007150  07 D5 01 33  82 80 06 46  07 D5 01 34  82 80 06 46   ...3...F...4...F
007160  07 D5 01 35  82 80 06 46  07 D5 01 36  82 80 06 46   ...5...F...6...F
007170  07 D5 01 5B  82 80 06 46  07 D5 01 27  82 80 06 46   ...[...F...'...F
007180  07 D5 01 2B  82 80 06 46  07 D5 01 2C  82 80 06 D5   ...+...F...,....
007190  01 38 82 D5  01 20 00 83  07 7A 01 6A  01 D5 01 63   .8... ...z.j...c
0071A0  80 77 06 30  05 81 02 08  00 D5 01 64  80 B9 18 D5   .w.0.......d....
0071B0  01 B4 00 D5  01 63 80 80  06 D5 01 66  80 B9 18 D5   .....c.....f....
0071C0  01 74 83 77  06 D5 01 67  80 80 06 D5  01 75 83 77   .t.w...g.....u.w
0071D0  06 D5 01 68  80 D5 01 69  80 63 06 D5  01 69 80 6D   ...h...i.c...i.m
0071E0  06 7A 01 6A  01 E5 6D 46  07 D5 01 DF  86 6D 06 D5   .z.j..mF.....m..
0071F0  01 F9 86 D5  01 D9 88 00  06 38 04 83  07 07 6D 0B   .........8....m.
007200  6C B4 04 9A  04 81 02 08  00 CB 6E 73  02 0C 00 D5   l.........ns....
007210  01 0A 00 D5  01 99 87 99  15 B5 6F 9B  71 79 6D A1   ..........o.qym.
007220  25 D5 01 8A  82 B9 18 BB  53 D5 01 C5  86 80 06 D7   %.......S.......
007230  53 D5 01 8F  81 80 06 46  07 D5 01 9B  81 80 06 46   S......F.......F
007240  07 D5 01 70  80 80 06 46  07 D5 01 71  80 80 06 D5   ...p...F...q....
007250  01 FF 00 D5  01 6F 80 80  06 4E 07 D5  01 77 82 80   .....o...N...w..
007260  06 4E 07 D5  01 DD 91 80  06 46 07 D5  01 C6 82 80   .N.......F......
007270  06 46 07 D5  01 C5 82 80  06 4E 07 D5  01 75 82 80   .F.......N...u..
007280  06 46 07 D5  01 8D 82 80  06 46 07 D5  01 18 83 80   .F.......F......
007290  06 D5 01 09  00 D5 01 69  83 80 06 46  07 D5 01 7E   .......i...F...~
0072A0  82 80 06 46  07 D5 01 78  82 80 06 46  07 D5 01 85   ...F...x...F....
0072B0  82 80 06 46  07 D5 01 3A  83 80 06 46  07 D5 01 80   ...F...:...F....
0072C0  86 80 06 46  07 D5 01 74  83 80 06 46  07 D5 01 75   ...F...t...F...u
0072D0  83 80 06 46  07 D5 01 7F  83 80 06 46  07 D5 01 83   ...F.......F....
0072E0  83 80 06 46  07 D5 01 76  83 6D 06 46  07 D5 01 6C   ...F...v.m.F...l
0072F0  83 80 06 46  07 D5 01 BB  83 80 06 46  07 D5 01 71   ...F.......F...q
007300  83 80 06 4E  07 D5 01 69  85 6D 06 D5  01 0A 00 D5   ...N...i.m......
007310  01 6B 85 6D  06 46 07 D5  01 63 89 80  06 46 07 D5   .k.m.F...c...F..
007320  01 62 89 80  06 46 07 D5  01 68 85 80  06 46 07 D5   .b...F...h...F..
007330  01 68 82 6D  06 46 07 D5  01 86 8A 6D  06 E5 6F 69   .h.m.F.....m..oi
007340  70 F5 70 D5  01 7B 83 77  06 D5 01 79  83 80 06 D5   p.p..{.w...y....
007350  01 C7 91 D5  01 B6 91 3F  11 97 07 D5  01 94 91 3F   .......?.......?
007360  11 43 11 31  03 7F 11 6E  07 89 2A 01  6D 9B 6B C0   .C.1...n..*.m.k.
007370  79 D5 01 63  04 31 03 D5  01 E7 86 6D  06 03 6E 48   y..c.1.....m..nH
007380  19 7A 01 87  56 45 52 53  49 4F 4E 00  00 6A 01 D5   .z..VERSION..j..
007390  01 07 00 7A  01 88 52 45  56 49 53 49  4F 4E 83 73   ...z..REVISION.s
0073A0  6A 01 46 07  7A 01 6A 01  D5 01 76 83  63 06 D5 01   j.F.z.j...v.c...
0073B0  2B 02 C1 04  5F 25 8D 04  F1 5F 8D 04  7A 01 6A 01   +..._%..._..z.j.
0073C0  D5 01 20 92  27 11 83 07  7A 01 6A 01  D5 01 B4 00   .. .'...z.j.....
0073D0  D5 01 63 80  80 06 7D 05  D5 01 20 92  D1 04 81 02   ..c...}... .....
0073E0  0C 00 7D 05  D5 01 5D 80  6D 06 C9 6C  7A 01 6A 01   ..}...].m..lz.j.
0073F0  D5 01 8F 81  C5 18 B8 7A  3B 55 81 02  04 00 EE 07   .......z.U......
007400  D5 01 6F 83  77 06 D5 01  08 00 8D 04  81 02 04 00   ..o.w...........
007410  95 53 8B 55  81 02 04 00  EE 07 73 02  DA FF 7A 01   .S.U......s...z.
007420  6A 01 8D 05  66 07 D5 01  14 00 46 07  F2 01 5E 74   j...f.....F...^t
007430  D5 01 2F 0C  77 06 D5 01  00 00 32 19  B4 04 D5 01   ../.w.....2.....
007440  6C 80 77 06  4E 07 C1 04  8D 04 81 02  08 00 F3 05   l.w.N...........
007450  46 07 33 02  D5 01 05 00  EE 73 43 02  D4 FF 9D 05   F.3......sC.....
007460  F9 05 81 02  08 00 F3 05  66 07 EE 07  D5 01 6B 80   ........f.....k.
007470  80 06 46 07  D5 01 6C 80  80 06 46 07  7A 01 6A 01   ..F...l...F.z.j.
007480  46 07 66 07  D5 01 1E 00  46 07 F2 01  CA 74 D5 01   F.f.....F....t..
007490  2F 0C 77 06  D5 01 01 00  32 19 81 02  24 00 46 06   /.w.....2...$.F.
0074A0  D5 01 2E 06  77 06 08 06  D5 01 71 85  77 06 81 02   ....w.....q.w...
0074B0  08 00 D5 01  FF 00 A7 04  20 74 F3 05  46 07 33 02   ........ t..F.3.
0074C0  D5 01 05 00  EE 73 43 02  C6 FF 08 06  81 02 06 00   .....sC.........
0074D0  66 07 65 18  7A 01 6A 01  D5 01 64 00  46 07 F2 01   f.e.z.j...d.F...
```

```
0074E0  08 75 D5 01  2E 0C 77 06  F3 05 D5 01  0A 00 EE 73   .u...w.........s
0074F0  D5 01 2F 0C  77 06 D5 01  01 00 32 19  B4 04 81 02   ../.w.....2.....
007500  04 00 33 02  43 02 DC FF  7A 01 6A 01  D5 01 7A 85   ..3.C...z.j...z.
007510  D5 01 00 01  83 07 7A 01  6A 01 12 0C  46 07 20 74   ......z.j...F. t
007520  F3 05 20 74  F3 05 20 74  F3 05 7A 01  6A 01 D5 01   .. t.. t..z.j...
007530  75 85 63 06  18 75 7A 01  6A 01 D5 01  77 85 63 06   u.c..uz.j...w.c.
007540  18 75 7A 01  6A 01 7E 74  F9 05 CA 09  9A 04 8D 05   .uz.j.~t........
007550  7E 74 8D 05  7E 74 9D 05  9A 04 9D 05  9A 04 81 02   ~t..~t..........
007560  0A 00 F3 05  66 07 73 02  08 00 F9 05  1F 0C 46 07   ....f.s.......F.
007570  7A 01 6A 01  44 75 81 02  0C 00 46 06  D6 74 66 07   z.j.Du....F..tf.
007580  73 02 08 00  F9 05 6D 06  46 07 7A 01  6A 01 D5 01   s.....m.F.z.j...
007590  75 85 72 75  7A 01 6A 01  D5 01 FF 00  1F 07 2F 06   u.ruz.j......./.
0075A0  D5 01 74 85  80 06 D5 01  77 85 6D 06  46 07 D5 01   ..t.....w.m.F...
0075B0  79 85 80 06  0A 75 D5 01  7A 85 F9 05  97 07 D5 01   y....u..z.......
0075C0  7A 85 77 06  D5 01 7E 86  80 06 46 07  D5 01 7D 86   z.w...~...F...}.
0075D0  80 06 7A 01  6A 01 44 75  81 02 0A 00  F3 05 D6 74   ..z.j.Du.......t
0075E0  73 02 0E 00  7E 74 81 02  06 00 F3 05  EE 07 96 75   s...~t.........u
0075F0  7A 01 6A 01  3C 79 D5 01  10 8A D5 01  80 00 96 75   z.j.<y.........u
007600  7A 01 6A 01  D5 01 7E 86  77 06 D5 01  7D 86 77 06   z.j...~.w...}.w.
007610  20 74 81 02  06 00 F3 05  EE 07 20 74  F3 05 7A 01    t........ t..z.
007620  6A 01 D5 01  79 85 77 06  08 06 D5 01  77 85 63 06   j...y.w.....w.c.
007630  30 04 77 06  7A 01 6A 01  D5 01 79 85  08 06 77 06   0.w.z.j...y...w.
007640  42 04 D5 01  FF 00 8D 04  D5 01 74 85  77 06 4E 07   B.........t.w.N.
007650  F8 06 F0 09  B1 18 7A 01  6A 01 D5 01  74 85 77 06   ......z.j...t.w.
007660  46 07 1D 02  9A 76 36 76  20 76 F9 05  2F 06 D5 01   F....v6v v../...
007670  7A 85 30 04  2F 06 77 06  C1 04 81 02  0A 00 46 06   z.0./.w.......F.
007680  46 06 73 02  12 00 80 06  D5 01 7D 86  80 06 D5 01   F.s.......}.....
007690  7E 86 80 06  33 02 43 02  CE FF 7A 01  6A 01 D5 01   ~...3.C...z.j...
0076A0  77 85 63 06  D5 01 7A 85  D5 01 74 85  77 06 97 07   w.c...z...t.w...
0076B0  D5 01 7A 85  D5 01 74 85  77 06 00 06  30 04 F9 05   ..z...t.w...0...
0076C0  F2 04 D4 76  B9 05 77 06  20 74 81 02  04 00 33 02   ...v.w. t....3.
0076D0  43 02 F2 FF  7A 01 6A 01  58 76 02 76  7A 01 6A 01   C...z.j.Xv.vz.j.
0076E0  2C 75 D5 01  75 85 63 06  77 06 20 74  F3 05 7A 01   ,u..u.c.w. t..z.
0076F0  6A 01 8C 75  81 02 04 00  EE 07 D5 01  75 85 63 06   j..u........u.c.
007700  77 06 20 74  F3 05 7A 01  6A 01 D5 01  75 85 08 06   w. t..z.j...u...
007710  63 06 42 04  08 06 1B 06  6D 06 2C 75  77 06 20 74   c.B.....m.,uw. t
007720  F3 05 7A 01  6A 01 42 07  D5 01 71 85  80 06 7E 74   ..z.j.N...q...~t
007730  46 07 D5 01  71 85 80 06  7A 01 6A 01  44 75 81 02   F...q...z.j.Du..
007740  06 00 F3 05  EE 07 7E 74  81 02 06 00  46 06 EE 07   ......~t....F...
007750  44 75 81 02  06 00 DB 18  EE 07 1B 06  00 06 B2 09   Du..............
007760  81 02 08 00  46 06 73 02  04 00 80 06  7A 01 6A 01   ....F.s.....z.j.
007770  44 75 81 02  06 00 F3 05  EE 07 44 75  81 02 06 00   Du........Du..
007780  46 06 EE 07  44 75 81 02  06 00 DB 18  EE 07 1B 06   F...Du..........
007790  00 06 B2 09  81 02 08 00  46 06 73 02  04 00 6D 06   ........F.s...m.
0077A0  7A 01 6A 01  D5 01 7C 86  77 06 D5 01  00 80 D5 01   z.j...|.w.......
0077B0  20 92 D5 01  75 85 63 06  2F 06 42 04  E8 04 B4 04    ...u.c./.B....
0077C0  81 02 10 00  F3 05 D5 01  00 80 08 06  D5 01 75 85   ..............u.
0077D0  6D 06 F2 01  EC 77 00 06  B9 05 77 06  C1 04 81 02   m....w....w.....
0077E0  08 00 F3 05  B9 05 33 02  43 02 EC FF  51 04 D5 01   ......3.C...Q...
0077F0  75 85 6D 06  F3 05 08 77  7A 01 6A 01  7E 74 81 02   u.m....wz.j.~t..
007800  06 00 F3 05  EE 07 D5 01  7C 86 80 06  A2 77 7A 01   ........|....wz.
007810  6A 01 0F 06  30 05 81 02  04 00 EE 07  D5 01 1D 00   j...0...........
007820  8E 02 08 00  D6 76 73 02  BC 00 D5 01  1A 00 8E 02   .....vs.........
007830  08 00 08 77  73 02 AE 00  D5 01 1C 00  8E 02 08 00   ...ws...........
007840  DE 76 73 02  A0 00 D5 01  12 00 8E 02  08 00 F0 76   .vs............v
007850  73 02 92 00  D5 01 1F 00  8E 02 08 00  9C 76 73 02   s............vs.
007860  84 00 D5 01  19 00 8E 02  08 00 D4 75  73 02 76 00   ...........us.v.
007870  D5 01 11 00  8E 02 08 00  3A 77 73 02  68 00 D5 01   ........:ws.h...
007880  21 00 8E 02  08 00 6E 77  73 02 5A 00  D5 01 20 00   !.....nws.Z... .
007890  8E 02 08 00  F2 75 73 02  4C 00 D5 01  1E 00 8E 02   .....us.L.......
0078A0  08 00 38 75  73 02 3E 00  D5 01 1B 00  8E 02 08 00   ..8us.>.........
0078B0  2C 75 73 02  30 00 D5 01  99 00 8E 02  08 00 D6 74   ,us.0..........t
0078C0  73 02 22 00  D5 01 22 00  8E 02 08 00  FA 77 73 02   s."..."......ws.
0078D0  14 00 D5 01  23 00 8E 02  08 00 A2 77  73 02 06 00   ....#......ws...
0078E0  D6 74 F3 05  7A 01 6A 01  24 77 81 02  06 00 F3 05   .t..z.j.$w......
0078F0  EE 07 10 78  7A 01 6A 01  D5 01 10 8A  D5 01 77 85   ...xz.j.......w.
007900  63 06 B2 09  81 02 04 00  EE 07 D5 01  50 8A 08 06   c...........P...
007910  77 06 42 04  ED 35 42 04  F0 09 08 06  1B 06 80 06   w.B..5B.........
007920  08 06 7B 39  81 02 12 00  D5 01 7E 86  80 06 D5 01   ..{9......~.....
007930  7D 86 80 06  73 02 04 00  46 06 7A 01  6A 01 D6 74   }...s...F.z.j..t
007940  ED 35 42 04  46 07 F2 01  70 79 B9 05  7B 39 CB 18   .5B.F...py..{9..
007950  B4 04 D5 01  2F 0C 77 06  D5 01 01 00  32 19 9A 04   ..../.w.....2...
007960  81 02 04 00  33 02 D5 01  05 00 EE 73  43 02 DC FF   ....3......sC...
007970  7A 01 6A 01  D5 01 2F 0C  77 06 D5 01  01 00 32 19   z.j.../.w.....2.
007980  81 02 06 00  E6 78 F6 78  7A 01 6A 01  F1 51 D5 01   .....x.xz.j..Q..
```

```
007990  70 85 08 06  77 06 81 02  0A 00 F3 05  EE 07 73 02   p...w.........s.
0079A0  06 00 4E 07  B1 18 D5 01  72 79 46 07  D5 01 16 00   ..N.....ryF.....
0079B0  C1 17 46 07  D5 01 70 85  80 06 7A 01  40 01 03 12   ..F...p...z.@...
0079C0  6A 01 D5 01  30 00 8D 05  46 07 AD 05  5E 07 30 04   j...0...F...^.0.
0079D0  77 06 D5 01  30 00 38 04  D5 01 E8 03  31 03 30 04   w...0.8.....1.0.
0079E0  AD 05 D5 01  04 00 30 04  77 06 D5 01  30 00 38 04   ......0.w...0.8.
0079F0  D5 01 64 00  31 03 30 04  AD 05 D5 01  05 00 30 04   ..d.1.0.......0.
007A00  77 06 D5 01  30 00 38 04  D5 01 0A 00  31 03 30 04   w...0.8.....1.0.
007A10  9D 05 D5 01  06 00 30 04  77 06 D5 01  30 00 38 04   ......0.w...0.8.
007A20  30 04 08 06  D5 01 66 85  6D 06 7A 01  6A 01 D5 01   0.....f.m.z.j...
007A30  6F 83 77 06  8D 05 AD 05  4E 07 8D 04  81 02 06 00   o.w.....N.......
007A40  8A 79 65 2A  AD 05 56 07  8D 04 81 02  06 00 8A 79   .ye*..V........y
007A50  D9 35 AD 05  D5 01 04 00  8D 04 81 02  06 00 8A 79   .5.............y
007A60  77 6B AD 05  D5 01 08 00  8D 04 81 02  06 00 8A 79   wk.............y
007A70  95 53 AD 05  D5 01 10 00  8D 04 81 02  06 00 8A 79   .S.............y
007A80  1B 45 AD 05  D5 01 20 00  8D 04 81 02  06 00 8A 79   .E.... ........y
007A90  ED 4C 9D 05  D5 01 80 00  8D 04 81 02  1A 00 8A 79   .L.............y
007AA0  D5 01 6F 82  63 06 0F 06  81 02 0C 00  E3 05 46 07   ..o.c.........F.
007AB0  D5 01 6F 82  6D 06 7A 01  6A 01 71 17  8A 79 D5 01   ..o.m.z.j.q..y..
007AC0  01 00 42 19  08 06 D5 01  B6 89 80 06  48 0C 8D 04   ..B.........H...
007AD0  D5 01 83 82  80 06 CA 73  7A 01 6A 01  BE 73 D5 01   .......sz.j..s..
007AE0  55 80 77 06  65 18 11 55  D5 01 FA 00  39 18 FF 54   U.w.e..U....9..T
007AF0  D5 01 FA 00  39 18 F1 1A  D5 01 14 00  D5 01 A9 87   ....9...........
007B00  7F 15 11 37  27 52 D5 01  3F 00 D5 01  6F 83 80 06   ...7'R..?...o...
007B10  2C 7A B8 7A  73 02 FA FF  7A 01 6A 01  E3 71 D5 01   ,z.z.s..z.j..q..
007B20  EE 00 D5 01  5C 80 80 06  C0 79 F3 05  DA 7A 7A 01   ....\....y...zz.
```

APPENDIX II

020 Air Conditioner
021
022 All Lights
023 And
024 Appliance
025 Arm
026 Basement
027
028 Bathroom
029
030 Bedroom
031
032 Boy's Room
033
034 Breakfast Room
035
036 CD Player
037
038 Ceiling
039
040 Central
041
042 Children's
043
044 Clothes Dryer
045
046 Coffee Maker
047
048 Deck
049
050 Decorative
051
052 Den
053
054 Dining Room
055 Disarm
056 Dish Washer
057
058 Disposal
059
060 Dock
061 Door
062 Downstairs
063
064 Dryer
065
066 East
067
068 Eighth
069
070 Electric Heater
071

| | |
|---|---|
| 072 | Electric Stove |
| 073 | |
| 074 | Entrance |
| 075 | |
| 076 | Entry |
| 077 | |
| 078 | Family Room |
| 079 | Fan |
| 080 | Fifth |
| 081 | |
| 082 | Fireplace |
| 083 | |
| 084 | First |
| 085 | Flood Lights |
| 086 | Floor |
| 087 | |
| 088 | Fourth |
| 089 | |
| 090 | Foyer |
| 091 | |
| 092 | Front |
| 093 | |
| 094 | Furnace |
| 095 | |
| 096 | Garage |
| 097 | |
| 098 | Gas |
| 099 | |
| 100 | Girl's Room |
| 101 | |
| 102 | Guest |
| 103 | |
| 104 | Guest House |
| 105 | |
| 106 | Guest Room |
| 107 | |
| 198 | Hall |
| 109 | |
| 110 | HVAC |
| 111 | |
| 112 | Heater |
| 113 | |
| 114 | House |
| 115 | |
| 116 | Inside |
| 117 | |
| 118 | Kitchen |
| 119 | |
| 120 | Lamps |
| 121 | |
| 122 | Laundry Lights |
| 123 | |
| 124 | Lights |
| 125 | |

| | |
|---|---|
| 126 | Living Room |
| 127 | |
| 128 | Maid's Room |
| 129 | Malibu Lights |
| 130 | Master Bedroom |
| 131 | |
| 132 | Nanny's Room |
| 133 | |
| 134 | Ninth |
| 135 | |
| 136 | North |
| 137 | |
| 138 | Number one |
| 139 | |
| 140 | Number two |
| 141 | |
| 142 | Nursery |
| 143 | |
| 144 | Oil |
| 145 | |
| 146 | Outside |
| 147 | |
| 148 | Patio |
| 149 | |
| 150 | Play Room |
| 151 | |
| 152 | Pool |
| 153 | |
| 154 | Porch |
| 155 | |
| 156 | Powder Room |
| 157 | |
| 158 | Pump |
| 159 | |
| 160 | Quarters |
| 161 | |
| 162 | Rear |
| 163 | |
| 164 | Record Player |
| 165 | |
| 166 | Room: |
| 167 | |
| 168 | Sconces |
| 169 | |
| 170 | Second |
| 171 | |
| 172 | Servant's |
| 173 | Security |
| 174 | Seventh |
| 175 | |
| 176 | Side |
| 177 | |
| 178 | Sixth |
| 179 | |

| | |
|---|---|
| 180 | South |
| 181 | |
| 182 | Stairway |
| 183 | |
| 184 | Stereo FM |
| 185 | System |
| 186 | Tape Player |
| 187 | |
| 188 | Tenth |
| 189 | |
| 190 | Third |
| 191 | |
| 192 | Toaster |
| 193 | |
| 194 | TV |
| 195 | |
| 196 | Upstairs |
| 197 | |
| 198 | VCR |
| 199 | |
| 200 | Washing Machine |
| 201 | |
| 202 | Water Heater |
| 203 | |
| 204 | West |
| 205 | Window |
| 206 | Window Air Conditioner |
| 207 | |
| 208 | Whole House |
| 209 | |
| 210 | |
| 211 | |
| 212 | |
| 213 | |
| 214 | |
| 215 | |
| 216 | |
| 217 | |
| 218 | |
| 219 | |
| 220 | |
| 221 | |
| 222 | |
| 223 | |
| 224 | |
| 225 | |
| 226 | |
| 227 | |
| 228 | |
| 229 | |
| 230 | |
| 231 | |
| 232 | |
| 233 | |

| | |
|---|---|
| 234 | |
| 235 | |
| 236 | |
| 237 | |
| 238 | |
| 239 | |
| 240 | |
| 241 | |
| 242 | |
| 243 | |
| 244 | |
| 245 | |
| 246 | |
| 247 | |
| 248 | |
| 249 | |
| 250 | |
| 251 | |
| 252 | |
| 253 | |
| 254 | |
| 255 | |
| 256 | |
| 267 | |
| 258 | |
| 259 | |
| 260 | |
| 262 | |
| 262 | |
| 263 | |
| 264 | |
| 265 | |
| 266 | |
| 267 | |
| 268 | |
| 269 | |
| 270 | |
| 271 | |
| 272 | |
| 273 | |
| 274 | |
| 275 | |
| 276 | |
| 277 | Weekdays |
| 278 | Weekends and Holidays |
| 279 | Sundays |
| 280 | Mondays |
| 281 | Tuesdays |
| 282 | Wednesdays |
| 283 | Thursdays |
| 284 | Fridays |
| 285 | Saturdays |
| 286 | Holidays |
| 287 | Every day |

288 On Weekends
289 On Weekends and Holidays
290 On Sundays
291 On Mondays
292 On Tuesdays
293 On Wednesdays
294 On Thursdays
295 On Fridays
296 On Saturdays
297 On Holidays
298 Every day
299
300 Zero
301 One
302 Two
303 Three
304 Four
305 Five
306 Six
307 Seven
308 Eight
309 Nine
310 Ten
311 Eleven
312 Twelve
313 Thirteen
314 Fourteen
315 Fifteen
316 Sixteen
317 Seventeen
318 Eighteen
319 Nineteen
320 Twenty
321
322
323
324
325 Twenty-five
326
327
328
329
330 Thirty
331
332
333
334
335 Thirty-five
336
337
338
339
340 Forty
341

342
343
344
345 Forty-five
346
347
348
349
350 Fifty
351
352
353
354
355 Fifty-five
356
357
358
359
360 Sixty
361
362
363
364
365
366
367
368
369
370 Seventy
371
372
373
374
375
376
377
387
379
380 Eighty
381
382
383
384
385
386
387
388
389
390 Ninety
391
392
393 Hours
394 Minutes
395 Degree Fahrenhiet

| | |
|---|---|
| 396 | When at HOME |
| 397 | When ASLEEP |
| 398 | When AWAY |
| 399 | This choice is not yet available. Please make another selection. |
| 400 | Hundred |
| 401 | Hundred and |
| 402 | Index Number |
| 403 | Is |
| 404 | And |
| 405 | Your |
| 406 | |
| 407 | |
| 408 | |
| 409 | |
| 410 | |
| 411 | |
| 412 | |
| 413 | |
| 414 | |
| 415 | Your Personal Identification Number is now |
| 416 | Your new Personal Identification Number must have exactly four digits. Please enter this four digit number now or press * to return to Help Menu. |
| 417 | Remember these two buttons: The star (*) button to back up, the operator button for help. The operator button is used to get the system help menu. The operator button can be used at any time a menu is being offered. The star(*) button is used to back up to the menu before the current menu. The star(*) button is also used to cancel or back out of a number being entered. Some helpful pointers: You do not have to wait for a message to complete before entering a response. If you know what your response will be, you may enter it at any time. You may hang up at any time. It is suggested that you explore some menu choices. Use the star (*) button. Become familiar with the system. |
| 418 | To talk to a TESS representative, call 1-800-654 7897.......1-800-654-7897 |
| 419 | |
| 420 | |
| 421 | HELLO. This is the TESS Command Center. Please enter your home area code and telephone number. |
| 422 | You have entered an incorrect area code and telephone number. Please re-enter. |
| 423 | Thank you. Please enter your Personal Identification Number. |
| 424 | You have entered an incorrect Identification Number. Please re-enter. |
| 425 | Please choose a category:<br>For HEATING and AIR CONDITIONING, press 1<br>For WATER HEATING, press 2<br>For LIGHTS THAT YOU ONLY TURN ON OR OFF, press 3<br>For LIGHTS THAT YOU DIM, press 4<br>For APPLIANCES, press 5<br>For UNUSED X-10 DEVICES, press 6 |
| 426 | Thank you. You are now at the Main Menu. |
| 427 | The following Help Menu will always be given first if your PIN Number is still 1111. |
| 428 | TESS Help Menu follows:<br>To review how this Menu system works, press 1<br>To change your Personal Identification Number, press 2<br>To talk to a TESS representative, press 3 |

To hang up, press 4
To return to the Main Menu, press 5
To return to the last menu, press star (*)

429
430 Star (*)
431 OFF
432 To ON at MEDIUM BRIGHTNESS
433 To ON at LOW BRIGHTNESS
434 In the HOME mode
435 In the OFF mode
436 In the AWAY mode
437 In the SLEEP mode
438 To ON at Full Brightness
439 Your requested action is now being communicated to your Home Controller.
440 Hours and
441 Hour and
442 Minutes
443 Minute
444 To put
445 To normal schedule
446 To return
447 To assign
448 Schedule Number
449 Press 1
To perform this action at a later time and \or date, press 2
To choosee a different action for this device, press 3
450 X-10
451 For
452 For more choices, press 9
453 There are no devices in this category being controlled.
454 Device choices
455 Device selected is
456
457 Switch channel
458
459
460 Action choices follow
461 To return to normal schedule, press 5
For more action choices, press 6
462 To change to the OFF mode, press 1
To change to the HOME mode, press 2
To change to AWAY mode, press 3
To change to the SLEEP mode, press 4
463 To turn OFF, press 1
To turn ON, press 2
464 Additional
465 To review an assigned schedule, press 1
To assign an Energy Guide schedule, press 2
To change the name for this device, press 3
466 To change the temperature setpoint, press 4
467 To make your own schedule, press 4
468 To turn OFF, press 1
To turn ON at MEDIUM BRIGHTNESS, press 3
To turn ON at LOW BRIGHTNESS, press 4

| | |
|---|---|
| 469 | To set to LOW BRIGHTNESS, press 1<br>To set to MEDIUM BRIGHTNESS, press 2<br>To set to FULL BRIGHTNESS, press 3 |
| 470 | |
| 471 | |
| 472 | Then you schedule |
| 473 | Schedules to be assigned are as follows:<br>You scheduled_____ |
| 474 | _____ was the schedule number entered. However, this schedule is not presently available. |
| 475 | |
| 476 | Please enter desired schedule number for |
| 477 | |
| 478 | If you want the same schedule for every day of the week, including holidays, press 1<br>If you want the same schedule for each day of the week and a different schedule for weekends (Saturdays, Sundays, and Holidays), press 2<br>If you want a different schedule for certain days, press 3 |
| 479 | To make this asssignment now |
| 480 | Up to three voice phrase numbers may be used to describe this device. Please enter the first phrase number. |
| 481 | Please enter the second phrase number or pound sign if no phrase. |
| 482 | Please enter the third phrase number or pound sign if no phrase. |
| 483 | The current device is named |
| 484 | To change the device name, press 1<br>To change the device category, press 2 |
| 485 | The category of this device cannot be changed |
| 486 | |
| 487 | |
| 488 | |
| 489 | For YES, press 1<br>For NO, press 3 |
| 490 | Please enter the override duration in hours and minutes.<br>First enter the number of hours |
| 491 | Now please enter the number of minutes |
| 492 | No shedule assigned |
| 493 | ON all day |
| 494 | OFF all day |
| 495 | |
| 496 | |
| 497 | |
| 498 | |
| 499 | |
| 500 | Press 0 |
| 501 | Press 1 |
| 502 | Press 2 |
| 503 | Press 3 |
| 504 | Press 4 |
| 505 | Press 5 |
| 506 | Press 6 |
| 507 | Press 7 |
| 508 | |
| 509 | |
| 510 | Please enter the index Number -- |

What is claimed is:

1. A system for controlling the operation of selected energy consuming devices within a plurality of different facility within a defined wide area, comprising:

a plurality of controllers, each including message receiving means and each located in conjunction with a facility, each controller, in response to messages received, controlling at least one device coupled thereto in a manner defined by said message, wherein each controller controls a plurality of different devices and each controller includes programmed processor means for maintaining a schedule of events for each of said devices being controlled, said processor determining the time of occurrence for each event and providing a signal to an appropriate one of said devices to execute the then scheduled event;

means for providing messages over a communication link, each message including a code manifesting whether that message is globally addressed to each of said controllers or whether said message is addressed to a specific controller; and means for communicating with said message providing means to cause a selected message addressed to a specific controller to be sent, wherein said selected message includes a plurality of characters, one of which designates that the message is of a type that contains command data in designated other characters, said command data including data designating one of said devices to be controlled, a time to control that one device and the manner in which said one device is to be controlled.

2. The system according to claim 1 wherein said means for providing messages provides a plurality of different multi-character messages, a designated character of each message defining whether each of said plurality of controllers is to respond thereto or whether a single controller is addressed by other characters of said message.

3. The system according to claim 2 wherein each of said controllers includes a stored address, which address is manifested by said other characters of a message addressed to a single controller.

4. The system according to claim 3 wherein said designated character is the first informational character of each message and said other characters immediately follow said first informational character.

5. The system according to claim 4 wherein said designated character further defines the general manner in which said device is to be controlled, the remaining characters defining more specifically the manner in which said device is to be controlled.

6. The system according to claim 2 wherein said designated character further defines the general manner in which said device is to be controlled, the remaining characters defining more specifically the manner in which said device is to be controlled.

7. The system according to claim 1 wherein each controller includes programmed processor means for maintaining a schedule of events for said devices being controlled, said processor determining the time of each event and providing signals to said device to execute the then scheduled event.

8. The system according to claim 1 wherein said selected message further includes data defining a day upon which said event is to be controlled.

9. The system according to claim 8 wherein said time data is one of an absolute time or an offset from a designated celestial event.

10. The system according to claim 9:

wherein said means for providing messages provides a plurality of different multi-character messages, a designated character of each message defining whether the provided message is of a first type such that each of said controllers is to respond thereto or whether the provided message is of a second type such that only a single controller is addressed by other characters of said message;

wherein said selected message is said second type of message; and wherein a first type of message is periodically provided to each controller and designates the current time, day and the time of the celestial events, including said designated celestial event.

11. The system according to claim 10 wherein the manner in which said one device is to be controlled includes turning said one device completely on, turning said device off, or turning said device on to level less than completely on.

12. The system according to claim 11 wherein said command data in said selected message includes data designating:

a specified one of said devices to be controlled, a day during which said specified device is to be controlled, a plurality of manners by which said specified device is to be controlled on that day, and a time at which each manner of control is to occur.

13. The system according to claim 12 wherein said schedule of events for each device is maintained for each of a day of the week and for holidays.

14. The system according to claim 1 wherein said schedule of events for each device is maintained for each of a day of the week and for holidays.

15. The system according to claim 1 wherein said message providing means includes means for providing paging messages and said message receiving means includes paging message receiving means.

16. The system according to claim 1 wherein said message providing means includes means for providing paging messages and said message receiving means includes paging message receiving means.

17. The system according to claim 16 wherein paging message receiving means provides an output in the form of a serial signal defining various characters by an encoded display format.

18. The system according to claim 17 wherein said encoded display format is a seven segment display format.

19. The system according to claim 17 wherein each controller responds to said paging message receiving means output and converts the encoded display formatted message into a binary message for storage therein.

20. A system for controlling the operation of selected energy consuming devices within a plurality of different facility within a defined wide area, comprising:

a plurality of controllers, each including message receiving means and each located in conjunction with a facility, each controller, in response to messages received, controlling at least one device coupled thereto in a manner defined by said message, wherein each controller controls a plurality of different devices and each controller includes programmed processor means for maintaining a schedule of events for each of said devices being controlled, said processor determining the time of occurrence for each event and providing a signal to an appropriate one of said devices to execute the then scheduled event;

means for providing messages over a communication link, each message including a code manifesting whether that message is globally addressed to each of said controllers or whether said message is addressed to a specific controller; and means for communicating with said message providing means to cause a selected message addressed to a specific controller to be sent, wherein said selected message includes a plurality of characters, one of which designates that the message is of a type that contains command data in designated other characters; and wherein said command data includes data designating:
a specified one of said devices to be controlled,
a day during which said specified device is to be controlled,
a plurality of manners by which said specified device is to be controlled on that day, and
a time at which each manner of control is to occur.

21. The system according to claim 20 wherein said time data is one of an absolute time or an offset from a designated celestial event.

22. The system according to claim 21:
wherein said means for providing messages provides a plurality of different multi-character messages, a designated character of each message defining whether the provided message is of a first type such that each of said plurality of controllers is to respond thereto or whether the provided message is of a second type such that only a single controller is addressed by other characters of said message;
wherein said selected message is said second type of message; and
wherein a first type of message is periodically provided to said controller and designates the current time, day and the time of the celestial events, including said designated celestial event.

23. The system according to claim 22 wherein the manner in which said one device is to be controlled includes turning said one device completely on, turning said device off, or turning said device on to level less than completely on.

24. The system according to claim 23 wherein said schedule of events for each device is maintained for each of a day of the week and for holidays.

25. The system according to claim 20 wherein said schedule of events for each device is maintained for each of a day of the week and for holidays.

26. A system for controlling the operation of selected energy consuming devices within a plurality of different facility within a defined wide area, comprising:
a plurality of controllers, each including message receiving means and each located in conjunction with a facility, each controller, in response to messages received, controlling at least one device coupled thereto in a manner defined by said message, wherein each controller controls a plurality of different devices;

means for providing messages over a communication link, each message including a code manifesting whether that message is globally addressed to each of said controllers or whether said message is addressed to a specific controller; and means for communicating with said message providing means to cause a selected message addressed to a specific controller to be sent, wherein said selected message includes a plurality of characters, one of which designates that the message is of a type that contains command data in designated other characters, said command data including data designating one of said devices to be controlled, a time to control that one device and the manner in which said one device is to be controlled.

27. The system according to claim 26 wherein said selected message further includes data defining a time and a day upon which an event is to be controlled.

28. The system according to claim 27 wherein said time data is one of an absolute time or an offset from a designated celestial event.

29. A system for controlling the operation of selected energy consuming devices within a plurality of different facility within a defined wide area, comprising:
a plurality of controllers, each including message receiving means and each located in conjunction with a facility, each controller, in response to messages received, controlling at least one device coupled thereto in a manner defined by said message;

means for providing messages over a communication link, each message including a code manifesting whether that message is globally addressed to each of said controllers or whether said message is addressed to a specific controller; and means for communicating with said message providing means to cause a selected message addressed to a specific controller to be sent, wherein said selected message includes a plurality of characters, one of which designates that the message is of a type that contains command data in designated other characters, said command data including data designating one of said devices to be controlled, a time to control that one device and the manner in which said one device is to be controlled.

30. The system according to claim 29 wherein said selected message further includes data defining a day upon which a event is to be controlled.

31. The system according to claim 30 wherein said time data is one of an absolute time or an offset from a designated celestial event.

32. The system according to claim 31:
wherein said means for providing messages provides a plurality of different multi-character messages, a designated character of each message defining whether the provided message is of a first type such that each of said controllers is to respond thereto or whether the provided message is of a second type such that only a single controller is addressed by other characters of said message;
wherein said selected message is said second type of message; and
wherein a first type of message is periodically provided to each controller and designates the current time, day and the time of the celestial events, including said designated celestial event.

33. The system according to claim 32 wherein the manner in which said one device is to be controlled includes turning said one device completely on, turning said device off, or turning said device on to level less than completely on.

34. The system according to claim 33 wherein said command data in said selected message includes data designating:
a specified one of said devices to be controlled,
a day during which said specified device is to be controlled,
a plurality of manners by which said specified device is to be controlled on that day, and a time at which each manner of control is to occur.

35. The system according to claim 32 wherein another first type of message is provided, as required, manifesting weather conditions in a plurality of weather zones, including one zone in which said specified one device is located.

36. A wide area management system for managing a plurality of energy consuming devices in each of a plurality of different facilities within said wide area, said system comprising:

communication means for providing messages over a communication link, certain first type messages being globally provided to each facility being managed and certain second type said messages being addressed to a particular facility;

facility controller means within each facility connected to said plurality of devices being managed within said facility, each facility controller responding to said first type messages and those second type messages addressed to that controller, said controller storing a schedule of event commands for each device being controlled and providing signals to operate each device pursuant to the scheduled commands; and command means for causing said communication means to provide said second type signals to an addressed controller in response to qualified user prompted inputs to change the schedule stored in said addressed controller and thereby modify the operation of at least one specified device connected to addressed controller, wherein said command means stores data manifesting the devices being controlled in each facility and the manner in which each device is controlled, said command means creating a menu in response to each qualified user responses to further prompt user input as a part of determining the message to cause said communication means to generate.

37. The system according to claim 36 wherein a user communicates with said command means by pressing buttons on a touch-tone telephone in response to digitized voice patterns questions generated by and communicated from said command means to said user over said telephone.

38. The system according to claim 37 wherein each generated question is generated in response to the data stored by said command means and the previous response of said user.

39. The system according to claim 38 wherein each device being controlled is referred to by a common name by said digitized voice patterns.

40. The system according to claim 36 wherein said each of said controllers stores preset strings of event commands which, upon command, are included in said schedule.

41. The system according to claim 40 wherein said preset string of event commands are activated by a string activation message from said communication means addressed to that controller.

42. The system according to claim 41 wherein each controller stores a plurality of different preset strings of event commands and wherein said string activation message designates which string of event commands is to be included in said schedule.

43. A wide area management system for managing a plurality of energy consuming devices in each of a plurality of different facilities within said wide area, said system comprising:

communication means for providing messages over a communication link, certain first type messages being globally provided to each facility being managed and certain second type said messages being addressed to a particular facility;

facility controller means within each facility connected to said plurality of devices being managed within said facility, each facility controller responding to said first type messages and those second type messages addressed to that controller, said controller storing a schedule of event commands for each device being controlled and providing signals to operate each device pursuant to the scheduled commands; and command means for causing said communication means to provide said second type signals to an addressed controller in response to qualified user prompted inputs to change the schedule stored in said addressed controller and thereby modify the operation of at least one specified device connected to addressed controller, wherein said command means periodically generates said first type of messages.

44. The system according to claim 43 wherein said first type of message manifests time and date information.

45. The system according to claim 44 wherein another one of said first type of message manifests weather information within a plurality of different weather zones, each facility controller being in only one of said zones.

46. The system according to claim 43 wherein said first type of message manifests weather information within a plurality of different weather zones, each facility controller being in only one of said zones.

47. A method for controlling the operation of a plurality of devices in a plurality of different facilities pursuant to programmed commands of an occupant of each facility, said method comprising:

providing a controller in each facility within a defined wide area, each controller having a plurality of individual devices connected thereto;

providing a command center which generates messages to be transmitted to each of said controllers, each message containing a portion defining whether that message is of a first type designated for all controllers or of a second type for designated only an addressed controller;

transmitting on a periodic basis said first type of messages conveying the then occurring time and day;

transmitting said second type of message to an addressed facility in response to a qualified communication from the occupant of that addressed facility; and storing a schedule in the addressed controller of the communicating occupant's facility in response to said transmitted second type of messages, said schedule defining the occurrence of events for each device connected to the user's controller by time and day.

48. The method according to claim 47
wherein said step of providing a command center further includes the step of storing data at said command center manifesting the particular devices for each controller; and
wherein said step of transmitting said second type of message includes the step of one occupant communicating with said command center using a telephone, and said command center creating a series of questions based upon said stored data and the prior responses.

49. The method according to claim 48 wherein said step of transmitting said first type of message includes transmitting weather information for a plurality of different zones, said one occupant being in one of said zones.

50. The method according to claim 49 wherein said device is a heating/cooling unit, said schedule includes programmed temperatures at which said facility is to be maintained by said heating/cooling device, said method further including said controller overriding the programmed temperatures in response to certain weather information messages.

51. The method according to claim 47 wherein said step of transmitting said second type of message includes modifying said stored schedule at said addressed controller.

52. The method according to claim 47 wherein said step of transmitting said second type of message includes overriding said stored schedule at said addressed controller.

53. The method according to claim 47 wherein said step of storing a schedule includes determining the next scheduled occurring event occurrence after each scheduled event occurs.

54. The method according to claim 47 wherein said steps of transmitting include providing digital paging message signals.

55. The method according to claim 47 wherein said qualified communication includes the step of providing a code to said command center, said code being derived from a published schedule manifesting the times of facility occupancy.

56. The method according to claim 47 wherein said device is a heating/cooling unit having a cycle time, said method further including said controller adjusting said cycle time inversely to the current demand on said heating/cooling unit.

* * * * *